United States Patent
Yin et al.

(10) Patent No.: US 11,943,014 B2
(45) Date of Patent: Mar. 26, 2024

(54) CHANNEL MEASUREMENT METHOD AND COMMUNICATIONS APPARATUS

(71) Applicant: Huawei Technologies Co., Ltd., Shenzhen (CN)

(72) Inventors: Haifan Yin, Shenzhen (CN); Huangping Jin, Shanghai (CN); Shibin Ge, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 294 days.

(21) Appl. No.: 17/541,668

(22) Filed: Dec. 3, 2021

(65) Prior Publication Data

US 2022/0123793 A1  Apr. 21, 2022

Related U.S. Application Data

(63) Continuation of application No. PCT/CN2020/093895, filed on Jun. 2, 2020.

(30) Foreign Application Priority Data

Jun. 6, 2019 (CN) .......................... 201910493468.1

(51) Int. Cl.
  *H04B 1/10* (2006.01)
  *H04B 7/0417* (2017.01)
  *H04B 7/0456* (2017.01)

(52) U.S. Cl.
  CPC ......... *H04B 7/0417* (2013.01); *H04B 7/0456* (2013.01)

(58) Field of Classification Search
  CPC ........................... H04B 7/0417; H04B 7/0456
  (Continued)

(56) References Cited

U.S. PATENT DOCUMENTS

| | | | |
|---|---|---|---|
| 2014/0192918 A1 | 7/2014 | Park et al. | |
| 2019/0028254 A1* | 1/2019 | Nam | .................... H04L 5/0048 |
| 2019/0089434 A1 | 3/2019 | Rainish et al. | |

FOREIGN PATENT DOCUMENTS

| | | |
|---|---|---|
| CN | 104184537 A | 12/2014 |
| CN | 106972881 A | 7/2017 |

(Continued)

OTHER PUBLICATIONS

Huawei, HiSilicon, Discussion on CSI enhancement. 3GPP TSG RAN WG1 Meeting #97, R1-1906028, May 13-17, 2019, 18 pages, Reno, USA.

(Continued)

*Primary Examiner* — Zewdu A Kassa
(74) *Attorney, Agent, or Firm* — Slater Matsil, LLP

(57) ABSTRACT

This application provides a channel measurement method and a communications apparatus. The method includes: A terminal device generates first indication information and sends the first indication information to a network device, where the first indication information is determined based on received precoded reference signals of P ports and is used to indicate Q ports in the P ports; the P ports correspond to P angle-delay pairs; each angle-delay pair includes one angle vector and one delay vector; the precoded reference signal of each of the P ports is obtained by precoding a reference signal based on one angle vector and one delay vector; and the Q ports correspond to Q angle-delay pairs in the P angle-delay pairs.

20 Claims, 6 Drawing Sheets

(58) Field of Classification Search
USPC .................................. 375/349, 316, 295, 219
See application file for complete search history.

(56) References Cited

FOREIGN PATENT DOCUMENTS

| | | |
|---|---|---|
| CN | 107371241 A | 11/2017 |
| CN | 109391393 A | 2/2019 |
| CN | 109462462 A | 3/2019 |
| CN | 109495149 A | 3/2019 |
| CN | 111342873 A | 6/2020 |
| CN | 111342912 A | 6/2020 |
| CN | 111342913 A | 6/2020 |
| WO | 2018031924 A1 | 2/2018 |
| WO | 2019049110 A1 | 3/2019 |

OTHER PUBLICATIONS

Fei, H., "The Research of Broadband Microwave and Millimeter Wave Hardware Platform for Channel Measurement and Data Transmission", Southeast University, Sep. 2017, 3 pages.

3GPP TS 38.214 V15.5.0 (Mar. 2019), 3rd Generation Partnership Project; Technical Specification Group Radio Access Network; NR; Physical layer procedures for data(Release 15), 103 pages.

Ren, Y. et al., "Multiple-Beam Selection With Limited Feedback for Hybrid Beamforming in Massive MIMO Systems", IEEE Access ( vol. 5), Feb. 9, 2017, 9 pages.

\* cited by examiner

CHANNEL MEASUREMENT METHOD AND COMMUNICATIONS APPARATUS

CROSS-REFERENCE TO RELATED APPLICATIONS

This application is a continuation of International Application No. PCT/CN2020/093895, filed on Jun. 2, 2020, which claims priority to Chinese Patent Application No. 201910493468.1, filed on Jun. 6, 2019. The disclosures of the aforementioned applications are hereby incorporated by reference in their entireties.

TECHNICAL FIELD

This application relates to the wireless communications field, and more specifically, to a channel measurement method and a communications apparatus.

BACKGROUND

In a massive multiple-input multiple-output (Massive MIMO) technology, a network device may reduce interference between a plurality of users and interference between a plurality of signal flows of a same user through precoding. This helps improve signal quality, implement spatial multiplexing, and improve spectrum utilization.

Currently, a channel measurement method is known. A network device may precode a reference signal based on a plurality of beam vectors, and send precoded reference signals of a plurality of ports to a terminal device, so that the terminal device performs channel measurement based on the precoded reference signals. The terminal device may select, based on channel measurement, some ports from the plurality of ports and report the ports to the network device.

However, the terminal device needs to feed back a selected port based on each subband, leading to relatively high feedback overheads.

SUMMARY

This application provides a channel measurement method and a communications apparatus, to reduce feedback overheads.

According to a first aspect, a channel measurement method is provided. The method may be performed by a terminal device, or may be performed by a chip disposed in the terminal device.

Specifically, the method includes: generating first indication information, where the first indication information is determined based on received precoded reference signals of P ports and is used to indicate Q ports in the P ports; the P ports correspond to P angle-delay pairs; each of the P angle-delay pairs includes one angle vector and one delay vector; the precoded reference signal of each of the P ports is obtained by precoding a reference signal based on one angle vector and one delay vector; the Q ports correspond to Q angle-delay pairs in the P angle-delay pairs; P>Q≥1; and P and Q are both integers; and sending the first indication information.

Based on the foregoing technical solution, a network device precodes a downlink reference signal based on a predetermined angle vector and delay vector, so that the terminal device performs downlink channel measurement based on the precoded reference signal. A delay vector is introduced. A change of a channel in a plurality of frequency domain units may be represented by using a delay vector, and a reference signal is precoded based on the delay vector, so that the terminal device does not need to provide separate feedbacks based on each frequency domain unit. Therefore, feedback overheads can be reduced.

In addition, the network device loads the angle vector and the delay vector to the downlink reference signal, so that a process of measuring a downlink channel by the terminal device can be simplified. Therefore, complexity of calculation by the terminal device in the channel measurement process is reduced. Moreover, a precoding matrix is constructed through linear superposition of a plurality of space domain vectors and a plurality of frequency domain vectors, so that the precoding matrix determined by the network device can adapt to the downlink channel, thereby still ensuring relatively high feedback precision while reducing the feedback overheads.

With reference to the first aspect, in some implementations of the first aspect, when the first indication information is used to indicate the Q ports, the first indication information is specifically used to indicate an index of each of the Q angle-delay pairs corresponding to the Q ports.

Because the Q ports correspond to the Q angle-delay pairs, the terminal device may indicate the ports by indicating the angle-delay pairs. The indexes of the Q angle-delay pairs may be, for example, two-dimensional indexes or one-dimensional indexes. The indexes of the Q angle-delay pairs may alternatively be represented in a form of a bitmap. Specific content and a form of the first indication information are not limited in this application.

With reference to the first aspect, in some implementations of the first aspect, the method further includes: generating second indication information, where the second indication information is used to indicate weighting coefficients of the Q angle-delay pairs, and the Q angle-delay pairs and the weighting coefficients corresponding to the Q angle-delay pairs are used to determine a precoding matrix; and sending the second indication information.

The weighting coefficients of the Q angle-delay pairs are further indicated, so that the network device may further determine, based on the Q angle-delay pairs and the weighting coefficients corresponding to the Q angle-delay pairs, the precoding matrix used for downlink transmission. Therefore, the determined precoding matrix can match the downlink channel, which helps obtain better transmission performance.

With reference to the first aspect, in some implementations of the first aspect, the first indication information is further used to indicate a value of Q.

That is, the value of Q may be determined by the terminal device and reported to the network device.

With reference to the first aspect, in some implementations of the first aspect, the method further includes: receiving third indication information, where the third indication information is used to indicate a maximum value $Q_0$ of Q, $Q_0 \geq Q$, and $Q_0$ is a positive integer.

That is, the network device may also indicate a range of the maximum value of Q in advance by using signaling. The terminal device may directly determine $Q_0$ ports based on the maximum value $Q_0$, or may determine the Q ports based on the maximum value $Q_0$. This is not limited in this application.

According to a second aspect, a channel measurement method is provided. The method may be performed by a network device, or may be performed by a chip disposed in the network device.

Specifically, the method includes: receiving first indication information, where the first indication information is determined based on precoded reference signals of P ports and is used to indicate Q ports in the P ports; the P ports correspond to P angle-delay pairs; each of the P angle-delay pairs includes one angle vector and one delay vector; the precoded reference signal of each of the P ports is obtained by precoding a reference signal based on one angle vector and one delay vector; the Q ports correspond to Q angle-delay pairs in the P angle-delay pairs; P>Q≥1; and P and Q are both integers; and determining, based on the first indication information, the Q angle-delay pairs corresponding to the Q ports.

Based on the foregoing technical solution, the network device precodes a downlink reference signal based on a predetermined angle vector and delay vector, so that a terminal device performs downlink channel measurement based on the precoded reference signal. A delay vector is introduced. A change of a channel in a plurality of frequency domain units may be represented by using a delay vector, and a reference signal is precoded based on the delay vector, so that the terminal device does not need to provide separate feedbacks based on each frequency domain unit. Therefore, feedback overheads can be reduced.

In addition, the network device loads the angle vector and the delay vector to the downlink reference signal, so that a process of measuring a downlink channel by the terminal device can be simplified. Therefore, complexity of calculation by the terminal device in the channel measurement process is reduced. Moreover, a precoding matrix is constructed through linear superposition of a plurality of space domain vectors and a plurality of frequency domain vectors, so that the precoding matrix determined by the network device can adapt to the downlink channel, thereby still ensuring relatively high feedback precision while reducing the feedback overheads.

With reference to the second aspect, in some implementations of the second aspect, when the first indication information is used to indicate the Q ports, the first indication information is specifically used to indicate an index of each of the Q angle-delay pairs corresponding to the Q ports.

Because the Q ports correspond to the Q angle-delay pairs, the terminal device may indicate the ports by indicating the angle-delay pairs. The indexes of the Q angle-delay pairs may be, for example, two-dimensional indexes or one-dimensional indexes. The indexes of the Q angle-delay pairs may alternatively be represented in a form of a bitmap. Specific content and a form of the first indication information are not limited in this application.

With reference to the second aspect, in some implementations of the second aspect, the method further includes: receiving second indication information, where the second indication information is used to indicate weighting coefficients of the Q angle-delay pairs, and the Q angle-delay pairs and the weighting coefficients corresponding to the Q angle-delay pairs are used to determine a precoding matrix.

The weighting coefficients of the Q angle-delay pairs are further indicated, so that the network device may further determine, based on the Q angle-delay pairs and the weighting coefficients corresponding to the Q angle-delay pairs, the precoding matrix used for downlink transmission. Therefore, the determined precoding matrix can match the downlink channel, which helps obtain better transmission performance.

With reference to the second aspect, in some implementations of the second aspect, the first indication information is further used to indicate a value of Q.

That is, the value of Q may be determined by the terminal device and reported to the network device.

With reference to the second aspect, in some implementations of the second aspect, the method further includes: sending third indication information, where the third indication information is used to indicate a maximum value $Q_0$ of Q, $Q_0 \geq Q$, and $Q_0$ is a positive integer.

That is, the network device may also indicate a range of the maximum value of Q in advance by using signaling. The terminal device may directly determine $Q_0$ ports based on the maximum value $Q_0$, or may determine the Q ports based on the maximum value $Q_0$. This is not limited in this application.

With reference to the first aspect or the second aspect, in some implementations, the P angle-delay pairs are determined based on uplink channel measurement.

That is, the network device may use reciprocity between uplink and downlink channels to determine, based on uplink channel measurement, reciprocal angle vectors and delay vectors, and load the determined angle vectors and delay vectors to the downlink reference signal, thereby reducing complexity of measurement by the terminal device. In addition, the network device may select, from the P angle-delay pairs based on the Q ports fed back by the terminal device, Q stronger angle-delay pairs in the downlink channel, to precode a reference signal that is to be sent next time. Because a weighting coefficient of a stronger angle-delay pair has greater impact on the feedback precision, the feedback overheads can be reduced while the feedback precision is ensured, and a compromise between the feedback precision and the feedback overheads can be reached.

According to a third aspect, a channel measurement method is provided. The method may be performed by a terminal device, or may be performed by a chip disposed in the terminal device.

Specifically, the method includes: generating sixth indication information, where the sixth indication information is determined based on received precoded reference signals of P ports and is used to indicate Q ports in the P ports; the P ports correspond to P antenna-delay pairs; each of the P antenna-delay pairs includes one transmit antenna port and one delay vector; the precoded reference signal of each of the P ports is obtained by precoding a reference signal of one transmit antenna port based on one delay vector; the Q ports correspond to Q antenna-delay pairs in the P ports; P>Q≥1; and Q and P are both integers; and sending the sixth indication information.

Based on the foregoing technical solution, a network device precodes a downlink reference signal based on a predetermined delay vector, so that the terminal device performs downlink channel measurement based on the precoded reference signal. A delay vector is introduced. A change of a channel in a plurality of frequency domain units may be represented by using a delay vector, and a reference signal is precoded based on the delay vector, so that the terminal device does not need to provide separate feedbacks based on each frequency domain unit. Therefore, feedback overheads can be reduced.

In addition, the network device loads the delay vector to the downlink reference signal, so that a process of measuring a downlink channel by the terminal device can be simplified. Therefore, complexity of calculation by the terminal device in the channel measurement process is reduced. Moreover, a precoding matrix is constructed through linear superposition of a plurality of frequency domain vectors, so that the precoding matrix determined by the network device can adapt to the downlink channel, thereby still ensuring relatively high feedback precision while reducing the feedback overheads.

With reference to the third aspect, in some implementations of the third aspect, when the sixth indication information is used to indicate the Q ports, the sixth indication information is specifically used to indicate an index of each of the Q antenna-delay pairs corresponding to the Q ports.

Because the Q ports correspond to the Q antenna-delay pairs, the terminal device may indicate the ports by indicating the antenna-delay pairs. The indexes of the Q antenna-delay pairs may be, for example, two-dimensional indexes or one-dimensional indexes. The indexes of the Q antenna-delay pairs may alternatively be represented in a form of a bitmap. Specific content and a form of the first indication information are not limited in this application.

With reference to the third aspect, in some implementations of the third aspect, the method further includes: generating seventh indication information, where the seventh indication information is used to indicate weighting coefficients of the Q antenna-delay pairs, and the Q antenna-delay pairs and the weighting coefficients corresponding to the Q antenna-delay pairs are used to determine a precoding matrix; and sending the seventh indication information.

The weighting coefficients of the Q antenna-delay pairs are further indicated, so that the network device may further determine, based on the Q antenna-delay pairs and the weighting coefficients corresponding to the Q antenna-delay pairs, the precoding matrix used for downlink transmission. Therefore, the determined precoding matrix can match the downlink channel, which helps obtain better transmission performance.

With reference to the third aspect, in some implementations of the third aspect, the sixth indication information is further used to indicate a value of Q.

That is, the value of Q may be determined by the terminal device and reported to the network device.

With reference to the third aspect, in some implementations of the third aspect, the method further includes: receiving third indication information, where the third indication information is used to indicate a maximum value $Q_0$ of Q, $Q_0 \geq Q$, and $Q_0$ is a positive integer.

That is, the network device may also indicate a range of the maximum value of Q in advance by using signaling. The terminal device may directly determine $Q_0$ ports based on the maximum value $Q_0$, or may determine the Q ports based on the maximum value $Q_0$. This is not limited in this application.

According to a fourth aspect, a channel measurement method is provided. The method may be performed by a network device, or may be performed by a chip disposed in the network device.

Specifically, the method includes: receiving sixth indication information, where the sixth indication information is determined based on received precoded reference signals of P ports and is used to indicate Q ports in the P ports; the P ports correspond to P antenna-delay pairs; each of the P antenna-delay pairs includes one transmit antenna port and one delay vector; the precoded reference signal of each of the P ports is obtained by precoding a reference signal of one transmit antenna port based on one delay vector; the Q ports correspond to Q antenna-delay pairs in the P ports; $P>Q\geq 1$; and Q and P are both integers; and determining, based on the sixth indication information, the Q antenna-delay pairs corresponding to the Q ports.

Based on the foregoing technical solution, the network device precodes a downlink reference signal based on a predetermined delay vector, so that a terminal device performs downlink channel measurement based on the precoded reference signal. A delay vector is introduced. A change of a channel in a plurality of frequency domain units may be represented by using a delay vector, and a reference signal is precoded based on the delay vector, so that the terminal device does not need to provide separate feedbacks based on each frequency domain unit. Therefore, feedback overheads can be reduced.

In addition, the network device loads the delay vector to the downlink reference signal, so that a process of measuring a downlink channel by the terminal device can be simplified. Therefore, complexity of calculation by the terminal device in the channel measurement process is reduced. Moreover, a precoding matrix is constructed through linear superposition of a plurality of frequency domain vectors, so that the precoding matrix determined by the network device can adapt to the downlink channel, thereby still ensuring relatively high feedback precision while reducing the feedback overheads.

With reference to the fourth aspect, in some implementations of the fourth aspect, when the sixth indication information is used to indicate the Q ports, the sixth indication information is specifically used to indicate an index of each of the Q antenna-delay pairs corresponding to the Q ports.

Because the Q ports correspond to the Q antenna-delay pairs, the terminal device may indicate the ports by indicating the antenna-delay pairs. The indexes of the Q antenna-delay pairs may be, for example, two-dimensional indexes or one-dimensional indexes. The indexes of the Q antenna-delay pairs may alternatively be represented in a form of a bitmap. Specific content and a form of the first indication information are not limited in this application.

With reference to the fourth aspect, in some implementations of the fourth aspect, the method further includes: receiving seventh indication information, where the seventh indication information is used to indicate weighting coefficients of the Q antenna-delay pairs, and the Q antenna-delay pairs and the weighting coefficients corresponding to the Q antenna-delay pairs are used to determine a precoding matrix.

The weighting coefficients of the Q antenna-delay pairs are further indicated, so that the network device may further determine, based on the Q antenna-delay pairs and the weighting coefficients corresponding to the Q antenna-delay pairs, the precoding matrix used for downlink transmission. Therefore, the determined precoding matrix can match the downlink channel, which helps obtain better transmission performance.

With reference to the fourth aspect, in some implementations of the fourth aspect, the sixth indication information is further used to indicate a value of Q.

That is, the value of Q may be determined by the terminal device and reported to the network device.

With reference to the fourth aspect, in some implementations of the fourth aspect, the method further includes: receiving third indication information, where the third indication information is used to indicate a maximum value $Q_0$ of Q, $Q_0 \geq Q$, and $Q_0$ is a positive integer.

That is, the network device may also indicate a range of the maximum value of Q in advance by using signaling. The terminal device may directly determine $Q_0$ ports based on the maximum value $Q_0$, or may determine the Q ports based on the maximum value $Q_0$. This is not limited in this application.

With reference to the third aspect or the fourth aspect, in some implementations, the delay vectors in the P antenna-delay pairs are determined based on uplink channel measurement.

That is, the network device may use reciprocity between uplink and downlink channels to determine, based on uplink channel measurement, reciprocal angle vectors and delay vectors, and load the determined angle vectors and delay vectors to the downlink reference signal, thereby reducing complexity of measurement by the terminal device. In addition, the network device may select, from the P antenna-delay pairs based on the Q ports fed back by the terminal device, Q stronger antenna-delay pairs in the downlink channel, to precode a reference signal that is to be sent next time. Because a weighting coefficient of a stronger antenna-delay pair has greater impact on the feedback precision, the feedback overheads can be reduced while the feedback precision is ensured, and a compromise between the feedback precision and the feedback overheads can be reached.

According to a fifth aspect, a communications apparatus is provided. The communications apparatus includes modules or units configured to perform the method according to any one of the first aspect or the third aspect and the possible implementations of the first aspect or the third aspect.

According to a sixth aspect, a communications apparatus is provided. The communications apparatus includes a processor. The processor is coupled to a memory, and may be configured to execute instructions in the memory, to implement the method according to any one of the first aspect or the third aspect and the possible implementations of the first aspect or the third aspect. Optionally, the communications apparatus further includes the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip disposed in a terminal device. When the communications apparatus is the chip disposed in the terminal device, the communications interface may be an input/output interface.

Optionally, the transceiver may be a transceiver circuit. Optionally, the input/output interface may be an input/output circuit.

According to a seventh aspect, a communications apparatus is provided. The communications apparatus includes modules or units configured to perform the method according to any one of the second aspect or the fourth aspect and the possible implementations of the second aspect or the fourth aspect.

According to an eighth aspect, a communications apparatus is provided. The communications apparatus includes a processor. The processor is coupled to a memory, and may be configured to execute instructions in the memory, to implement the method according to any one of the second aspect or the fourth aspect and the possible implementations of the second aspect or the fourth aspect. Optionally, the communications apparatus further includes the memory. Optionally, the communications apparatus further includes a communications interface, and the processor is coupled to the communications interface.

In an implementation, the communications apparatus is a network device. When the communications apparatus is the network device, the communications interface may be a transceiver or an input/output interface.

In another implementation, the communications apparatus is a chip disposed in a network device. When the communications apparatus is the chip disposed in the network device, the communications interface may be an input/output interface.

Optionally, the transceiver may be a transceiver circuit. Optionally, the input/output interface may be an input/output circuit.

According to a ninth aspect, a processor is provided. The processor includes an input circuit, an output circuit, and a processing circuit. The processing circuit is configured to: receive a signal through the input circuit, and transmit a signal through the output circuit, to enable the processor to perform the method according to any one of the first aspect to the fourth aspect and the possible implementations of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to a tenth aspect, a processing apparatus is provided. The processing apparatus includes a processor and a memory. The processor is configured to: read instructions stored in the memory, receive a signal through a receiver, and transmit a signal through a transmitter, to perform the method according to any one of the first aspect to the fourth aspect and the possible implementations of the first aspect to the fourth aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus according to the tenth aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to an eleventh aspect, a computer program product is provided. The computer program product includes a computer program (which may also be referred to as code or an instruction), and when the computer program is run, a computer is enabled to perform the method according to any one of the first aspect to the fourth aspect and the possible implementations of the first aspect to the fourth aspect.

According to a twelfth aspect, a computer-readable medium is provided. The computer-readable medium stores a computer program (which may also be referred to as code or an instruction), and when the computer program is run on a computer, the computer is enabled to perform the method according to any one of the first aspect to the fourth aspect and the possible implementations of the first aspect to the fourth aspect.

According to a thirteenth aspect, a communications system is provided. The communications system includes the foregoing network device and terminal device.

DETAILED DESCRIPTION OF ILLUSTRATIVE EMBODIMENTS

The following describes the technical solutions in this application with reference to the accompanying drawings.

The technical solutions in the embodiments of this application may be applied to various communications systems such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a fifth generation (5G) system or a new radio (NR) system, vehicle-to-X (V2X), long term evolution-vehicle (LTE-V), an Internet of vehicles, machine type communication (MTC), an Internet of things (IoT), long term evolution-machine (LTE-M), and machine to machine (M2M), where V2X may include vehicle to network (V2N), vehicle to vehicle (V2V), vehicle to infrastructure (V2I), vehicle to pedestrian (V2P), or the like.

Figure 1:
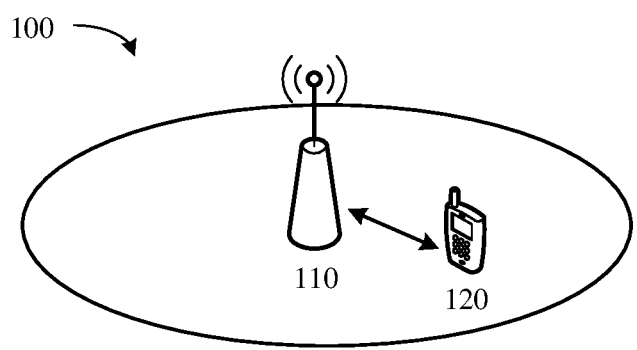
FIG. 1 is a schematic diagram of a communications system to which a channel measurement method according to an embodiment of this application is applicable.

For ease of understanding the embodiments of this application, a communications system shown in FIG. 1 is first used as an example to describe in detail a communications system to which the embodiments of this application are applicable. FIG. 1 is a schematic diagram of a communications system 100 to which a coefficient indication method for constructing a precoding matrix according to an embodiment of this application is applicable. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 may communicate with the terminal device 120 through a radio link. A plurality of antennas may be configured for each communications device such as the network device 110 or the terminal device 120. For each communications device in the communications system 100, the plurality of configured antennas may include at least one transmit antenna configured to send a signal and at least one receive antenna configured to receive a signal. Therefore, the communications devices in the communications system 100, for example, the network device 110 and the terminal device 120, may communicate with each other by using a multi-antenna technology.

It should be understood that, the network device in the communications system may be any device that has a wireless transceiver function. The network device includes but is not limited to an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like, or may be a gNB or a transmission point (TRP or TP) in a 5G system, for example, an NR system, or one antenna panel or a group of antenna panels (including a plurality of antenna panels) of a base station in a 5G system, or may be a network node, for example, a baseband unit (BBU) or a distributed unit (DU), that constitutes a gNB or a transmission point.

In some deployments, the gNB may include a centralized unit (CU) and the DU. The gNB may further include an active antenna unit (AAU). The CU implements some functions of the gNB, and the DU implements some functions of the gNB. For example, the CU is responsible for processing a non-real-time protocol and a non-real-time service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or may be classified into a network device in a core network (CN). This is not limited in this application.

It should be further understood that the terminal device in the wireless communications system may also be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The terminal device in the embodiments of this application may be a mobile phone, a tablet computer (pad), a computer having a wireless transceiver function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, a mobile terminal disposed in a vehicle, or the like. An application scenario is not limited in the embodiments of this application.

It should be further understood that FIG. 1 is merely a simplified schematic diagram used as an example for ease of understanding. The communications system 100 may further include another network device or another terminal device, which is not shown in FIG. 1.

For ease of understanding the embodiments of this application, the following briefly describes a processing process of a downlink signal at the physical layer before the downlink signal is sent. It should be understood that, the processing process of the downlink signal described below may be performed by the network device, or may be performed by a chip disposed in the network device. For ease of description, these devices are collectively referred to as network devices below.

The network device may process a codeword on a physical channel. The codeword may be a coded bit obtained through coding (for example, including channel coding). The codeword is scrambled (scrambling) to generate a scrambled bit. Modulation mapping is performed on the scrambled bit, to obtain a modulated symbol. The modulated symbol is mapped to a plurality of layers through layer mapping. The layer is also referred to as a transport layer. A modulated symbol obtained through the layer mapping is precoded, to obtain a precoded signal. The precoded signal is mapped to a plurality of resource elements (REs) through RE mapping. These REs are then transmitted through an antenna port after orthogonal multiplexing (OFDM) modulation is performed on the REs.

It should be understood that, the processing process of the downlink signal described above is merely an example for description, and this shall not constitute any limitation on this application. For a specific processing process of the downlink signal, refer to the conventional technology. For brevity, detailed descriptions of the specific process are omitted herein.

For ease of understanding the embodiments of this application, the following first briefly describes terms used in the embodiments of this application.

1. Precoding technology: The precoding technology is a signal processing manner in a physical layer processing process. For example, when a channel state is known, the network device may process a to-be-sent signal by using a precoding matrix that adapts to the channel state, thereby reducing complexity of eliminating inter-channel impact by a receiving device. Therefore, after the to-be-sent signal is precoded, quality (for example, a signal to interference plus noise ratio (SINR)) of a received signal can be improved. A sending device and a plurality of receiving devices can implement transmission on a same time-frequency resource by using the precoding technology. That is, multi-user multiple-input multiple-output (MU-MIMO) is implemented.

It should be understood that related descriptions of the precoding technology in this specification are merely examples for ease of understanding, and are not intended to limit the protection scope of the embodiments of this application. In a specific implementation process, the sending device may alternatively perform precoding in another manner. For example, when channel information (for example, but not limited to a channel matrix) cannot be learned of, precoding is performed by using a preset precoding matrix or through weighted processing. For brevity, specific content of the precoding manner is not further described in this specification.

2. Channel reciprocity: In a time division duplex (TDD) mode, on uplink and downlink channels, signals are transmitted on a same frequency domain resource and on different time domain resources. Within relatively short time (for example, channel propagation coherence time), it may be considered that signals on the uplink and downlink channels experience same channel fading. This is reciprocity between the uplink and downlink channels. Based on the reciprocity between the uplink and downlink channels, the network device may measure the uplink channel based on an uplink reference signal, for example, a sounding reference signal (SRS). In addition, the downlink channel may be estimated based on the uplink channel, so that a precoding matrix used for downlink transmission can be determined.

However, in a frequency division duplex (FDD) mode, because a frequency band interval between the uplink and downlink channels is far greater than a coherence bandwidth, and the uplink and downlink channels do not have complete reciprocity, the precoding matrix that is used for downlink transmission and that is determined by using the uplink channel may not adapt to the downlink channel. However, in the FDD mode, the uplink and downlink channels still have partial reciprocity, for example, angle reciprocity and delay reciprocity. Therefore, an angle and a delay may also be referred to as reciprocity parameters.

When a signal is transmitted through a radio channel, the signal may arrive at a receive antenna through a plurality of paths from a transmit antenna. A multipath delay spread causes frequency selective fading, that is, a change of a channel in frequency domain. A delay is transmission time of a radio signal on different transmission paths, is determined by a distance and a speed, and is irrelevant to a frequency domain of the radio signal. Therefore, delays on the uplink and downlink channels in the FDD mode may be considered to be the same, in other words, reciprocal.

In addition, an angle may be an angle of arrival (AOA) at which a signal arrives at a receive antenna through a radio channel, or may be an angle of departure (AOD) at which a signal is transmitted by using a transmit antenna. In the embodiments of this application, the angle may be an angle of arrival at which an uplink signal arrives at the network device, or may be an angle of departure at which the network device transmits a downlink signal. Because of reciprocity of transmission paths of the uplink and downlink channels at different frequencies, an angle of arrival of an uplink reference signal and an angle of departure of a downlink reference signal may be considered to be reciprocal.

Therefore, it may be considered that the delays and the angles on the uplink and downlink channels in the FDD mode have reciprocity. In the embodiments of this application, each angle may be represented by using one angle vector, and each delay may be represented by using one delay vector. Therefore, in the embodiments of this application, one angle vector may represent one angle, and one delay vector may represent one delay.

3. Reference signal (RS) and precoded reference signal: The reference signal may also be referred to as a pilot, a reference sequence, or the like. In the embodiments of this application, the reference signal may be a reference signal used for channel measurement. For example, the reference signal may be a channel state information reference signal (CSI-RS) or a sounding reference signal (SRS). It should be understood that the reference signals listed above are merely examples, and this shall not constitute any limitation on this application. This application does not exclude a possibility that another reference signal is defined in a future protocol to implement a same or similar function.

The precoded reference signal may be a reference signal obtained by precoding the reference signal. In the embodiments of this application, the precoding may specifically include beamforming and/or phase rotation. Beamforming may be implemented, for example, by precoding a reference signal based on one or more angle vectors. Phase rotation may be implemented, for example, by precoding a reference signal based on one or more delay vectors.

In the embodiments of this application, for ease of distinguishing and description, a reference signal obtained through precoding, for example, beamforming and/or phase rotation, is referred to as a precoded reference signal; and a reference signal that is not precoded is referred to as a reference signal for short.

In the embodiments of this application, precoding the downlink reference signal based on the one or more angle vectors may also be referred to as loading the one or more angle vectors to the downlink reference signal. Precoding the downlink reference signal based on the one or more delay vectors may also be referred to as loading the one or more delay vectors to the downlink reference signal.

4. Port: The port is also referred to as an antenna port. The port may be understood as a virtual antenna identified by a receiving device.

Optionally, the port may be a transmit antenna port. For example, a reference signal of each port may be a reference signal that is not precoded, or may be a precoded reference signal obtained by precoding a reference signal based on one delay vector. A quantity of ports may be a quantity of transmit antenna ports or a quantity of transmit antennas. The transmit antenna port may be an actual independent transceiver unit (TxRU).

Optionally, the port is a reference signal port after beamforming. For example, a reference signal of each port may be a precoded reference signal obtained by precoding a reference signal based on one angle vector, or may be a precoded reference signal obtained by precoding a reference signal based on one angle vector and one delay vector. A quantity of ports may be a quantity of reference signal ports or a quantity of angle vectors. It may be understood that, a quantity of reference signal ports after beamforming may be less than a quantity of transmit antenna ports.

A signal of each port may be transmitted by using one or more RBs.

In different embodiments shown below, the port sometimes refers to a transmit antenna port, and sometimes refers to a reference signal port. A specific meaning expressed by the port may be determined based on a specific embodiment.

5. Angle vector: The angle vector may be understood as a precoding vector used to perform beamforming on a reference signal. A transmitted reference signal may have specific spatial directivity through beamforming. Therefore, a process of precoding a reference signal based on an angle vector may also be considered as a space domain precoding process.

A quantity of ports of a precoded reference signal obtained by precoding a reference signal based on one or more angle vectors is the same as a quantity of the angle vectors. When the quantity of the angle vectors is less than a quantity of transmit antennas, dimension reduction of antenna ports can be implemented through space domain precoding, thereby reducing pilot overheads.

A length of the angle vector may be T, T is a quantity of transmit antenna ports in one polarization direction, and $T \geq 1$ and T is an integer.

Optionally, the angle vector is obtained from a discrete Fourier transform (DFT) matrix, for example, $$v_{i_1,i_2} \left[ u_{i_2} \; e^{j\frac{2\pi i_1}{O_1 I_1}} u_{i_2} \; \ldots \; e^{j\frac{2\pi i_1 (I_1-1)}{O_1 I_1}} u_{i_2} \right]^T$$

$$u_{i_2} = \begin{cases} \left[ 1 \; e^{j\frac{2\pi i_2}{O_2 I_2}} \; \ldots \; e^{j\frac{2\pi i_2 (I_2-1)}{O_2 I_2}} \right] & I_2 > 1 \\ 1 & I_2 = 1 \end{cases}.$$

$I_1$ is a quantity of antenna ports in a same polarization direction that are included in each column (or row) in an antenna array, and $I_2$ is a quantity of antenna ports in a same polarization direction that are included in each row (or column) in the antenna array. In the embodiments, $T = I_1 \times I_2$. $O_1$ and $O_2$ are oversampling factors. $i_1$ and $i_2$ satisfy that $0 \leq i_1 \leq (O_1 \times I_1 - 1)$ and $0 \leq i_2 \leq (O_2 \times I_2 - 1)$.

Optionally, the angle vector is a steering vector of a uniform linear array (ULA), for example, $$a(\theta_k) = \begin{bmatrix} 1 \\ e^{j\frac{2\pi}{\lambda} \cos\theta_k d} \\ \vdots \\ e^{j\frac{2\pi}{\lambda} \cos\theta_k (T-1)d} \end{bmatrix}.$$

$\theta_k$ is an angle, and k=1, 2, . . . , or K. K indicates the quantity of the angle vectors, $\lambda$ is a wavelength, and d is an antenna spacing.

The steering vector may indicate a phase difference between responses of angles of arrival of a path on different antennas. The steering vector $a(\theta_k)$ and a vector $V_{i_1,i_2}$ in the DFT matrix satisfy that $$\cos\theta_k d = \frac{i_1}{O_1 I_1}.$$

Optionally, the angle vector is a steering vector of a uniform plane array (UPA). The steering vector may be, for example, a steering vector that includes information about a horizontal angle and a pitch angle, for example, $$a(\theta_k, \varphi_k) = \begin{bmatrix} e^{j\frac{2\pi}{\lambda} u_k \rho_1} \\ e^{j\frac{2\pi}{\lambda} u_k \rho_2} \\ \vdots \\ e^{j\frac{2\pi}{\lambda} u_k \rho_T} \end{bmatrix}.$$

$\theta_k$ is the horizontal angle; $\theta_k$ is the pitch angle; $\rho_t$ is three-dimensional coordinates of a $t^{th}$ transmit antenna port, and t=1, 2, . . . , or T; and $u_k$ is a unit spherical basis vector corresponding to a $k^{th}$ angle:

$u_k = [\sin \varphi_k \cos \varphi_k \sin \varphi_k \sin \varphi_k \cos \varphi_k]$.

For ease of description below, the angle vector is denoted as $a(\theta_k)$.

It is assumed that the transmit antenna is a single-polarized antenna; the quantity of transmit antennas is T; and a quantity of frequency domain units is N, N≥1, and N is an integer. In this case, for a receive antenna, a channel may be a matrix whose dimensions are N×T. If space domain precoding is performed on a reference signal based on one angle vector, the angle vector may be loaded to the reference signal. Because dimensions of the angle vector are T×1, for a receive antenna, dimensions of a precoded channel may be N×1. That is, a received precoded reference signal may be represented as a matrix whose dimensions are N×1.

Because the reference signal to which the angle vector is loaded may be transmitted to the terminal device through a downlink channel, a channel measured by the terminal device based on the received precoded reference signal is equivalent to a channel to which the angle vector is loaded. For example, a downlink channel V to which the angle vector $a(\theta_k)$ is loaded may be represented as $Va(\theta_k)$.

Therefore, if space domain precoding is performed on a reference signal based on one angle vector, for each frequency domain unit on each receive antenna, dimensions of a channel estimated based on a precoded reference signal may be 1×1.

It should be understood that, the angle vector is a form that is proposed in this application and that is used to represent an angle. The angle vector is named merely for ease of distinguishing from the delay vector described below, and this shall not constitute any limitation on this application. This application does not exclude a possibility that another name is defined in a future protocol to represent a same or similar meaning.

It should be further understood that, merely for ease of understanding, the foregoing shows a possible implementation of precoding the reference signal based on the angle vector, but this shall not constitute any limitation on this application. This application does not exclude a possibility of precoding the reference signal based on the angle vector in another manner. A process in which the network device performs space domain precoding on the reference signal is implemented inside a device. This is not limited in this application.

6. Frequency domain unit: The frequency domain unit is a unit of a frequency domain resource, and may represent different frequency domain resource granularities. The frequency domain unit may include, for example, but not limited to, a subband, a resource block (RB), a resource block group (RBG), and a precoding resource block group (PRG).

In the embodiments of this application, the network device may determine, based on a feedback of the terminal device, a precoding matrix corresponding to each frequency domain unit.

In embodiments shown below, for ease of understanding and description, an RB is used as an example of a frequency domain unit to describe a channel measurement method provided in the embodiments of this application. For example, when an RB is used as an example of a frequency domain unit, it may be considered that each frequency domain unit includes only one RB used to carry a reference signal. Actually, each frequency domain unit may include one or more RBs used to carry a reference signal. When each frequency domain unit includes a plurality of RBs used to carry a reference signal, the network device may load a delay vector to the plurality of RBs used to carry a reference signal in each frequency domain unit. For brevity, in the following, it is assumed that each frequency domain unit includes only one RB used to carry a reference signal unless otherwise specified.

7. Delay vector: The delay vector is a vector that is proposed in this application and that may be used to indicate a change rule of a channel in frequency domain. As described above, a multipath delay causes frequency selective fading. It can be learned from Fourier transform that a time delay of a signal in time domain may be equivalent to a phase gradient in frequency domain.

For example, for a signal g(t), the signal may be transformed in frequency domain through Fourier transform: $F(g(t))=\int_{-\infty}^{+\infty}g(t)e^{j\omega t}dt$; and for a signal $g(t-t_0)$, the signal may be transformed in frequency domain through Fourier transform: $F(g(t-t_0))=\int_{-\infty}^{+\infty}g(t)e^{j\omega t}dt=e^{j\omega t_0}F(g(t))$. $\omega$ is a frequency variable, different frequencies correspond to different phase rotations, and t and $t-t_0$ indicate delays.

A signal of the two delays may be represented as $x(t=g(t)+g(t-t_0)$, and therefore, a function $X(\omega)=g(\omega)(1+e^{j\omega t_0})$ of the frequency variable may be obtained. Assuming that $g(\omega)\equiv 1$, $X(\omega)=1+e^{j\omega t_0}$ may be obtained. Therefore, signals of two different delays cause frequency selective fading.

Because a phase change of a channel in each frequency domain unit is related to a delay, a change rule of the phase of the channel in each frequency domain unit may be represented by using a delay vector. In other words, the delay vector may be used to represent a delay characteristic of the channel.

That the reference signal is precoded based on the delay vector may essentially mean that phase rotation is performed on each frequency domain unit in frequency domain based on an element in the delay vector, to pre-compensate, by using the precoded reference signal, a frequency selective characteristic caused by the multipath delay. Therefore, a process of precoding the reference signal based on the delay vector may be considered as a frequency domain precoding process.

Precoding a reference signal based on different delay vectors is equivalent to performing phase rotation on each frequency domain unit of a channel based on the different delay vectors. In addition, phase rotation angles of a same frequency domain unit may be different. To distinguish between different delays, the network device may precode a reference signal based on each of L delay vectors.

Optionally, a length of the delay vector is N, N is a quantity of frequency domain units that are in a frequency domain bandwidth occupied by a CSI measurement resource and that are used to carry a reference signal (for example, the precoded reference signal in the embodiments), N≥1, and N is an integer.

Optionally, an $l^{th}$ delay vector in the L delay vectors may be represented as $b(\tau_l)$, and $$b(\tau_l) = \begin{bmatrix} e^{-j2\pi f_1 \tau_l} \\ e^{-j2\pi f_2 \tau_l} \\ \vdots \\ e^{-j2\pi f_N \tau_l} \end{bmatrix}, l = 1, 2, \ldots, \text{ or } L;$$

L may indicate a quantity of delay vectors; and $f_1, f_2, \ldots,$ and $f_N$ represent carrier frequencies of the first, the second, ..., and an $N^{th}$ frequency domain unit, respectively.

Optionally, the delay vector is obtained from a DFT matrix, for example, $$u_k = \begin{bmatrix} 1 & e^{j\frac{2\pi k}{O_f N}} & \cdots & e^{j\frac{2\pi k(N-1)}{O_f N}} \end{bmatrix}^T.$$

Each vector in the DFT matrix may be referred to as a DFT vector.

$O_f$ is an oversampling factor, and $O_f \geq 1$; and k is an index of the DFT vector, and satisfies that $0 \leq k \leq O_f \times N-1$ or $1-O_f \times N \leq k \leq 0$ For example, when k<0, $b(\tau_l)$ and the vector $u_k$ in the DFT matrix may satisfy:

$$b(\tau_l) = u_k \beta_l \text{ and } \Delta f \tau_l = \frac{k}{O_f N},$$

where $\beta_l = e^{-j2\pi f \tau_l}$, $\Delta f = f_n - f_{n+1}$, and $1 \leq n \leq N-1$.

For ease of description below, the delay vector is denoted as $b(\tau_l)$.

If one frequency domain unit is one RB, or one frequency domain unit includes one RB used to carry a reference signal, the delay vector may be loaded to N RBs used to carry a reference signal.

For example, it is assumed that N=4, and a delay vector corresponding to a port is $$b(\tau_l) = \begin{bmatrix} e^{-j2\pi f_1 \tau_l} \\ e^{-j2\pi f_2 \tau_l} \\ e^{-j2\pi f_3 \tau_l} \\ e^{-j2\pi f_4 \tau_l} \end{bmatrix}.$$

The delay vector may be loaded to four RBs used to carry a reference signal. It should be understood that, the four RBs may be four consecutive RBs, that is, each RB is one frequency domain unit. Alternatively, the four RBs may be four RBs discretely distributed in a frequency domain resource, that is, each RB is an RB that is in a frequency domain unit to which each RB belongs and that is used to carry a reference signal. A relationship between the four RBs is not limited in this application.

It is assumed that the four RBs are an RB #1, an RB #2, an RB #3, and an RB #4 respectively. If a reference signal is precoded based on the delay vector $b(\tau_l)$, a precoded reference signal carried on the RB #1 may be obtained at least by precoding the reference signal based on an element $e^{-j2\pi f \tau_l}$; a precoded reference signal carried on the RB #2 may be obtained at least by precoding the reference signal based on an element $e^{-j2\pi f \tau_l}$; a precoded reference signal carried on the RB #3 may be obtained at least by precoding the reference signal based on an element $e^{-j2\pi f \tau_l}$; and a precoded reference signal carried on the RB #4 may be obtained at least by precoding the reference signal based on an element $e^{-j2\pi f \tau_l}$. The term "at least" is used because the reference signal of the port may be precoded based only on a delay vector, or may be precoded based on a delay vector and an angle vector. For brevity, descriptions of a same or similar case are omitted below.

If one frequency domain unit is a plurality of RBs, or one frequency domain unit includes a plurality of RBs used to carry a reference signal, the delay vector may be loaded to the plurality of RBs used to carry a reference signal.

For example, it is assumed that each frequency domain unit includes two RBs used to carry a reference signal, N=4, and a delay vector corresponding to a port is $$b(\tau_l) = \begin{bmatrix} e^{-j2\pi f_1 \tau_l} \\ e^{-j2\pi f_2 \tau_l} \\ e^{-j2\pi f_3 \tau_l} \\ e^{-j2\pi f_4 \tau_l} \end{bmatrix}.$$

The delay vector may be loaded to eight RBs used to carry a reference signal. Two RBs in a same frequency domain unit may correspond to a same element. It is assumed that the eight RBs in the four frequency domain units are respectively an RB #1 and an RB #2 that belong to a frequency domain unit #1, an RB #3 and an RB #4 that belong to a frequency domain unit #2, an RB #5 and an RB #6 that belong to a frequency domain unit #3, and an RB #7 and an RB #8 that belong to a frequency domain unit #4. If a reference signal is precoded based on the delay vector $b(\tau_l)$, precoded reference signals carried on the RB #1 and the RB #2 may be obtained at least by precoding the reference signal based on an element $e^{-j2\pi f \tau_l}$; precoded reference signals carried on the RB #3 and the RB #4 may be obtained at least by precoding the reference signal based on an element $e^{-j2\pi f \tau_l}$; precoded reference signals carried on the RB #5 and the RB #6 may be obtained at least by precoding the reference signal based on an element $e^{-j2\pi f \tau_l}$; and precoded reference signals carried on the RB #7 and the RB #8 may be obtained at least by precoding the reference signal based on an element $e^{-j2\pi f \tau_l}$. The reference signals obtained after the frequency domain precoding correspond to a same port.

Certainly, each frequency domain unit may alternatively include an RB used to carry reference signals of a plurality of ports. For example, when each frequency domain unit includes two RBs used to carry a reference signal, the two RBs may correspond to a same port. As described above, signals are obtained by performing precoding based on a same delay vector. Alternatively, the two RBs may correspond to two ports. For example, signals are obtained by performing precoding based on two different delay vectors. This is not limited in this application.

It should be understood that, merely for ease of understanding frequency domain precoding, the foregoing shows a correspondence between the elements in the delay vector and the RBs in each frequency domain unit. However, this is merely an example of a possible implementation of precoding a reference signal based on a delay vector, and this shall not constitute any limitation on this application. The correspondence between the elements in the delay vector and the RBs in each frequency domain unit shall not constitute any limitation on this application. In addition, this application does not exclude a possibility of precoding the reference signal based on the delay vector in another manner either. A process in which the network device performs frequency domain precoding on the reference signal is implemented inside the device. This is not limited in this application.

The frequency domain bandwidth occupied by the CSI measurement resource may be understood as a bandwidth used to transmit a reference signal, and the reference signal may be a reference signal used for channel measurement, for example, a CSI-RS. Signaling used to indicate the frequency domain bandwidth occupied by the CSI measurement resource may be, for example, a CSI-bandwidth occupation range (CSI-Frequency Occupation). The frequency domain bandwidth occupied by the CSI measurement resource may also be referred to as a pilot transmission bandwidth or a measurement bandwidth. For ease of description below, the frequency domain bandwidth occupied by the CSI measurement resource is referred to as the measurement bandwidth for short.

It should be understood that, the length N of the delay vector is merely a possible design, and this shall not constitute any limitation on this application. Lengths of different delay vectors are defined below with reference to different embodiments. Detailed descriptions thereof are omitted herein.

It is assumed that the transmit antenna is a single-polarized antenna, the quantity of transmit antennas is T, and the quantity of frequency domain units is N. In this case, for a receive antenna, a downlink channel may be represented as a matrix whose dimensions are N×T. If frequency domain precoding is performed on a reference signal based on a delay vector, N elements in the delay vector may be respectively loaded to reference signals carried on a plurality of RBs in the N frequency domain units.

Because the reference signal to which the delay vector is loaded may be transmitted to the terminal device through the downlink channel, a channel measured by the terminal device based on the received precoded reference signal is equivalent to a channel to which the delay vector is loaded. For example, a channel $V^{(n)}$ of an $n^{th}$ RB to which an $n^{th}$ element in the delay vector is loaded may be represented as $V^{(n)}e^{-j2\pi f\tau_l}$. It should be noted that, frequency domain precoding may be performed on the reference signal based on the delay vector before resource mapping, or after resource mapping. This is not limited in this application.

It should be understood that, the delay vector is a form that is proposed in this application and that is used to represent a delay. The delay vector is named merely for ease of distinguishing from the angle, and this shall not constitute any limitation on this application. This application does not exclude a possibility that another name is defined in a future protocol to represent a same or similar meaning.

8. Angle-delay pair: The angle-delay pair may be a combination of one angle vector and one delay vector. Each angle-delay pair may include one angle vector and one delay vector. Each angle-delay pair may be uniquely determined by using one angle vector and one delay vector. It should be understood that, the angle-delay pair may be understood as a representation form of a spatial-frequency basic unit determined by using one angle vector and one delay vector, but the angle-delay pair may not necessarily be a unique representation form. For example, the angle-delay pair may alternatively be represented as a spatial-frequency component matrix or a spatial-frequency component vector described below.

9. Spatial-frequency component matrix: One spatial-frequency component matrix may be determined by using one angle-delay pair. In other words, a spatial-frequency component matrix may be uniquely determined by using one angle vector and one delay vector. A spatial-frequency component matrix and an angle-delay pair may be mutually converted.

One spatial-frequency component matrix may be determined, for example, by a product of one angle vector and a conjugate transpose of one delay vector, for example, $a(\theta_k) \times b(\tau_l)^H$, and have dimensions of T×N.

It should be understood that, the spatial-frequency component matrix may be understood as another representation form of a spatial-frequency basic unit determined by using one angle vector and one delay vector. For example, the spatial-frequency basic unit may alternatively be represented as a spatial-frequency component vector. For example, the spatial-frequency component vector is determined by using a Kronecker product of one angle vector and one delay vector.

It should be further understood that, a specific form of the spatial-frequency basic unit is not limited in this application. Various possible forms determined by a person skilled in the art based on a same concept by using one angle vector and one delay vector shall all fall within the protection scope of this application. In addition, if definitions of the angle vector and the delay vector are different from those listed above, an operation relationship among the spatial-frequency component matrix, the angle vector, and the delay vector, and an operation relationship among the spatial-frequency component vector, the angle vector, and the delay vector may also be different. The operation relationship among the spatial-frequency component matrix, the angle vector, and the delay vector, and the operation relationship among the spatial-frequency component vector, the angle vector, and the delay vector are not limited in this application.

10. Spatial-frequency matrix: In the embodiments of this application, the spatial-frequency matrix is an intermediate quantity used to determine a precoding matrix. For each frequency domain unit, the precoding matrix may usually be a matrix whose dimensions are T×Z. Z represents a quantity of transport layers, and Z is an integer greater than or equal to 1.

In the embodiments of this application, the spatial-frequency matrix may be determined based on each receive antenna, or may be determined based on each transport layer.

If the spatial-frequency matrix is determined based on a receive antenna, the spatial-frequency matrix may be referred to as a spatial-frequency matrix corresponding to the receive antenna. The spatial-frequency matrix corresponding to the receive antenna may be used to construct a downlink channel matrix of each frequency domain unit, to determine a precoding matrix corresponding to each frequency domain unit. For example, a channel matrix corresponding to a frequency domain unit may be a conjugate transpose of a matrix constructed by using column vectors that correspond to a same frequency domain unit and that are in spatial-frequency matrices corresponding to receive antennas. For example, an $n^{th}$ column vector in the spatial-frequency matrix corresponding to each receive antenna is extracted, and a matrix whose dimensions are T×R may be obtained by arranging the column vectors from left to right in a sequence of the receive antennas. R indicates a quantity of the receive antennas, and R is an integer greater than or equal to 1. After a conjugate transpose of the matrix is obtained, a channel matrix $V^{(n)}$ of an $n^{th}$ frequency domain unit may be obtained. A relationship between the channel matrix and the spatial-frequency matrix is described in detail below, and detailed descriptions of the relationship between the channel matrix and the spatial-frequency matrix are omitted herein.

If the spatial-frequency matrix is determined based on a transport layer, the spatial-frequency matrix may be referred to as a spatial-frequency matrix corresponding to the transport layer. The spatial-frequency matrix corresponding to the transport layer may be directly used to determine a precoding matrix corresponding to each frequency domain unit. For example, a precoding matrix corresponding to a frequency domain unit may be constructed by using column vectors that correspond to a same frequency domain unit and that are in spatial-frequency matrices corresponding to transport layers. For example, an $n^{th}$ column vector in the spatial-frequency matrix corresponding to each transport layer is extracted, and a matrix whose dimensions are T×Z may be obtained by arranging the column vectors from left to right in a sequence of the transport layers. Z indicates a quantity of the transport layers, and Z is an integer greater than or equal to 1. The matrix may be used as a precoding matrix $W^{(n)}$ of an $n^{th}$ frequency domain unit.

A specific process of determining the precoding matrix based on the spatial-frequency matrix is described in detail in the following embodiments, and detailed descriptions of the specific process are omitted herein.

It should be noted that a precoding matrix determined according to a channel measurement method provided in the embodiments of this application may be a precoding matrix directly used for downlink data transmission. Alternatively, some beamforming methods, for example, including zero forcing (ZF), a minimum mean-squared error (MMSE), and a maximum signal-to-leakage-and-noise ratio (SLNR), may be used, to obtain a precoding matrix finally used for downlink data transmission. This is not limited in this application. All precoding matrices below may be precoding matrices determined based on the channel measurement method provided in this application.

In the embodiments of this application, the spatial-frequency matrix may be determined by using one or more angle-delay pairs. For example, the spatial-frequency matrix may be a weighted sum of one or more spatial-frequency component matrices. The spatial-frequency matrix may alternatively be converted into a form of a spatial-frequency vector, and the spatial-frequency vector may alternatively be a weighted sum of one or more spatial-frequency component vectors.

A type II codebook feedback manner is defined in the NR protocol TS38.214. An example of a feedback in the type II codebook feedback manner when a rank is 1 is shown below:

$$W = W_1 W_2 = \begin{bmatrix} a_0 v_0 & a_1 v_1 & a_2 v_2 & a_3 v_3 & & & & \\ & & & & a_4 v_0 & a_5 v_1 & a_6 v_2 & a_7 v_3 \end{bmatrix}$$

$$[c_0 \ c_1 \ c_2 \ c_3 \ c_4 \ c_5 \ c_6 \ c_7]^T$$

$$= \begin{bmatrix} a_0 c_0 v_0 + a_1 c_1 v_1 + a_2 c_2 v_2 + a_3 c_3 v_3 \\ a_4 c_4 v_0 + a_5 c_5 v_1 + a_6 c_6 v_2 + a_7 c_7 v_3 \end{bmatrix}.$$

W represents a to-be-fed-back precoding matrix in two polarization directions in one subband at one transport layer. $W_1$ may be fed back by using a wideband, and $W_2$ may be fed back by using a subband. $v_0$ to $v_3$ are beam vectors included in $W_1$, and the plurality of beam vectors may be indicated by using, for example, an index of a combination of the plurality of beam vectors. In the precoding matrix shown above, beam vectors in the two polarization directions are the same, and the beam vectors $v_0$ to $v_3$ are all used. $a_0$ to $a_7$ are wideband amplitude coefficients included in $W_1$, and may be indicated by using quantized values of the wideband amplitude coefficients. $c_0$ to $c_7$ are subband coefficients included in $W_2$, and each subband coefficient may include a subband amplitude coefficient and a subband phase coefficient. For example, $c_0$ to $c_7$ may include subband amplitude coefficients $\alpha_0$ to $\alpha_7$ and subband phase coefficients $\varphi_0$ to $\varphi_7$, respectively, and may be indicated by using quantized values of the subband amplitude coefficients $\alpha_0$ to $\alpha_7$ and quantized values of the subband phase coefficients $\varphi_0$ to $\varphi_7$, respectively.

Because the terminal device feeds back the amplitude coefficient and the phase coefficient based on each subband, relatively high feedback overheads are caused. Therefore, a feedback manner that is based on continuity in frequency domain and frequency selective fading caused by a multipath delay and in which a delay vector is used to describe a frequency domain change rule is proposed. The delay vector may also be understood as a vector used to indicate a delay characteristic of a channel.

The spatial-frequency matrix described above is an intermediate quantity that is proposed based on the continuity in frequency domain and that is used to construct a precoding matrix. A spatial-frequency matrix H may satisfy: $H=SCF^H$. S represents a matrix constructed by using one or more (for example, K) angle vectors, for example, $S=[a(\theta_1) \ a(\theta_2) \ldots a(\theta_K)]$; F represents a matrix constructed by using one or more (for example, L) delay vectors, for example, $F=[b(\tau_1) \ b(\tau_2) \ldots b(\tau_L)]$; and C represents a coefficient matrix constructed by using a weighting coefficient corresponding to each of the K angle vectors and each of the L delay vectors.

In the FDD mode, because of reciprocity between delays and angles on uplink and downlink channels, a spatial-frequency matrix $H_{UL}$ obtained through uplink channel measurement may be expressed as $H_{UL}=SC_{UL}F^H$, and a spatial-frequency matrix $H_{DL}$ obtained through downlink channel measurement may be expressed as $H_{DL}=SC_{DL}F^H$. Therefore, in the embodiments of this application, a coefficient matrix $C_{DL}$ corresponding to the downlink channel is determined and fed back through downlink channel measurement, to determine a precoding matrix that adapts to the downlink channel.

The foregoing formula $H_{DL}=SC_{DL}F^H$ is further transformed to obtain $S^H H_{DL}=C_{DL}F^H$, and $(H_{DL}^H S)^H=C_{DL}F^H$ is further obtained and is further transformed to obtain a coefficient matrix $C_{DL}=(H_{DL}^H S)^H F$. $H_{DL}^H$ is a spatial-frequency matrix determined by using an actual channel, and $H_{DL}^H S$ is an actual channel on which space domain precoding is performed. Each element in the coefficient matrix $C_{DL}$ may be determined by multiplying one row in $(H_{DL}^H S)^H$ by one column in F. In other words, each element in the coefficient matrix $C_{DL}$ may be obtained by multiplying one row in a conjugate transpose $(H_{DL}^H S)^H$ of the actual channel $H_{DL}^H S$ by one column in F, or multiplying a conjugate transpose of one column in the actual channel $H_{DL}^H S$ by one column in F.

Therefore, in the embodiments of this application, the spatial-frequency matrix $H_{DL}$ determined based on the weighting coefficient of each angle-delay pair fed back by the terminal device may be obtained by using the conjugate transpose of the actual channel. In other words, the spatial-frequency matrix in the embodiments of this application may alternatively be obtained by a conjugate transpose (namely, $V^H$) of the actual channel V.

From another perspective, in the embodiments of this application, it is defined that the spatial-frequency component matrix is determined by $a(\theta_k) \times b(\tau_l)^H$. Therefore, it may be determined that dimensions of the spatial-frequency matrix $H_{DL}$ are a quantity of transmit antennas×a quantity of frequency domain units, for example, dimensions of a spatial-frequency matrix corresponding to the downlink channel are T×N. In the following embodiments, unless otherwise specified, the spatial-frequency matrix is the matrix $H_{DL}$ whose dimensions are T×N described above.

However, this is not necessarily a spatial-frequency matrix determined by using an actual channel. Generally, dimensions of a channel matrix are defined as a quantity of receive antennas×a quantity of transmit antennas. For example, dimensions of the downlink channel are R×T. Dimensions of the spatial-frequency matrix determined by using the channel matrix are N×T, which are exactly opposite to the dimensions T×N of the foregoing spatial-frequency matrix $H_{DL}$. Therefore, in the embodiments of this application, the actual channel may be a conjugate transpose of a channel matrix determined by using the foregoing spatial-frequency matrix $H_{DL}$. A downlink channel matrix determined by using the spatial-frequency matrix $H_{DL}$ may be a conjugate transpose of the actual channel.

Further, a precoding matrix may be determined by using the spatial-frequency matrix $H_{DL}$. The precoding matrix of the $n^{th}$ frequency domain unit may be constructed by the $n^{th}$ column vector in the spatial-frequency matrix corresponding to each transport layer.

For example, SVD is performed on the channel matrix. A conjugate transpose of a precoding matrix may be obtained by performing SVD on a channel matrix V. However, if SVD is performed on a conjugate transpose of the channel matrix, that is, SVD is performed on $V^H$, the precoding matrix may be exactly obtained. Therefore, in the embodiments of this application, the spatial-frequency matrix $H_{DL}$ determined by using the conjugate transpose of the actual channel may be used to directly determine the precoding matrix corresponding to each frequency domain unit.

A detailed process of determining the channel matrix and the precoding matrix by using the spatial-frequency matrix $H_{DL}$ is described in detail in the following embodiments, and detailed descriptions of the specific process are omitted herein.

It should be understood that, a relationship between the actual channel and the spatial-frequency matrix $H_{DL}$ is not fixed. Different definitions of the spatial-frequency matrix and the spatial-frequency component matrix may change the relationship between the actual channel and the spatial-frequency matrix $H_{DL}$. For example, the spatial-frequency matrix $H_{DL}$ may be obtained based on the conjugate transpose of the actual channel, or may be obtained based on a transpose of the actual channel.

When the spatial-frequency matrix and the spatial-frequency component matrix are defined differently, operations performed by the network device when the delay and the angle are loaded are also different, and operations performed by the terminal device when the terminal device performs channel measurement and provides a feedback correspondingly change. However, these are only implementation behaviors of the terminal device and the network device, and this shall not constitute any limitation on this application. In the embodiments of this application, merely for ease of understanding, a case in which the spatial-frequency matrix is obtained based on the conjugate transpose of the actual channel is shown. The definition of the channel matrix, the dimensions and the definition of the spatial-frequency matrix, and a transformation relationship between the channel matrix and the spatial-frequency matrix are not limited in this application. Similarly, a transformation relationship between the spatial-frequency matrix and the precoding matrix is not limited in this application either.

11. Antenna-delay pair: The antenna-delay pair may be a combination of one transmit antenna port and one delay vector. Each antenna-delay pair may include one transmit antenna port and one delay vector. Transmit antenna ports and/or delay vectors included in any two antenna-delay pairs are different. In other words, each antenna-delay pair may be uniquely determined by using one transmit antenna port and one delay vector. It should be understood that, the antenna-delay pair may be understood as a representation form of a spatial-frequency basic unit determined by using one transmit antenna port and one delay vector, but is not necessarily a unique representation form. A representation form of a combination of a transmit antenna port and a delay vector is not limited in this application.

In addition, for ease of understanding the embodiments of this application, the following descriptions are provided.

First, for ease of understanding, the following briefly describes main parameters in this application.

P: P is a quantity of angle-delay pairs used by the network device to precode the reference signal, that is, a quantity of ports of a precoded reference signal sent by the network device by using a transmit antenna in one polarization direction, and P is an integer greater than 1.

Q: Q is a quantity of some ports selected by the terminal device from the P ports. In correspondence to P, the Q ports are some ports determined by the terminal device from the P ports based on a precoded reference signal sent by a transmit antenna in one polarization direction. $P > Q \geq 1$, and Q is an integer.

N: N is a quantity of frequency domain units, and N is an integer greater than or equal to 1.

T: T is a quantity of transmit antenna ports in a polarization direction, and T is an integer greater than or equal to 1.

K: K is a quantity of angle vectors, and K is an integer greater than or equal to 1.

L: L is a quantity of delay vectors, and L is an integer greater than or equal to 1.

R: R is a quantity of receive antennas, and R is an integer greater than 1.

Z: Z is a quantity of transport layers, and Z is an integer greater than or equal to 1.

J: J is a quantity of polarization directions of a transmit antenna, and J is an integer greater than 1.

Second, in the embodiments of this application, for ease of description, when numbering is involved, numbers may be consecutive and start from 1. For example, the L angle vectors may include the first angle vector to an $L^{th}$ angle vector, and the K delay vectors may include the first delay vector to a $K^{th}$ delay vector. Certainly, a specific implementation is not limited thereto. For example, numbers may alternatively be consecutive and start from 0. For example, the L angle vectors may include the zeroth angle vector to an $(L-1)^{th}$ angle vector, and the K delay vectors may include the zeroth delay vector to a $(K-1)^{th}$ delay vector.

It should be understood that, the foregoing descriptions are all provided for ease of describing the technical solutions provided in the embodiments of this application, but are not intended to limit the scope of this application.

Third, in this application, transformation of a matrix and a vector is involved in many places. For ease of understanding, unified descriptions are provided herein. An upper corner mark T indicates a transpose. For example, $A^T$ indicates a transpose of a matrix (or vector) A. An upper corner mark * represents a conjugate. For example, A* represents a conjugate of the matrix (or vector) A. An upper corner mark H represents a conjugate transpose. For example, $A^H$ represents a conjugate transpose of the matrix (or vector) A. For brevity, descriptions of a same or similar case are omitted below.

Fourth, in the embodiments shown below, an example in which both the angle vector and the delay vector are column vectors is used to describe the embodiments provided in this application. However, this shall not constitute any limitation on this application. Based on a same concept, a person skilled in the art may further figure out more possible representations.

Fifth, in this application, "being used to indicate" may include "being used to directly indicate" and "being used to indirectly indicate". When a piece of indication information is described as being used to indicate A, the indication information may directly indicate A or indirectly indicate A, but it does not necessarily indicate that the indication information carries A.

Information indicated by the indication information is referred to as to-be-indicated information. In a specific implementation process, the to-be-indicated information may be indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already known or pre-agreed on. For example, specific information may alternatively be indicated by using an arrangement sequence of a plurality of pieces of information that is pre-agreed on (for example, stipulated in a protocol), to reduce indication overheads to some extent. In addition, a common part of all pieces of information may be further identified and indicated in a unified manner, to reduce indication overheads caused by separately indicating same information. For example, a person skilled in the art should understand that a precoding matrix includes precoding vectors, and each precoding vector in the precoding matrix may have a same part in terms of composition or another attribute.

In addition, a specific indication manner may alternatively be various existing indication manners, for example, but not limited to, the foregoing indication manners and various combinations thereof. For details of various indication manners, refer to the conventional technology. Details are not described in this specification. It can be learned from the foregoing descriptions that, for example, when a plurality of pieces of information of a same type need to be indicated, manners of indicating different information may be different. In a specific implementation process, a required indication manner may be selected according to a specific requirement. The selected indication manner is not limited in the embodiments of this application. In this way, the indication manner in the embodiments of this application should be understood as covering various methods that can enable a to-be-indicated party to learn of the to-be-indicated information.

In addition, the to-be-indicated information may have another equivalent form. For example, a row vector may be represented as a column vector; a matrix may be represented by using a transposed matrix of the matrix; the matrix may alternatively be represented in a form of a vector or an array; and the vector or the array may be formed by connecting row vectors or column vectors in the matrix. The technical solutions provided in the embodiments of this application should be understood as covering various forms. For example, some or all features in the embodiments of this application should be understood as covering various representations of the features.

The to-be-indicated information may be sent as a whole, or may be divided into a plurality of pieces of sub-information for separate sending. In addition, sending periodicities and/or sending occasions of the sub-information may be the same or may be different. A specific sending method is not limited in this application. The sending periodicities and/or the sending occasions of the sub-information may be predefined, for example, predefined according to a protocol, or may be configured by a transmit end device by sending configuration information to a receive end device. The configuration information may include, for example, but not limited to, one or a combination of at least two of radio resource control signaling, media access control (MAC) layer signaling, and physical layer signaling. The radio resource control signaling includes, for example, radio resource control (RRC) signaling. The MAC layer signaling includes, for example, a MAC control element (CE). The physical layer signaling includes, for example, downlink control information (DCI).

Sixth, definitions listed in this application for many features (for example, a Kronecker product, a channel state information (CSI) report, a precoding matrix indicator (PMI), an RB, an angle, and a delay) are merely used to explain functions of the features by using an example. For detailed content thereof, refer to the conventional technology.

Seventh, the terms "first", "second", and various numbers in the following embodiments are merely used for distinguishing for ease of description, and are not intended to limit the scope of the embodiments of this application. For example, the terms are used to distinguish between different indication information.

Eighth, in the embodiments shown below, "being pre-obtained" may include "being indicated by a network device by using signaling" or "being predefined", for example, "being defined in a protocol". The "predefinition" may be implemented in a manner in which corresponding code, a table, or other related indication information may be pre-stored in a device (for example, including a terminal device and a network device). A specific implementation of the "predefinition" is not limited in this application.

Ninth, "storage" in the embodiments of this application may be storage in one or more memories. The one or more memories may be separately disposed, or may be integrated into an encoder or a decoder, a processor, or a communications apparatus. Alternatively, some of the one or more memories may be separately disposed, and some of the one or more memories are integrated into a decoder, a processor, or a communications apparatus. A type of the memory may be a storage medium in any form, and this is not limited in this application.

Tenth, a "protocol" in the embodiments of this application may be a standard protocol in the communications field, for example, may include an LTE protocol, an NR protocol, and a related protocol applied to a future communications system. This is not limited in this application.

Eleventh, "at least one" indicates one or more, and "a plurality of" indicates two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. The term "at least one of the following items (pieces)" or a similar expression thereof means any combination of these items, including any combination of singular items (pieces) or plural items (pieces). For example, at least one of a, b, and c may represent: a, b, c, a and b, a and c, b and c, or a, b, and c, where a, b, and c each may be singular or plural.

Twelfth, in the embodiments of this application, descriptions such as "when", "in a case", and "if" mean that a device (for example, the terminal device or the network device) performs corresponding processing in an objective situation, and are not intended to limit time, and the device (for example, the terminal device or the network device) is not required to perform a determining action during implementation, and do not mean any other limitation.

The following describes in detail the channel measurement method provided in the embodiments of this application with reference to the accompanying drawings.

It should be understood that, the method provided in the embodiments of this application may be applied to a system in which communication is performed by using a multi-antenna technology, for example, the communications system 100 shown in FIG. 1. The communications system may include at least one network device and at least one terminal device. The network device and the terminal device may communicate with each other by using the multi-antenna technology.

It should be further understood that, a specific structure of an execution body of the method provided in the embodiments of this application is not specifically limited in the embodiments shown below, provided that a program that records code of the method provided in the embodiments of this application can be run to perform communication according to the method provided in the embodiments of this application. For example, the execution body of the method provided in the embodiments of this application may be the terminal device or the network device, or a functional module that can invoke and execute the program in the terminal device or the network device.

Without loss of generality, interaction between the network device and the terminal device is used as an example below to describe in detail the channel measurement method provided in the embodiments of this application.

In an implementation, the network device may precode a downlink reference signal based on a predetermined angle vector and delay vector, so that the terminal device estimates and feeds back, based on a received precoded reference signal, a plurality of weighting coefficients corresponding to a plurality of angle-delay pairs. The network device may determine, based on the plurality of angle-delay pairs and the plurality of weighting coefficients fed back by the terminal device, a precoding matrix that adapts to a downlink channel.

In another implementation, the network device may precode a downlink reference signal based on a predetermined delay vector, so that the terminal device estimates and feeds back, based on a received precoded reference signal, a plurality of weighting coefficients corresponding to a plurality of antenna-delay pairs. The network device may determine, based on the plurality of antenna-delay pairs and the plurality of weighting coefficients fed back by the terminal device, a precoding matrix that adapts to a downlink channel.

For ease of understanding, in embodiments shown below, a precoded reference signal sent by a transmit antenna in one polarization direction is first used as an example to describe in detail a specific process in which the terminal device performs channel measurement and provides a feedback based on a precoded reference signal received by one receive antenna. Then, a transmit antenna in one polarization direction is extended to transmit antennas in a plurality of polarization directions, and one receive antenna is extended to a plurality of receive antennas, to describe in detail a specific process in which the terminal device feeds back Q ports and Q corresponding weighting coefficients to the network device. Then, the feedback based on the receive antenna is changed into a feedback based on the transport layer, to further describe a specific process in which the terminal device feeds back the Q ports and the Q corresponding weighting coefficients to the network device based on the transport layer. Finally, a specific process in which the network device determines a precoding matrix is separately described in detail for two cases: a feedback based on the receive antenna and a feedback based on a receive transport layer.

It should be understood that, when the embodiments of this application are described based on one polarization direction for the terminal device, the polarization direction may be any one of one or more polarization directions of a transmit antenna that are configured by the network device. In other words, for a precoded reference signal transmitted by a transmit antenna in any polarization direction, the terminal device may perform channel measurement based on the method provided in the embodiments of this application, or the network device may determine a precoding matrix based on the method provided in the embodiments of this application.

It should be further understood that, when the embodiments of this application are described based on one receive antenna for the terminal device, the receive antenna may be any one of one or more receive antennas that are configured for the terminal device. In other words, for a precoded reference signal received by any receive antenna, the terminal device may perform channel measurement based on the method provided in the embodiments of this application, or the network device may determine a precoding matrix based on the method provided in the embodiments of this application.

It should be further understood that, a quantity of polarization directions of a transmit antenna that are configured by the network device is not limited in this application. For example, there may be one polarization direction, namely, a single polarization direction, or there may be a plurality of polarization directions, for example, dual polarization directions. A quantity of receive antennas that are configured for the terminal device is not limited in this application either. For example, there may be one or more receive antennas.

Figure 2:
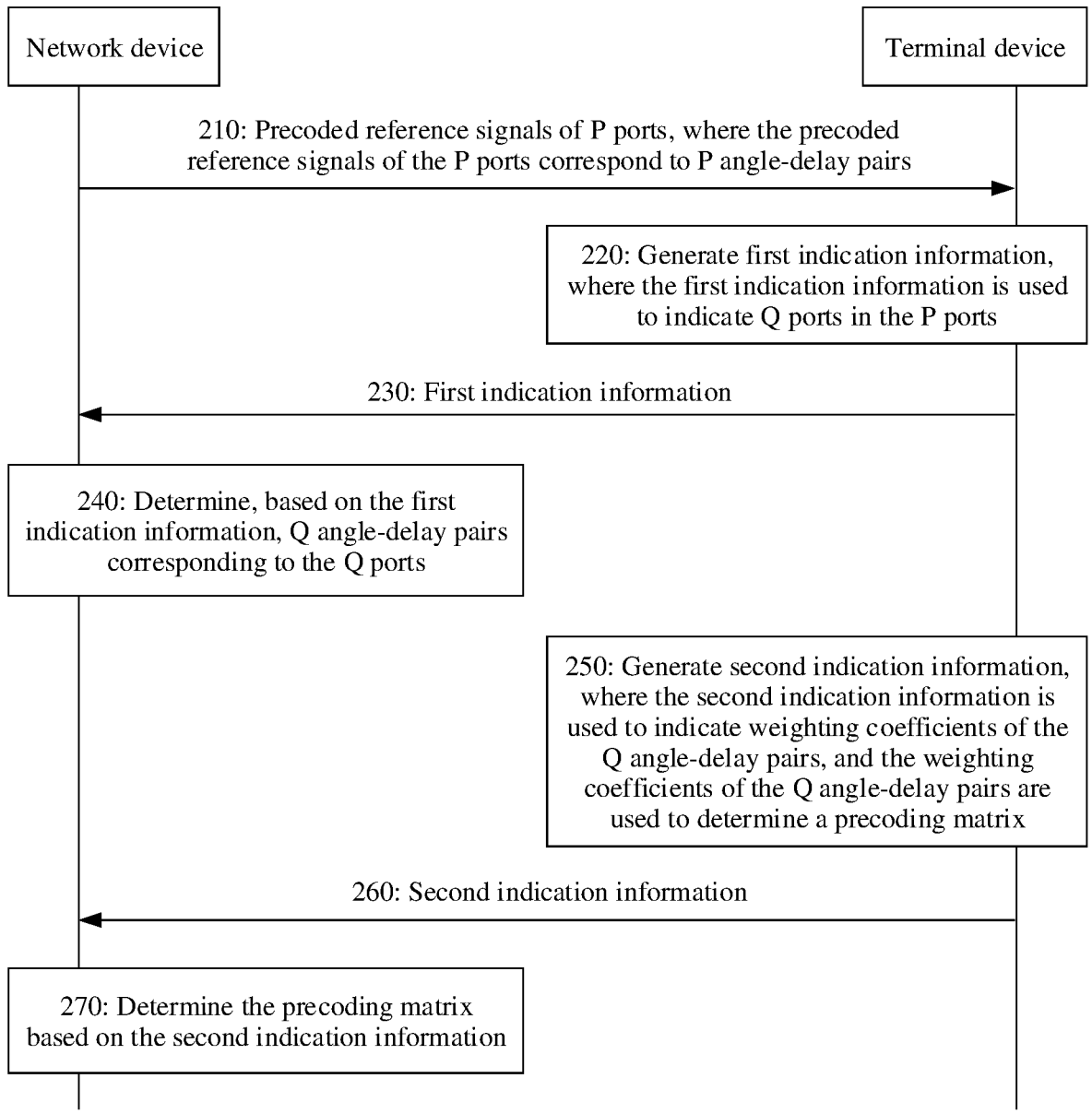
FIG. 2 is a schematic flowchart of a channel measurement method according to an embodiment of this application.

FIG. 2 is a schematic flowchart of a channel measurement method 200 according to an embodiment of this application from a perspective of device interaction. As shown in the figure, the method 200 may include operation 210 to operation 270. The following describes the operations in the method 200 in detail.

Step 210: A terminal device receives precoded reference signals of P ports, where the precoded reference signals of the P ports correspond to P angle-delay pairs. Correspondingly, a network device sends the precoded reference signals of the P ports, where the precoded reference signals of the P ports correspond to the P angle-delay pairs.

Specifically, each of the P angle-delay pairs includes one angle vector and one delay vector. In other words, each angle-delay pair is a combination of one angle vector and one delay vector. One angle vector and one delay vector can uniquely determine an angle-delay pair.

In this embodiment, the P angle-delay pairs may be obtained by combining K (where K is a positive integer) angle vectors and L (where L is a positive integer) delay vectors. In other words, a plurality of combinations of angle vectors and delay vectors may be obtained based on the K angle vectors and the L delay vectors. The plurality of combinations are different from each other. Angle vectors and/or delay vectors in any two of the plurality of combinations are different. The plurality of combinations may include the P angle-delay pairs.

The P angle-delay pairs correspond to the precoded reference signals of the P ports. The precoded reference signal of each port may correspond to one angle-delay pair. The precoded reference signal of each port may be obtained by precoding a reference signal based on an angle vector and a delay vector in a corresponding angle-delay pair.

In a possible implementation, the network device may traverse the K angle vectors and the L delay vectors, to obtain K×L combinations of angle vectors and delay vectors, or K×L angle-delay pairs. That is, P=K×L. That is, the network device may precode the reference signal based on each of the K angle vectors and each of the L delay vectors. When precoding the reference signal based on a $k^{th}$ ($1 \leq k \leq K$, and k is an integer) angle vector in the K angle vectors, the network device may traverse each of the L delay vectors to precode the reference signal. Alternatively, when precoding the reference signal based on an $l^{th}$ ($1 \leq l \leq L$, and l is an integer) delay vector in the L delay vectors, the network device may traverse each of the K angle vectors to precode the reference signal. In other words, the K angle vectors may be considered as being shared by all the delay vectors, and the L delay vectors may also be considered as being shared by all the angle vectors. That is, the K angle vectors and the L delay vectors are shared by each other.

In another possible implementation, delay vectors corresponding to at least two angle vectors are different. When precoding the reference signal based on a $k^{th}$ angle vector in the K angle vectors, the network device may traverse each of $L_k$ ($1 \leq L_k \leq L$, and $L_k$ is an integer) delay vectors corresponding to the $k^{th}$ angle vector, to precode the reference signal. That is, P=

$$\sum_{k=1}^{K} L_k.$$

The $L_k$ delay vectors may be some or all of the L delay vectors, that is, $L_k \leq L$. L in the L delay vectors may satisfy that $$L \leq \sum_{k=1}^{K} L_k.$$

Herein, that the delay vectors corresponding to the at least two angle vectors are different may mean that delay vectors corresponding to at least two of the K angle vectors are different, and delay vectors respectively corresponding to other angle vectors may be the same or may be different. This is not limited in this application. In other words, delay vectors corresponding to angle vectors are partially or completely different.

That delay vectors corresponding to two angle vectors are different may mean that the delay vectors corresponding to the two angle vectors are completely different, that is, the delay vectors corresponding to the two angle vectors are not repeated, or have no intersection. For example, a delay vector corresponding to an angle vector $a(\theta_1)$ includes $b(\tau_2)$, and delay vectors corresponding to an angle vector $a(\theta_1)$ include $b(\tau_1)$ and $b(\tau_3)$. That delay vectors corresponding to two angle vectors are different may alternatively mean that the delay vectors corresponding to the two angle vectors are partially different, that is, the delay vectors corresponding to the two angle vectors are partially repeated but are not completely the same, or the delay vectors corresponding to the two angle vectors have an intersection but are not completely the same. For example, delay vectors corresponding to $a(\theta_1)$ include $b(\tau_2)$ and $b(\tau_3)$, and delay vectors corresponding to an angle vector $a(\theta_2)$ include $b(\tau_1)$ and $b(\tau_3)$.

When delay vectors corresponding to any two of the K angle vectors are not repeated, $$L = \sum_{k=1}^{K} L_k.$$

When delay vectors corresponding to two or more of the K angle vectors are partially repeated, $$L < \sum_{k=1}^{K} L_k.$$

Therefore, the network device may obtain $$\sum_{k=1}^{K} L_k$$

combinations of angle vectors and delay vectors based on the K angle vectors and the L delay vectors.

In still another possible implementation, angle vectors corresponding to at least two delay vectors are different. When precoding the reference signal based on an $l^{th}$ delay vector in the L delay vectors, the network device may traverse each of $K_l$ ($1 \leq K_l \leq K$, and $K_l$ is an integer) angle vectors corresponding to the $l^{th}$ delay vector, to precode the reference signal. That is, P=

$$\sum_{l=1}^{L} K_l.$$

The $K_l$ angle vectors may be some or all of the K angle vectors, that is, $K_l \leq K$. K in the K angle vectors may satisfy that $$K \leq \sum_{l=1}^{L} K_l.$$

Herein, that the angle vectors corresponding to the at least two delay vectors are different may mean that angle vectors corresponding to at least two of the L delay vectors are different, and angle vectors respectively corresponding to other delay vectors may be the same or may be different. This is not limited in this application. In other words, angle vectors corresponding to delay vectors are partially or completely different.

That angle vectors corresponding to two delay vectors are different may mean that the angle vectors corresponding to the two delay vectors are completely different, that is, the angle vectors corresponding to the two delay vectors are not repeated, or have no intersection. For example, an angle vector corresponding to a delay vector $b(\tau_1)$ includes $a(\theta_2)$, and an angle vector corresponding to a delay vector $b(\tau_2)$ includes $a(\theta_1)$. That angle vectors corresponding to two delay vectors are different may alternatively mean that the angle vectors corresponding to the two delay vectors are partially different, that is, the angle vectors corresponding to the two delay vectors are partially repeated but are not completely the same, or the angle vectors corresponding to the two delay vectors have an intersection but are not completely the same. For example, an angle vector corresponding to a delay vector $b(\tau_1)$ includes $a(\theta_2)$, and angle vectors corresponding to a delay vector $b(\tau_2)$ include $a(\theta_1)$ and $a(\theta_2)$. When angle vectors corresponding to any two of the L delay vectors are not repeated, $$K = \sum_{l=1}^{L} K_l.$$

When angle vectors corresponding to two or more of the L delay vectors are partially repeated, $$K < \sum_{l=1}^{L} K_l.$$

Therefore, the network device may obtain $$\sum_{l=1}^{L} K_l$$

combinations of angle vectors and delay vectors based on the K angle vectors and the L delay vectors.

It should be understood that, the foregoing lists a correspondence between an angle vector and a delay vector merely for ease of understanding. However, this shall not constitute any limitation on this application. The correspondence between an angle vector and a delay vector is not limited in this application.

Figure 3:
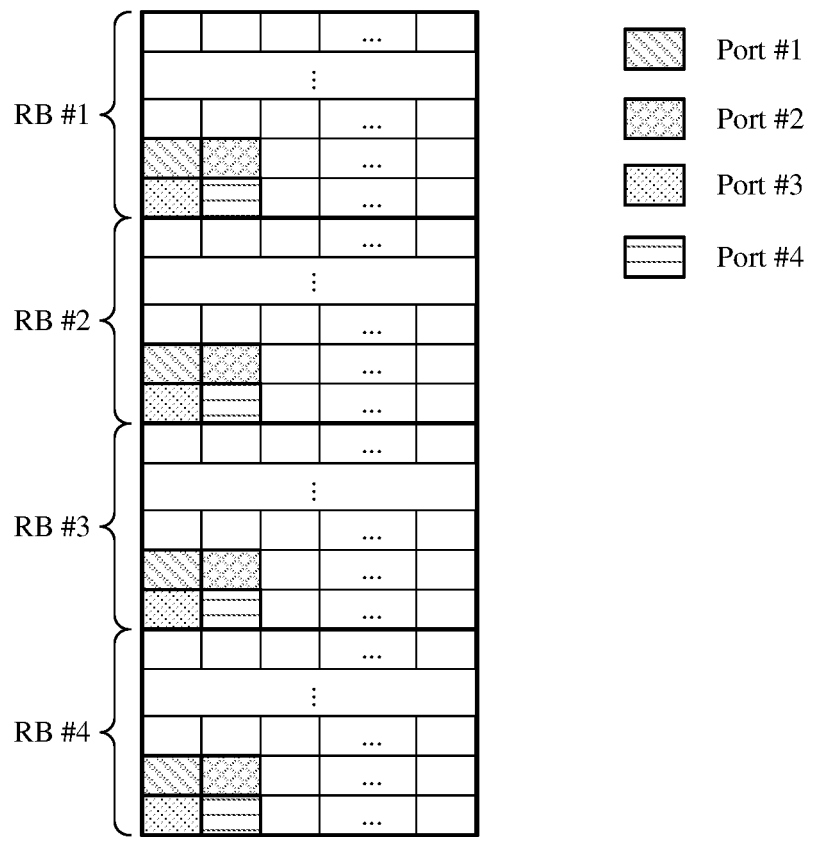
FIG. 3 is a schematic diagram of a correspondence between a plurality of ports and a plurality of angle-delay pairs according to an embodiment of this application.

For ease of understanding, FIG. 3 shows an example in which a plurality of ports correspond to a plurality of angle-delay pairs. As shown in FIG. 3, a plurality of RBs shown in FIG. 3 carry reference signals of four ports, that is, P=4. For example, the reference signals of the four ports may be obtained through precoding based on one delay vector and four angle vectors, that is, L=1 and K=4. Alternatively, the reference signals of the four ports may be obtained through precoding based on two delay vectors and two angle vectors, that is, L=2 and K=2. Alternatively, the reference signals of the four ports may be obtained through precoding based on four delay vectors and one angle vector, that is, L=4 and K=1. Alternatively, the reference signals of the four ports may be obtained through precoding based on two angle vectors and two delay vectors corresponding to each angle vector, that is, L=2 and $K_1=K_2=2$. Alternatively, the reference signals of the four ports may be obtained through precoding based on two delay vectors and two angle vectors corresponding to each delay vector, that is, K=2 and $L_1=L_2=2$. This is not limited in this application.

It should be understood that, the four RBs shown in FIG. 3 are an example of a reference signal resource. The four RBs may be considered as a same reference signal resource. However, this is merely an example, and this shall not constitute any limitation on a quantity of RBs included in the reference signal resource. It should be further understood that, a quantity of ports is relative to the reference signal resource, and is irrelevant to the quantity of RBs included in the reference signal resource. The reference signal resource may include more or fewer RBs. The precoded reference signals of the four ports may alternatively be carried on more or fewer RBs, and a quantity of ports corresponding to the precoded reference signal carried on each RB may be P.

As shown in the figure, precoded reference signals of a same port occupy a same RE in all the RBs, in other words, relative positions of resources occupied by the precoded reference signals of the same port in all the RBs are the same. REs occupied by precoded reference signals of different ports in a same RB may be different, for example, may be distinguished in a frequency division multiplexing (FDM) or time division multiplexing (TDM) manner. Alternatively, REs occupied by precoded reference signals of different ports in a same RB may be the same, for example, may be distinguished in a code division multiplexing (CDM) manner. The figure is merely an example, and shows an example in which a port #1 and a port #2 are distinguished from a port #3 and a port #4 through FDM, and the port #1 and the port #3 are distinguished from the port #2 and the port #4 through TDM.

It should be understood that, FIG. 3 is merely an example for ease of understanding, and does not completely show all REs in one RB. A quantity of REs in each RB is not limited in this application. In addition, a quantity of ports corresponding to a precoded reference signal carried on each RB and a specific resource multiplexing manner of the precoded reference signals of the ports are not limited in this application.

It should be further understood that, the four RBs shown in FIG. 3 may be four consecutive RBs, or may be four RBs discretely distributed in a frequency domain resource. This is not limited in this application. In other words, one RB may be one frequency domain unit, or one RB may be a part of the frequency domain unit.

Because of reciprocity between angles and delays on uplink and downlink channels, optionally, the K angle vectors and the L delay vectors may all be determined by the network device based on uplink channel measurement.

Specifically, the network device may determine K (where K≥1, and K is an integer) angles and L (where L≥1, and L is an integer) delays based on an uplink channel matrix obtained through pre-estimation. The K angles may be represented by using the K angle vectors. The L delays may be represented by using the L delay vectors. The uplink channel matrix may be a weighted sum of K×L spatial-frequency matrices determined by using the K angle vectors and the L delay vectors. For ease of description below, it is assumed that P=K×L, and P is a positive integer.

For example, the K angle vectors may be K stronger angle vectors determined from a predefined angle vector set. The K angle vectors may be jointly determined for the L delay vectors, or may be separately determined for each of the L delay vectors. This is not limited in this application. Optionally, each angle vector in the angle vector set is obtained from a DFT matrix. For example, the K angle vectors may be determined by performing DFT on the uplink channel matrix. Optionally, each angle vector in the angle vector set is a steering vector.

For example, the L delay vectors may be L stronger delay vectors determined from a predefined delay vector set. The L delay vectors may be jointly determined for the K angle vectors, or may be separately determined for each of the K angle vectors. This is not limited in this application. Optionally, each delay vector in the delay vector set is obtained from a DFT matrix. For example, the L delay vectors may be determined by performing DFT on the uplink channel matrix.

For example, the network device may determine, by using a joint angle and delay estimation (JADE) algorithm in the conventional technology, the K angle vectors and one or more stronger delay vectors corresponding to each angle vector. Specifically, the estimation algorithm may be, for example, a multiple signal classification algorithm (MUSIC), a Bartlett algorithm, or an estimation of signal parameters via rotation invariant technique algorithm (ESPRIT). Alternatively, the network device may perform DFT on a spatial-frequency matrix that is determined based on uplink channel measurement, to determine the K angle vectors and the L delay vectors. A specific method for determining the K angle vectors and the L delay vectors by the network device is not limited in this application.

An example in which DFT is performed on the spatial-frequency matrix is used. It is assumed that both the angle vector and the delay vector are obtained from the DFT matrices. For example, the predefined angle vector set may be a vector set including a plurality of vectors in a space-domain DFT matrix. For ease of distinguishing, the vector set is referred to as an angle vector set $U_s$, and $U_s = [u_{s,1}\ u_{s,2}\ \ldots\ u_{s,T}]$. For example, the predefined delay vector set may be a vector set including a plurality of vectors in a frequency-domain DFT matrix. For ease of distinguishing, the vector set is referred to as a delay vector set $U_f$, and $U_f = [u_{f,1}\ u_{f,2}\ \ldots\ u_{f,N}]$.

The network device may determine an uplink channel through channel estimation, and further determine a spatial-frequency matrix $H_{UL}$ of the uplink channel. The network device may perform space-domain DFT transform and frequency-domain DFT transform on the spatial-frequency matrix $H_{UL}$ that is obtained through uplink channel estimation, to obtain a coefficient matrix $C_{UL}$ as follows: $C_{UL} = U_s^H H_{UL} U_f$. For ease of understanding, dimensions of the spatial-frequency matrix $H_{UL}$ of the uplink channel are kept consistent with dimensions of a spatial-frequency matrix $H_{DL}$ of a downlink channel herein. The foregoing has described the dimensions of the spatial-frequency matrix of the downlink channel and a relationship between the dimensions and the downlink channel. The dimensions of the spatial-frequency matrix $H_{UL}$ determined by using the uplink channel may be N×T.

It should be understood that, the dimensions of the spatial-frequency matrix $H_{UL}$ of the uplink channel and the calculation formula used to determine the coefficient matrix $C_{UL}$ that are shown herein are merely examples, and this shall not constitute any limitation on this application. If different dimensions are defined for the spatial-frequency matrix $H_{UL}$, calculation formulas used to determine the coefficient matrix $C_{UL}$ are also different.

The network device may determine K stronger rows from the coefficient matrix $C_{UL}$. The K stronger rows may be used to determine the K angle vectors. For example, the network device may determine, based on a quadratic sum of moduli of elements in each row in the coefficient matrix $C_{UL}$, K rows with larger quadratic sums of the moduli. The K rows with the larger quadratic sums of the moduli may be used to determine the K angle vectors. Positions of the K rows in the coefficient matrix $C_{UL}$ may be used to determine positions of the K angle vectors in the angle vector set. For example, row sequence numbers of the K rows in the coefficient matrix $C_{UL}$ may be column sequence numbers of the K angle vectors in the angle vector set. Therefore, the K angle vectors may be determined. The K angle vectors are angle vectors selected from the angle vector set and used to precode a downlink reference signal. The network device may determine, based on a quadratic sum of moduli of elements in each column in the coefficient matrix $C_{UL}$, L columns with larger quadratic sums of the moduli. The L columns with the larger quadratic sums of the moduli may be used to determine the L delay vectors. Positions of the L columns in the coefficient matrix $C_{UL}$ may be used to determine positions of the L delay vectors in the delay vector set. For example, column sequence numbers of the L columns in the coefficient matrix $C_{UL}$ may be column sequence numbers of the L delay vectors in the delay vector set. Therefore, the L delay vectors may be determined. The L delay vectors are delay vectors selected from the delay vector set and used to decode the downlink reference signal.

Alternatively, the network device may determine one or more stronger delay vectors based on each of the K stronger rows in the coefficient matrix $C_{UL}$. For example, for a $k^{th}$ row in the K rows, the network device may determine, based on a square of a modulus of each element, one or more elements with squares of moduli being greater than a preset value, for example, $L_k$ elements. The preset value may be, for example, a predefined value. For example, the preset value may be 80% of a quadratic sum of the moduli of the elements in this column. The $L_k$ elements with the squares of the moduli being greater than the preset value may be used to determine $L_k$ delay vectors. For example, columns in which the $L_k$ elements with the squares of the moduli being greater than the preset value are located in the coefficient matrix $C_{UL}$ may be used to determine positions of the $L_k$ delay vectors in the predefined delay vector set. For example, column sequence numbers of the $L_k$ elements in the coefficient matrix $C_{UL}$ may be column sequence numbers of the $L_k$ delay vectors in the delay vector set. For the K angle vectors, a total quantity of delay vectors may be L. The L delay vectors are delay vectors selected from the delay vector set.

It should be understood that, merely for ease of understanding, the foregoing lists several possible methods that may be used by the network device to determine the K angle vectors and the L delay vectors. However, this shall not constitute any limitation on this application. A specific implementation of determining the K angle vectors and the L delay vectors by the network device is not limited in this application.

In addition, for example, the uplink channel matrix may be obtained by the network device through estimation based on an uplink reference signal, for example, an SRS, that is received in advance, or obtained based on a correctly decoded data signal. This is not limited in this application. For a specific method for obtaining the uplink channel matrix through estimation by the network device based on the uplink reference signal, refer to the conventional technology. For brevity, detailed descriptions of the specific method are omitted herein.

In an FDD mode, angles and delays on uplink and downlink channels may be reciprocal. Therefore, the K angle vectors and the L delay vectors that are obtained through uplink channel measurement may be loaded to the downlink reference signal, so that the terminal device performs downlink channel measurement based on the received precoded reference signal. Certainly, the K angle vectors obtained through uplink channel measurement may alternatively be loaded to the downlink reference signal, or the L delay vectors obtained through uplink channel measurement may alternatively be loaded to the downlink reference signal. In this embodiment, a case in which the K angle vectors and the L delay vectors are loaded to the downlink reference signal is mainly described in detail.

It should be understood that, determining the K angle vectors and the L delay vectors based on uplink channel measurement is not a unique implementation. For example, the K angle vectors and the L delay vectors may be predefined, for example, defined in a protocol; or may be determined by the network device through statistics collection based on a result fed back in one or more previous downlink channel measurements. A manner of obtaining the K angle vectors and the L delay vectors is not limited in this application.

The network device may precode the downlink reference signal such as a CSI-RS based on the K angle vectors and the L delay vectors, to obtain a precoded reference signal. The precoded reference signal obtained by the network device through precoding based on the K angle vectors and the L delay vectors may be sent by using a transmit antenna in one polarization direction, or may be sent by using transmit antennas in a plurality of polarization directions. This is not limited in this application. Optionally, when the network device sends, by using the transmit antennas in the plurality of polarization directions, the precoded reference signal obtained through precoding based on the K angle vectors and the L delay vectors, a quantity of ports of the precoded reference signal may be multiplied. For example, when the transmit antenna is in a single polarization direction, a quantity of ports of the sent precoded reference signal is P; when the transmit antenna is in dual polarization directions, a quantity of ports of the sent precoded reference signal is 2P.

The network device may transmit the precoded reference signal by using a preconfigured reference signal resource. When receiving the precoded reference signal from the network device, the terminal device may determine a time-frequency resource of the precoded reference signal of each port based on a predefined pilot pattern, and may receive the precoded reference signal of each port on the corresponding time-frequency resource.

The terminal device may perform channel measurement based on the received reference signal of each port. A port that can be identified by the terminal device is a port corresponding to the reference signal. Therefore, the terminal device may perform channel estimation and measurement based on each port.

Step 220: The terminal device generates first indication information, where the first indication information is used to indicate Q ports in the P ports.

Specifically, the P ports correspond to the P angle-delay pairs described above. The Q ports are some of the P ports, Q<P, and Q is a positive integer. In other words, the terminal device may indicate some of the Q ports to the network device. The Q ports may be stronger ports in the P ports. The terminal device may perform downlink channel measurement based on the received reference signals of the P ports, estimate channels of the P ports, and feed back the Q stronger ports to the network device.

A weighted sum of the P angle-delay pairs obtained by the terminal device by performing channel measurement based on the reference signals of the P ports may be used to determine a downlink channel. In the P angle-delay pairs, impact of an angle-delay pair with a larger weighting coefficient on feedback precision is greater than impact of an angle-delay pair with a smaller weighting coefficient on the feedback precision. Therefore, the terminal device may select, from the P angle-delay pairs, Q angle-delay pairs with larger weighting coefficients for a feedback, thereby helping reduce feedback overheads while ensuring the feedback precision.

It should be noted that, when receiving the precoded reference signal and performing channel measurement based on the received precoded reference signal, the terminal device may perform receiving and measurement based on different port numbers. The terminal device does not learn of or does not need to learn of angle vectors and delay vectors that are used by the network device to precode the reference signal. When precoding the reference signal, the network device may determine a correspondence among each angle vector, a delay vector, and a port. In addition, when the reference signal is transmitted, a correspondence between each port and a time-frequency resource may also be learned of. Therefore, the terminal device indicates the Q ports to the network device, and the network device may determine Q corresponding angle-delay pairs based on the Q ports.

A value of Q may be predefined, for example, defined in a protocol; or may be preconfigured by the network device, for example, indicated by the network device in advance by using signaling; or may be determined by the terminal device. This is not limited in this application.

If the value of Q is determined by the terminal device, the terminal device may further indicate the value of Q by using the first indication information. Optionally, the first indication information is further used to indicate the value of Q.

If the value of Q is indicated by the network device, the network device and the terminal device may pre-agree on whether the terminal device reports a corresponding quantity of ports according to an indication of the network device.

For example, the network device and the terminal device may pre-agree on that the terminal device may further determine the quantity of reported ports according to the indication of the network device. In this case, the network device may indicate a maximum value $Q_0$ of Q in advance by using signaling, and the terminal device may report the Q ports based on $Q_0$, where $Q \leq Q_0$, and $Q_0$ is a positive integer.

Optionally, the method further includes: The network device sends third indication information, where the third indication information is used to indicate the maximum value $Q_0$ of Q. Correspondingly, the terminal device receives the third indication information, where the third indication information is used to indicate the maximum value $Q_0$ of Q.

If the terminal device further determines the value of Q based on the maximum value $Q_0$, the terminal device may indicate the value of Q by using the first indication information. Certainly, Q may alternatively be equal to $Q_0$. This is not limited in this application.

For another example, the network device and the terminal device may pre-agree on that the terminal device needs to report a corresponding quantity of ports according to the indication of the network device. That is, the network device may indicate the value of Q in advance by using signaling, and the terminal device reports the Q ports.

Optionally, the method further includes: The network device sends third indication information, where the third indication information is used to indicate the value of Q. Correspondingly, the terminal device receives the third indication information, where the third indication information is used to indicate the value of Q.

For ease of distinguishing and description, the Q ports that need to be fed back to the network device and that are determined by the terminal device based on the received reference signals of the P ports are denoted as target ports below. It should be understood that, P and Q are merely examples for ease of distinguishing and understanding, and specific values of P and Q are not limited in this application.

The following describes in detail a specific process in which the terminal device determines the Q target ports from the P ports.

As described above, the P ports correspond to the P angle-delay pairs. Weighting coefficients of the P angle-delay pairs may be determined based on the precoded reference signals of the P ports. The terminal device may perform channel measurement based on the precoded reference signals of the P ports, determine the weighting coefficients of the P angle-delay pairs corresponding to the P ports, and further determine the Q target ports from the P ports.

Because the network device precodes the reference signal based on the P angle-delay pairs including the K angle vectors and the L delay vectors, a precoded reference signal carried on each frequency domain unit (for example, an RB) may correspond to the P ports. A $p^{th}$ port in the P ports corresponds to a $p^{th}$ angle-delay pair. A precoded reference signal of the $p^{th}$ port is obtained by precoding the reference signal based on an angle vector and a delay vector in the $p^{th}$ angle-delay pair. It is assumed that the $p^{th}$ angle-delay pair includes the km angle vector in the K angle vectors and the $l^{th}$ delay vector in the L delay vectors. In this case, the precoded reference signal of the $p^{th}$ port may be obtained by precoding the reference signal based on the $k^{th}$ angle vector and the $l^{th}$ delay vector. In other words, the precoded reference signal corresponding to the $p^{th}$ port may be used to determine a weighting coefficient of an angle-delay pair including the $k^{th}$ angle vector and the $l^{th}$ delay vector, that is, may be used to determine a weighting coefficient of the $p^{th}$ angle-delay pair. Therefore, the terminal device may determine the weighting coefficient of the corresponding angle-delay pair based on the precoded reference signal of each port.

If a reference signal received by the terminal device is a reference signal that is not precoded, for each receive antenna, dimensions of a downlink channel may be N×T. Dimensions of a downlink channel on one frequency domain unit that is received by using one receive antenna may be 1×T. In this embodiment of this application, because the network device precodes the reference signal based on the angle vector and the delay vector, and dimensions of each angle vector may be T×1, after the reference signal is precoded by using the angle vector and the delay vector, dimensions of a downlink channel on each frequency domain unit that is received by the terminal device through each receive antenna may be 1×1. An estimation value of the downlink channel whose dimensions are 1×1 is a channel estimation value obtained by performing channel estimation on the precoded reference signal on one frequency domain unit.

For the precoded reference signal of the $p^{th}$ port, the terminal device may determine the weighting coefficient of the $p^{th}$ angle-delay pair based on N 1×1 downlink channels received on N frequency domain units. The weighting coefficient of the $p^{th}$ angle-delay pair may be obtained by performing superposition summation on N channel estimation values on the N frequency domain units.

It is assumed that an estimation value that is of a downlink channel and that is obtained by the terminal device by performing channel estimation on the precoded reference signal of the $p^{th}$ port is denoted as $y_n^{(p)}$. In this case, a sum of a plurality of estimation values that are obtained by the terminal device by performing channel estimation on the precoded reference signal of the $p^{th}$ port on the N frequency domain units may be represented as $$\sum_{n=1}^{N} y_n^{(p)}.$$

$$\sum_{n=1}^{N} y_n^{(p)}$$

is the weighting coefficient of the $p^{th}$ angle-delay pair.

Based on the foregoing method, the terminal device may determine, based on the received precoded reference signals of the P ports, the P weighting coefficients corresponding to the P angle-delay pairs. Based on the P weighting coefficients, the terminal device may further determine the Q stronger ports in the P ports, and determine the Q stronger ports as the Q target ports to be fed back to the network device. A weighting coefficient of any one of the Q angle-delay pairs corresponding to the Q target ports is greater than or equal to a weighting coefficient of an angle-delay pair corresponding to any one of the remaining P-Q ports.

After determining the Q target ports, the terminal device may generate the first indication information to indicate the Q target ports.

In an implementation, when the first indication information is used to indicate the Q target ports, the first indication information is specifically used to indicate indexes of the Q angle-delay pairs corresponding to the Q target ports.

As described above, the P angle-delay pairs may be obtained by combining the K angle vectors and the L delay vectors. Although the terminal device does not learn of angle vectors and delay vectors that are specifically included in the P angle-delay pairs, the terminal device may learn that there is a one-to-one correspondence between ports and angle-delay pairs. If the angle vectors and the delay vectors that are included in these angle-delay pairs are separately distinguished by using indexes, a combination of an index of one angle vector and an index of one delay vector may be used to uniquely indicate one port. It should be understood that, herein, the index of the angle vector is not an index of the angle vector in the angle vector set, and the index of the delay vector is not an index of the delay vector in the delay vector set. Instead, different index values are defined for the K angle vectors and the L delay vectors that are used for precoding, for distinguishing.

Optionally, each of the P angle-delay pairs may be indicated by using a two-dimensional index (k, l). k=1, 2, . . . , or K; and l=1, 2, . . . , or L.

Figure 4:
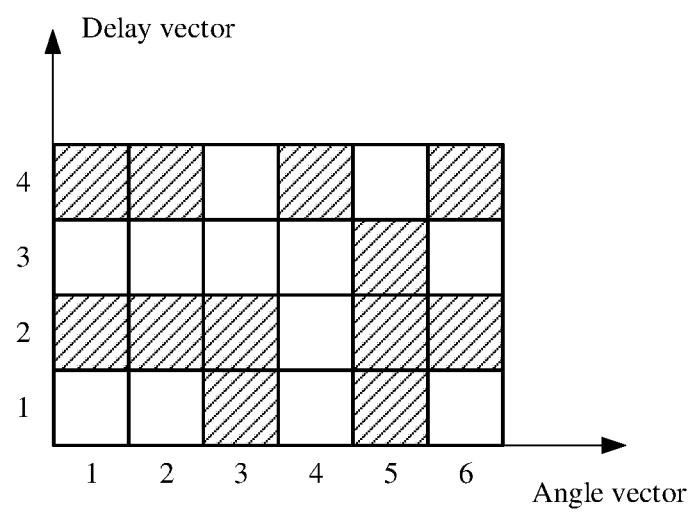
FIG. 4 is a schematic diagram of a correspondence between an angle-delay pair and a two-dimensional index according to an embodiment of this application.

For ease of understanding, FIG. 4 shows a correspondence between P angle-delay pairs and P groups of two-dimensional indexes. As shown in FIG. 4, a quantity K of angle vectors is 6, a quantity L of delay vectors is 4, and a quantity P of angle-delay pairs is 24. A total of six indexes 1 to 6 on a horizontal axis are in a one-to-one correspondence with the six angle vectors, and a total of four indexes 1 to 4 on a vertical axis are in a one-to-one correspondence with the four delay vectors. Therefore, one angle-delay pair can be uniquely determined by using one index on the horizontal axis and one index on the vertical axis. For example, the indexes 1 to 6 on the horizontal axis sequentially correspond to the first angle vector to the sixth angle vector in the six angle vectors. The indexes 1 to 4 on the vertical axis sequentially correspond to the first delay vector to the fourth delay vector in the four delay vectors. In this case, an index (1, 1) may represent an angle-delay pair including the first angle vector in the six angle vectors and the first delay vector in the four delay vectors, and an index (3, 4) may represent an angle-delay pair including the third angle vector in the six angle vectors and the fourth delay vector in the four delay vectors. For brevity, examples are not listed one by one herein.

It should be noted that, the P angle-delay pairs are not necessarily obtained by combining the K angle vectors and the L delay vectors in pairs, that is, P does not necessarily satisfy that P=K×L. For example, if $$P = \sum_{k=1}^{K} L_k,$$

L may be a total quantity of delay vectors that form P delay vector pairs, and the L delay vectors are different from each other. That is, $$L \le \sum_{k=1}^{K} L_k.$$

For another example, if $$P = \sum_{l=1}^{L} K_l,$$

K may be a total quantity of angle vectors that form P angle vector pairs, and the K angle vectors are different from each other. That is, $$K \le \sum_{l=1}^{L} K_l.$$

However, it may be understood that regardless of a relationship among P, L, and M, the terminal device may indicate, by using the foregoing two-dimensional indexes, the Q angle-delay pairs corresponding to the Q target ports.

For ease of understanding, the following describes in detail a specific method for indicating the Q angle-delay pairs by using the two-dimensional indexes with reference to FIG. 4. As shown in FIG. 4, 24 angle-delay pairs are shown in the figure, where shaded grids represent the Q determined angle-delay pairs corresponding to the Q target ports, and Q=12. When the first indication information is used to indicate the 12 angle-delay pairs, for example, two-dimensional indexes (1, 2), (1, 4), (2, 2), (2, 4), (3, 1), (3, 2), (4, 4), (5, 1), (5, 2), (5, 3), (6, 2), and (6, 4) may be used for indication. It should be understood that, FIG. 4 is merely an example, and this shall not constitute any limitation on this application. The specific values of P and Q and a sequence of the Q two-dimensional indexes are not limited in this application.

It should be further understood that, FIG. 4 is merely an example for ease of understanding, and this shall not constitute any limitation on this application. A correspondence between an angle vector and an index and a correspondence between a delay vector and an index are not necessarily those shown in FIG. 4. For example, the angle vector may correspond to the index on the vertical axis, and the delay vector may correspond to the index on the horizontal axis. For another example, a correspondence between the K angle vectors and the K indexes and a correspondence between the L delay vectors and the L indexes are not necessarily those listed above. The angle-delay pair may be indicated by using the two-dimensional index, provided that the network device and the terminal device can define the correspondence between an angle vector and an index and the correspondence between a delay vector and an index according to a same rule. A correspondence between each angle vector and an index and a correspondence between each delay vector and an index are not limited in this application.

Actually, indicating the Q angle-delay pairs by using the two-dimensional indexes is merely a possible implementation, and the Q angle-delay pairs may alternatively be indicated by using one-dimensional indexes.

Optionally, each of the P angle-delay pairs may be indicated by using a one-dimensional index p. p=1, 2, . . . , or P.

A person skilled in the art may understand that the two-dimensional index (k, l) and the one-dimensional index p may be mutually converted. For example, the L rows are sequentially arranged from left to right from the first row to an $L^{th}$ row, or the K columns are sequentially arranged from top to bottom from the first column to a $K^{th}$ column, to obtain the one-dimensional indexes. One angle-delay pair may be uniquely indicated by using each one-dimensional index, provided that the network device and the terminal device can define the correspondence between an angle-delay pair and an index according to a predefined rule. A correspondence between each angle-delay pair and an index is not limited in this application.

It should be understood that, the two-dimensional index and the one-dimensional index that are listed above are merely a possible implementation in which the terminal device indicates the Q angle-delay pairs. Based on a same concept, the terminal device may alternatively indicate the Q angle-delay pairs by using a bitmap. In this case, the first indication information may include a bitmap whose length is P, to correspond to the P ports, or correspond to the P angle-delay pairs. Each bit corresponds to one port, or each bit corresponds to one angle-delay pair. A bit is set to "0" or "1" to indicate whether a corresponding port (or angle-delay pair) belongs to the Q target ports (or angle-delay pairs), so that the Q target ports (or angle-delay pairs) are indicated.

In an implementation, when the first indication information is used to indicate the Q target ports, the first indication information is specifically used to indicate port numbers of the Q target ports.

Because the network device may notify the terminal device in advance by using signaling of a time-frequency resource for transmitting the reference signal and a port number for the transmitted reference signal, the terminal device may directly feed back the port numbers of the Q target ports to the network device after determining the Q stronger target ports.

It should be understood that, indicating the Q target ports by using the indexes of the corresponding angle-delay pairs and indicating the Q target ports by using the port numbers are merely two possible implementations provided in this application, and this shall not constitute any limitation on this application. A specific implementation of indicating the Q target ports by the terminal device is not limited in this application.

It should be noted that, a specific process in which the terminal device generates the first indication information is described in detail above by using one polarization direction and one receive antenna as an example. In other words, the Q ports may be determined based on a precoded reference signal that is sent by a transmit antenna in one polarization direction and that is received by one receive antenna. However, this shall not constitute any limitation on this application. Alternatively, the network device may send precoded reference signals by using transmit antennas in a plurality of polarization directions. Alternatively, the terminal device may receive the precoded reference signals based on a plurality of receive antennas, and generate the first indication information based on the plurality of receive antennas.

When transmit antennas in a plurality of polarization directions are configured for the network device, the polarization direction described in the foregoing embodiment may be any one of the plurality of polarization directions. When transmit antennas in a plurality of polarization directions are configured for the network device, the terminal device may separately determine one or more stronger ports based on a precoded reference signal sent by a transmit antenna in each of the plurality of polarization directions, or may jointly determine one or more stronger ports based on precoded reference signals sent by the transmit antennas in the plurality of polarization directions. The one or more stronger ports that are determined by the terminal device based on the precoded reference signals sent by the transmit antennas in the plurality of polarization directions are the target port described above.

It should be noted that, the terminal device may map the identified port to the polarization direction according to a predefined rule. For example, when the transmit antenna is in dual polarization directions, a quantity of ports of received reference signals is 2P. The terminal device may map the first P ports to a first polarization direction, and map the last P ports to a second polarization direction. Therefore, when the terminal device determines a target port based on a precoded reference signal sent by a transmit antenna in one or more polarization directions, it may be considered that the terminal device determines the target port based on a precoded reference signal of a port corresponding to the one or more polarization directions. For brevity, descriptions of a same or similar case are omitted below.

It is assumed that transmit antennas in J polarization directions are configured for the network device, where J is an integer greater than 1. The network device may precode, based on the angle vector and the delay vector that are included in each of the P angle-delay pairs, a reference signal sent by a transmit antenna in each polarization direction, to obtain precoded reference signals of J×P ports. Certainly, when the network device sends precoded reference signals by using the transmit antennas in the J polarization directions, quantities of angle-delay pairs corresponding to precoded reference signals sent by transmit antennas in at least two polarization directions may alternatively be different. For example, a precoded reference signal sent by a transmit antenna in a $j^{th}$ (where $1 \leq j \leq J$, and j is a positive integer) polarization direction may be obtained by precoding the reference signal based on angle vectors and delay vectors in $P_j$ angle-delay pairs. That is, the precoded reference signal sent by the transmit antenna in the $j^{th}$ polarization direction corresponds to $P_j$ (where $P_j$ is a positive integer) ports. Generally, ports corresponding to precoded reference signals sent by transmit antennas in any two polarization directions may be the same, that is, $P_j = P$. Therefore, a total quantity of ports may be J×P.

For the $j^{th}$ polarization direction, the terminal device may determine $Q_j$ (where $Q_j$ is a positive integer) target ports based on received precoded reference signals of the $P_j$ ports. The $Q_j$ target ports are an example of the Q target ports described above. A value of j is traversed from 1 to J, so that one or more target ports corresponding to each of the J polarization directions may be determined.

Optionally, target ports determined by the terminal device based on precoded reference signals sent by transmit antennas in any two polarization directions are the same.

The terminal device may determine Q target ports based on a precoded reference signal sent by a transmit antenna in any polarization direction. That is, when the value of j is any one of 1 to J, that $Q_j = Q$ can be satisfied. The Q target ports may be Q stronger ports determined by performing channel measurement based on the precoded reference signals sent by the transmit antennas in the J polarization directions, or may be Q ports determined by performing channel measurement based on a precoded reference signal sent by a transmit antenna in one polarization direction. This is not limited in this application.

When Q same target ports are determined by the terminal device based on precoded reference signals sent by transmit antennas in any two of the J polarization directions, the first indication information may indicate the Q target ports once, or the first indication information includes only one piece of indication information used to indicate the Q target ports.

It should be understood that, a specific method for determining, by the terminal device based on the precoded reference signals sent by the transmit antennas in the J polarization directions, the Q stronger target ports from the P ports is similar to the foregoing listed specific method for determining, based on a precoded reference signal sent by a transmit antenna in one polarization direction, the Q stronger target ports from the P ports. For brevity, details are not described herein again.

Optionally, target ports determined by the terminal device based on precoded reference signals sent by transmit antennas in at least two polarization directions are different.

That target ports determined by the terminal device based on precoded reference signals sent by transmit antennas in at least two of the J polarization directions are different may mean that target ports determined by the terminal device based on precoded reference signals sent by transmit antennas in some of the J polarization directions are different; or may mean that target ports determined by the terminal device based on precoded reference signals sent by transmit antennas in all of the J polarization directions are different.

That target ports determined based on precoded reference signals sent by transmit antennas in two polarization directions are different may mean that the target ports determined based on the precoded reference signals sent by the transmit antennas in the two polarization directions are completely different, that is, the target ports determined based on the precoded reference signals sent by the transmit antennas in the two polarization directions are not repeated, or have no intersection. That target ports determined based on precoded reference signals sent by transmit antennas in two polarization directions are different may alternatively mean that the target ports determined based on the precoded reference signals sent by the transmit antennas in the two polarization directions are partially different, that is, the target ports determined based on the precoded reference signals sent by the transmit antennas in the two polarization directions are partially repeated but are not completely the same, or the target ports determined based on the precoded reference signals sent by the transmit antennas in the two polarization directions have an intersection but are not completely the same.

Certainly, when the target ports determined based on the precoded reference signals sent by the transmit antennas in the two polarization directions are different, quantities of target ports determined based on the precoded reference signals sent by the transmit antennas in the two polarization directions may be the same or may be different. This is not limited in this application.

When the target ports determined by the terminal device based on the precoded reference signals sent by the transmit antennas in at least two of the J polarization directions are different, the first indication information may separately indicate a target port corresponding to each polarization direction, or the first indication information may include indication information of one or more target ports corresponding to each of the J polarization directions.

When a plurality of receive antennas are configured for the terminal device, the receive antenna described in the foregoing embodiment may be any one of the plurality of receive antennas of the terminal device. When the plurality of receive antennas are configured for the terminal device, the terminal device may separately determine one or more stronger ports based on each of the plurality of receive antennas, or may jointly determine one or more stronger ports based on the plurality of receive antennas. The one or more stronger ports that are determined by the terminal device based on the plurality of receive antennas are the target port described above.

It is assumed that R receive antennas are configured for the terminal device, where R is an integer greater than 1. The terminal device may determine $Q_r$ target ports based on precoded reference signals of the P ports that are received by an $r^{th}$ receive antenna in the R receive antennas. r=1, 2, . . . , or R; and $Q_r$ is an integer.

Optionally, target ports determined by the terminal device based on precoded reference signals received by any two of the R receive antennas are the same.

The terminal device may determine Q target ports based on any receive antenna. That is, when a value of r is any one of 1 to R, that $Q_r$=Q is satisfied. The Q target ports may be Q stronger ports determined by performing channel measurement based on precoded reference signals received by the R receive antennas, or may be Q stronger ports determined by performing channel measurement based on a precoded reference signal received by a specific receive antenna. This is not limited in this application.

When Q same target ports are determined by the terminal device based on precoded reference signals received by any two of the R receive antennas, the first indication information may indicate the Q target ports once, or the first indication information includes only one piece of indication information used to indicate the Q target ports.

It should be understood that, a specific method for determining, by the terminal device based on the precoded reference signals received by the plurality of receive antennas, the Q stronger target ports from the P ports is similar to the foregoing listed specific method for determining, based on a precoded reference signal received by one receive antenna, the Q stronger target ports from the P ports. For brevity, details are not described herein again.

Optionally, target ports determined by the terminal device based on precoded reference signals received by at least two of the R receive antennas are different.

The terminal device may determine the $Q_r$ stronger target ports based on the precoded reference signal received by the $r^{th}$ receive antenna. That target ports determined by the terminal device based on precoded reference signals received by at least two of the R receive antennas are different may mean that target ports determined by the terminal device based on precoded reference signals received by some of the R receive antennas are different, or may mean that target ports determined by the terminal device based on precoded reference signals received by all of the R receive antennas are different.

That target ports determined based on precoded reference signals received by two receive antennas are different may mean that the target ports determined based on the precoded reference signals received by the two receive antennas are completely different, that is, the target ports determined based on the precoded reference signals received by the two receive antennas are not repeated, or have no intersection. That target ports determined based on precoded reference signals received by two receive antennas are different may alternatively mean that the target ports determined based on the precoded reference signals received by the two receive antennas are partially different, that is, the target ports determined based on the precoded reference signals received by the two receive antennas are partially repeated but are not completely the same, or the target ports determined based on the precoded reference signals received by the two receive antennas have an intersection but are not completely the same.

Certainly, when the target ports determined based on the precoded reference signals received by the two receive antennas are different, quantities of target ports determined based on the precoded reference signals received by the two receive antennas may be the same or may be different. This is not limited in this application.

When the target ports determined by the terminal device based on the precoded reference signals received by at least two of the R receive antennas are different, the first indication information may separately indicate a target port corresponding to each receive antenna, or the first indication information may include indication information of one or more target ports corresponding to each of the R receive antennas.

The foregoing specific method for determining the Q target ports in operation 220 is based on a receive antenna. Actually, the terminal device is not limited to determining the target port based on each receive antenna, and the terminal device may alternatively determine the target port based on a transport layer.

An example in which a quantity of polarization directions is J and a quantity of receive antennas is R is still used. The terminal device may construct a coefficient matrix based on J×R×P weighting coefficients corresponding to the J polarization directions and the R receive antennas. The coefficient matrix may be a matrix with J×P rows and R columns, and elements in each column may be J×P weighting coefficients corresponding to one receive antenna.

An example of the coefficient matrix is shown below:

$$\begin{bmatrix} \alpha_{1,1} & \alpha_{1,2} & \cdots & \alpha_{1,R} \\ \vdots & \vdots & \cdots & \vdots \\ \alpha_{P,1} & \alpha_{P,2} & \cdots & \alpha_{P,R} \\ \alpha_{P+1,1} & \alpha_{P+1,2} & \cdots & \alpha_{P+1,R} \\ \vdots & \vdots & \cdots & \vdots \\ \alpha_{2P,1} & \alpha_{2P,2} & \cdots & \alpha_{2P,R} \end{bmatrix}.$$

The coefficient matrix shows an example in which the quantity J of polarization directions is equal to 2. The first row to a $P^{th}$ row in the coefficient matrix may include weighting coefficients corresponding to one polarization direction, and $\alpha_{p,r}$ may represent a weighting coefficient corresponding to the $p^{th}$ angle-delay pair and the $r^{th}$ receive antenna in the first polarization direction. A $(P+1)^{th}$ row to a $2P^{th}$ row in the coefficient matrix may include weighting coefficients corresponding to another polarization direction, and $\alpha_{P+p,r}$ may represent a weighting coefficient corresponding to the $p^{th}$ angle-delay pair and the $r^{th}$ receive antenna in the second polarization direction. p=1, 2, . . . , or P; and r=1, 2, . . . , or R.

The terminal device may perform singular value decomposition (SVD) on the coefficient matrix to obtain a weighting coefficient corresponding to a transport layer.

Assuming that a quantity of transport layers is Z, weighting coefficients corresponding to the Z transport layers may include Z×2P weighting coefficients. The first column to a Pt column of the Z×2P weighting coefficients correspond to one polarization direction, and a $(P+1)^{th}$ column to a $2P^{th}$ column of the Z×2P weighting coefficients correspond to another polarization direction. Each row of the Z×2P weighting coefficients corresponds to one transport layer. That is, 2P weighting coefficients in each row are weighting coefficients of 2P angle-delay pairs determined based on one transport layer.

For each transport layer, the terminal device may select some stronger weighting coefficients from weighting coefficients corresponding to each polarization direction, and feed back ports corresponding to the weighting coefficients to the network device. For example, for a $z^{th}$ transport layer, the terminal device may select $Q_z$ (where $Q_z$ is a positive integer) stronger ports based on weighting coefficients of P ports corresponding to the $z^{th}$ transport layer to be reported to the network device. The $Q_z$ stronger ports are an example of the target ports described above. A value of z is traversed from 1 to Z, so that one or more target ports corresponding to each of the Z transport layers may be determined.

Optionally, target ports fed back by the terminal device based on any two of the Z transport layers are the same.

The terminal device may determine Q ports based on any transport layer. That is, when the value of z is any one of 1 to Z, that $Q_z$=Q is satisfied. The Q ports may be Q stronger ports determined by performing channel measurement based on precoded reference signals received at the Z transport layers, or may be Q stronger ports determined by performing channel measurement based on a precoded reference signal received at a specific transport layer. This is not limited in this application.

When Q same target ports are determined by the terminal device based on any two of the Z transport layers, the first indication information may indicate the Q target ports once, or the first indication information includes only one piece of indication information used to indicate the Q target ports.

It should be understood that, a specific method for determining, by the terminal device based on a plurality of transport layers, the Q stronger target ports from the P ports is similar to the foregoing listed specific method for determining, based on one transport layer, the Q stronger target ports from the P ports. For brevity, details are not described herein again.

Optionally, target ports determined by the terminal device based on at least two of the Z transport layers are different.

The terminal device may determine $Q_z$ stronger target ports based on a $Z^{th}$ transport layer. That target ports determined by the terminal device based on at least two of the Z transport layers are different may mean that target ports determined by the terminal device based on some of the Z transport layers are different, or may mean that target ports determined by the terminal device based on all of the Z transport layers are different.

That target ports determined based on two transport layers are different may mean that the target ports determined based on two transport layers are completely different, that is, the target ports determined based on the two transport layers are not repeated, or have no intersection. That target ports determined based on two transport layers are different may alternatively mean that the target ports determined based on the two transport layers are partially different, that is, the target ports determined based on the two transport layers are partially repeated but are not completely the same, or the target ports determined based on the two transport layers have an intersection but are not completely the same.

Certainly, when the target ports determined based on the two transport layers are different, quantities of target ports determined based on the two transport layers may be the same or may be different. This is not limited in this application.

When the target ports determined by the terminal device based on at least two of the Z transport layers are different, the first indication information may separately indicate a target port corresponding to each transport layer, or the first indication information may include indication information of one or more target ports corresponding to each of the Z transport layers. It should be understood that, a specific method for determining, by the terminal device based on a weighting coefficient, one or more target ports from the P ports has been described in detail above. For brevity, details are not described herein again.

Step 230: The terminal device sends the first indication information. Correspondingly, the network device receives the first indication information.

Specifically, the terminal device may send the first indication information to the network device by using a pre-allocated physical uplink resource, for example, a physical uplink control channel (PUCCH) or a physical uplink shared channel (PUSCH). For example, the first indication information may be carried in a CSI report, or may be carried in other existing or newly added signaling. Specific signaling used to carry the first indication information is not limited in this application.

It should be understood that, for a specific process in which the terminal device sends the first indication information by using the physical uplink resource, refer to the conventional technology. For brevity, detailed descriptions of the specific process are omitted herein.

Step 240: The network device determines, based on the first indication information, the Q angle-delay pairs corresponding to the Q ports.

As described above, when precoding the reference signal, the network device may determine the correspondence among each angle vector, a delay vector, and a port. In addition, when the reference signal is transmitted, the correspondence between each port and a time-frequency resource may also be learned of. Therefore, the terminal device indicates the Q ports (that is, the target ports in operation 220) to the network device, and the network device may determine the Q corresponding angle-delay pairs based on the Q ports.

Based on the foregoing solution, precoding the reference signal by the network device based on the angle vector and the delay vector is equivalent to precoding the reference signal in space domain and frequency domain. A delay vector is introduced for a reference signal. A change of a channel in a plurality of frequency domain units may be represented by using a delay vector, and a reference signal is precoded based on the delay vector, so that the terminal device does not need to separately feed back the target port based on each frequency domain unit. Therefore, the feedback overheads can be reduced.

After determining the Q angle-delay pairs, the network device may precode, based only on the Q angle-delay pairs, a reference signal to be sent next time, or may continue to precode, based on the P angle-delay pairs, a reference signal to be sent next time. This is not limited in this application.

In an embodiment, the network device may precode, based on $P_1$ angle-delay pairs (namely, an example of the P angle-delay pairs) in a periodicity (for example, denoted as a periodicity #1) of predetermined duration, a reference signal that is sent for the first time in the periodicity #1, to obtain and send precoded reference signals of $P_1$ ports (namely, an example of the P ports). The network device may precode, by using $Q_1$ corresponding angle-delay pairs (namely, an example of the angle-delay pairs corresponding to the Q target ports) based on $Q_1$ ports (namely, an example of the Q target ports) indicated by the terminal device by using indication information #1 (namely, an example of the first indication information), a reference signal to be sent next time or reference signals to be subsequently sent for a plurality of times.

The network device may precode, in a next periodicity (for example, denoted as a periodicity #2) based on $P_2$ angle-delay pairs (namely, another example of the P angle-delay pairs), a reference signal that is sent for the first time in the periodicity #2, to obtain and send precoded reference signals of $P_2$ ports. The network device may precode, by using $Q_2$ corresponding angle-delay pairs (namely, another example of the angle-delay pairs corresponding to the Q target ports) based on $Q_2$ ports (namely, another example of the Q target ports) indicated by the terminal device by using indication information #2 (namely, another example of the first indication information), a reference signal to be sent next time or reference signals to be subsequently sent for a plurality of times.

By analogy, the network device may precode reference signals in a plurality of periodicities according to the foregoing method. For brevity, details are not described herein.

Based on the foregoing solution, the network device may first precode the reference signal by using a plurality of angle-delay pairs, so that the terminal device performs channel measurement. Then, the network device may precode the reference signal based on a feedback of the terminal device by using a stronger angle-delay pair in the downlink channel. Because a weighting coefficient of a stronger angle-delay pair has greater impact on the feedback precision, the feedback overheads can be reduced while the feedback precision is ensured, and a compromise between the feedback precision and the feedback overheads can be reached.

As described above, the network device may precode the downlink reference signal based on reciprocity between uplink and downlink channels and based on one or more stronger angle vectors and one or more stronger delay vectors that are determined through uplink channel measurement, to send the precoded reference signal to the terminal device, so that the terminal device performs downlink channel measurement.

For example, based on uplink channel measurement, the network device may determine two stronger angle vectors $a(\theta_2)$ and $a(\theta_4)$ from a plurality of predefined angle vectors, and determine two stronger delay vectors $b(\tau_1)$ and $b(\tau_3)$ from a plurality of predefined delay vectors. However, actually, based on downlink channel measurement, two stronger angle vectors $a(\theta_2)$ and $a(\theta_3)$ and two strong delayer vectors $b(\tau_3)$ and $b(\tau_4)$ are determined. The network device constructs four angle-delay pairs: $(a(\theta_2), b(\tau_1))$, $(a(\theta_4), b(\tau_1))$, $(a(\theta_2), b(\tau_3))$, and $(a(\theta_4), b(\tau_3))$ based on the angle vectors $a(\theta_2)$ and $a(\theta_4)$ and the delay vectors $b(\tau_1)$ and $b(\tau_3)$. If the network device precodes the reference signal based on the angle vectors and the delay vectors in the four angle-delay pairs, the feedback precision of the terminal device may be limited.

However, in the method provided in this application, the network device may precode the reference signal in advance by using a plurality of angle-delay pairs, and after obtaining a stronger angle-delay pair that is in the downlink channel and that is fed back by the terminal device through measurement, the network device may select some stronger angle-delay pairs from the plurality of angle-delay pairs, to precode a reference signal to be sent next time, so as to perform downlink channel measurement. For example, the network device may precode the reference signal in advance based on a plurality of (for example, 16) angle-delay pairs determined by using the four angle vectors and the four delay vectors, where the plurality of angle-delay pairs may include a combination of any one of $a(\theta_1)$ to $a(\theta_4)$ and any one of $b(\tau_1)$ to $b(\tau_4)$. After the terminal device feeds back the stronger angle-delay pair based on downlink channel measurement, the network device may mainly load an angle-delay pair used to next precode the reference signal to a stronger angle-delay pair in the downlink channel. For the foregoing four angle-delay pairs, the four angle-delay pairs include $(a(\theta_2), b(\tau_3))$, $(a(\theta_3), b(\tau_3))$, $(a(\theta_2), b(\tau_4))$, and $(a(\theta_3), b(\tau_4))$.

Therefore, the network device may mainly load the angle-delay pair used to precode the reference signal to a stronger angle-delay pair in the downlink channel. Because the network device precodes the reference signal by using the plurality of angle-delay pairs in advance, a stronger angle-delay pair in the downlink channel determined by the terminal device may fall within a range of the plurality of angle-delay pairs with a higher probability. Therefore, on one hand, this helps obtain relatively high feedback precision, and on the other hand, feedback overheads caused by a next feedback of a weighting coefficient by the terminal device can be reduced.

In addition, after determining the Q target ports from the P ports based on the weighting coefficients of the P angle-delay pairs, the terminal device may further indicate the weighting coefficients of the angle-delay pairs corresponding to the Q target ports.

Optionally, the method 200 further includes: Step 250: The terminal device generates second indication information, where the second indication information is used to indicate the weighting coefficients of the Q angle-delay pairs, and the Q angle-delay pairs and the weighting coefficients corresponding to the Q angle-delay pairs are used to determine a precoding matrix.

For example, the terminal device may indicate the weighting coefficients of the Q angle-delay pairs in a normalized manner.

For example, the terminal device may determine a weighting coefficient with a largest modulus (for example, denoted as a maximum weighting coefficient) from the Q weighting coefficients, and indicate a position of the maximum weighting coefficient in the Q weighting coefficients. The terminal device may further indicate relative values of Q−1 remaining weighting coefficients relative to the maximum weighting coefficient. The terminal device may indicate the Q−1 weighting coefficients by using quantized value indexes of the relative values. For example, the network device and the terminal device may predefine a one-to-one correspondence between a plurality of quantized values and a plurality of indexes, and the terminal device may feed back the relative values of the weighting coefficients relative to the maximum weighting coefficient to the network device based on the one-to-one correspondence. Because the terminal device quantizes the weighting coefficients, and a quantized value may be the same as or close to an actual value, the quantized value is referred to as a quantized value of the weighting coefficient.

When generating the second indication information used to indicate the weighting coefficients of the Q angle-delay pairs, the terminal device may generate, according to a pre-agreed sequence, quantized information of the Q weighting coefficients corresponding to the Q angle-delay pairs. For example, refer to FIG. 4. In a sequence from the first row to the $L^{th}$ row and a sequence from the first column to the $K^{th}$ column for each row, or in a sequence from the first column to the $K^{th}$ column and a sequence from the first row to the Lt row for each column, the terminal device may arrange the Q weighting coefficients corresponding to the Q angle-delay pairs into an ordered array, and separately indicate the weighting coefficients in the ordered array by using the second indication information. The network device may interpret the second indication information according to a same rule, to determine a correspondence between each weighting coefficient and an angle-delay pair.

It should be understood that, the foregoing description with reference to FIG. 4 is merely an example for ease of understanding and description, and does not indicate that the terminal device generates the arrangement relationship shown in FIG. 4 or an arrangement relationship similar to that shown in FIG. 4 when generating the second indication information.

It should be further understood that, the terminal device may generate the second indication information according to a rule pre-agreed on with the network device or a predefined rule. The network device may interpret the second indication information according to a same rule. Therefore, the network device may determine the Q weighting coefficients corresponding to the Q angle-delay pairs. The rule listed above with reference to FIG. 4 is merely an example, and specific content of the rule is not specified in this application.

It should be noted that, when the terminal device indicates the Q weighting coefficients in the normalized manner, the terminal device may not directly indicate the quantized values of the Q weighting coefficients. For example, for the maximum weighting coefficient, the position of the maximum weighting coefficient in the Q weighting coefficients or a position of the maximum weighting coefficient in the P weighting coefficients may be indicated. For another example, for a weighting coefficient whose quantized value is zero, a position of the weighting coefficient in the Q weighting coefficients may also be indicated. In other words, the second indication information directly or indirectly indicates the Q weighting coefficients. Any implementation in which the network device can restore the Q weighting coefficients based on the second indication information falls within the protection scope of this application.

It should be further understood that, the normalization mentioned above may be determining the maximum weighting coefficient by using each receive antenna as a unit, to perform normalization within a range of quantized information corresponding to each receive antenna. However, this shall not constitute any limitation on this application. For example, in this embodiment, the terminal device may alternatively determine the maximum weighting coefficient by using a plurality of receive antennas, one polarization direction, a plurality of polarization directions, or one port as a unit, to perform normalization within a range of quantized information corresponding to the plurality of receive antennas, each polarization direction, the plurality of polarization directions, or the port.

It should be understood that, the foregoing listed manner of indicating each weighting coefficient in the normalized manner is merely a possible implementation, and this shall not constitute any limitation on this application. A specific manner of indicating the weighting coefficient by the terminal device is not limited in this application. For example, a quantized value index of each of the Q weighting coefficients may also be indicated.

It should be noted that, a specific process in which the terminal device generates the second indication information is described in detail above by using one polarization direction and one receive antenna as an example. In other words, the weighting coefficients of the Q angle-delay pairs corresponding to the Q target ports may be determined based on a precoded reference signal that is sent by a transmit antenna in one polarization direction and that is received by one receive antenna. However, this shall not constitute any limitation on this application.

As described above, when transmit antennas in a plurality of polarization directions are configured for the network device, the polarization direction described in the foregoing embodiment may be any one of the plurality of polarization directions. In other words, the terminal device may determine, based on the foregoing method, the weighting coefficient based on a precoded reference signal sent by the transmit antenna in each polarization direction.

As described in operation 220, it is assumed that the transmit antennas in the J polarization directions are configured for the network device, where J is an integer greater than 1. The terminal device may determine, based on the precoded reference signal sent by the transmit antenna in the $j^{th}$ polarization direction, the Q target ports corresponding to the $j^{th}$ polarization direction.

If the quantity of receive antennas is 1 and the quantity of the polarization direction is J, where J is an integer greater than 1, the second indication information may be used to indicate J groups of weighting coefficients corresponding to the J polarization directions, and a $j^{th}$ group of weighting coefficients may include $Q_j$ weighting coefficients. Herein, one group of weighting coefficients corresponding to one polarization direction is one or more weighting coefficients determined by performing channel measurement based on a precoded reference signal transmitted in the polarization direction.

Optionally, the second indication information includes J sets of indication information, and each set of indication information corresponds to one polarization direction. Each set of indication information is used to indicate one or more weighting coefficients corresponding to the polarization direction.

The terminal device may indicate, in the normalized manner by using each polarization direction as a unit, the one or more weighting coefficients corresponding to each polarization direction.

Optionally, when the second indication information is used to indicate a plurality of weighting coefficients in the J polarization directions, the normalized manner may also be used for indication by using the J polarization directions as a unit.

That is, a maximum weighting coefficient may be determined from the plurality of weighting coefficients corresponding to the J polarization directions, and a position of the maximum weighting coefficient may be indicated. The terminal device may further determine relative values of the remaining weighting coefficients relative to the maximum weighting coefficient, and indicate the remaining weighting coefficients by using quantized value indexes of the relative values.

It should be understood that, a specific method for performing, by the terminal device, normalization within a range of quantized information in a plurality of polarization directions is the same as that for performing normalization within a range of quantized information in one polarization direction. For brevity, details are not described herein again.

It should be further understood that, when indicating the weighting coefficients in the plurality of polarization directions in the normalized manner, the terminal device may sequentially indicate the weighting coefficients in a pre-agreed sequence. For example, weighting coefficients other than a normalization coefficient may be sequentially indicated in a predefined indication sequence of the J polarization directions. A sequence in which the terminal device indicates the weighting coefficients is not limited in this application, provided that the network device can restore, based on the second indication information, the plurality of weighting coefficients corresponding to the J polarization directions.

It should be noted that, merely for ease of description and understanding, the foregoing defines the weighting coefficient corresponding to each polarization direction as a group of weighting coefficients. However, this shall not constitute any limitation on this application. When indicating the weighting coefficient by using the second indication information, the terminal device does not necessarily indicate, in a form of a group, the weighting coefficient corresponding to each polarization direction. The "group" is merely a logical concept, and this shall not constitute any limitation on a field actually included in the second indication information or a specific manner of indicating the weighting coefficient.

As described above, when the plurality of receive antennas are configured for the terminal device, the receive antenna described in the foregoing embodiment may be any one of the plurality of receive antennas of the terminal device. When the plurality of receive antennas are configured for the terminal device, the terminal device may report the weighting coefficient based on each of the plurality of receive antennas.

As described in operation 220, it is assumed that the R receive antennas are configured for the terminal device, where R is an integer greater than 1. The terminal device may feed back the $Q_r$ target ports based on the received precoded reference signals of the P ports and the $r^{th}$ receive antenna in the R receive antennas. r=1, 2, . . . , or R; and $Q_r$ is an integer.

If the quantity of polarization directions is 1 and the quantity of receive antennas is R, where R is an integer greater than 1, the second indication information may be used to indicate R groups of weighting coefficients corresponding to the R receive antennas, and an $r^{th}$ group of weighting coefficients may include $Q_r$ weighting coefficients. Herein, one group of weighting coefficients corresponding to one receive antenna may be a weighting coefficient determined by performing channel measurement based on a precoded reference signal received by the receive antenna.

Optionally, the second indication information includes R sets of indication information, and each set of indication information corresponds to one receive antenna. Each set of indication information is used to indicate one or more weighting coefficients corresponding to one receive antenna.

The terminal device may indicate, in the normalized manner by using each receive antenna as a unit, the one or more weighting coefficients corresponding to each receive antenna.

Optionally, when the second indication information is used to indicate a plurality of weighting coefficients corresponding to the R receive antennas, the normalized manner may also be used for indication by using the plurality of receive antennas as a unit.

That is, a maximum weighting coefficient may be determined from the plurality of weighting coefficients corresponding to the R receive antennas, and a position of the maximum weighting coefficient may be indicated. The terminal device may further determine relative values of the remaining weighting coefficients relative to the maximum weighting coefficient, and indicate the remaining weighting coefficients by using quantized value indexes of the relative values.

It should be understood that, a specific method for performing, by the terminal device, normalization within a range of quantized information of a plurality of receive antennas is the same as that for performing normalization within a range of quantized information of one receive antenna. For brevity, details are not described herein again.

It should be further understood that, when indicating the weighting coefficients of the plurality of receive antennas in the normalized manner, the terminal device may sequentially indicate the weighting coefficients in a pre-agreed sequence. For example, weighting coefficients other than a normalization coefficient may be sequentially indicated in a predefined indication sequence of the R receive antennas. A sequence in which the terminal device indicates the weighting coefficients is not limited in this application, provided that the network device can restore, based on the second indication information, the plurality of weighting coefficients corresponding to the R receive antennas.

It should be noted that, merely for ease of description and understanding, the foregoing defines the weighting coefficient corresponding to each receive antenna as a group of weighting coefficients. However, this shall not constitute any limitation on this application. When indicating the weighting coefficient by using the second indication information, the terminal device does not necessarily indicate, in a form of a group, the weighting coefficient corresponding to each receive antenna. The "group" is merely a logical concept, and this shall not constitute any limitation on a field actually included in the second indication information or a specific manner of indicating the weighting coefficient.

If the quantity of receive antennas is R and the quantity of polarization directions is J, the second indication information may be used to indicate a plurality of weighting coefficients corresponding to the J polarization directions and the R receive antennas.

A weighting coefficient corresponding to one polarization direction and one receive antenna may be a weighting coefficient determined by performing channel measurement based on a precoded reference signal that is sent by a transmit antenna in the polarization direction and that is received by the receive antenna.

Optionally, when the second indication information is used to indicate the plurality of weighting coefficients corresponding to the J polarization directions and the R receive antennas, the normalized manner may be used for indication by using one polarization direction and the R receive antennas as a unit.

When the second indication information is used to indicate the plurality of weighting coefficients corresponding to the J polarization directions and the R receive antennas, the normalized manner may also be used for indication by using one polarization direction and the R receive antennas as a unit. For example, the second indication information includes J sets of indication information, and each set of indication information corresponds to one polarization direction and the R receive antennas. Each set of indication information is used to indicate a plurality of weighting coefficients corresponding to the polarization direction and the R receive antennas.

Optionally, when the second indication information is used to indicate the plurality of weighting coefficients corresponding to the J polarization directions and the R receive antennas, the normalized manner may also be used for indication by using the J polarization directions and one receive antenna as a unit. For example, the second indication information includes R sets of indication information, and each set of indication information corresponds to one receive antenna and J polarization directions. Each set of indication information is used to indicate a plurality of weighting coefficients corresponding to the receive antenna and the J polarization directions.

Optionally, when the second indication information is used to indicate the plurality of weighting coefficients corresponding to the J polarization directions and the R receive antennas, the normalized manner may also be used for indication by using one polarization direction and one receive antenna as a unit. For example, the second indication information includes J×R sets of indication information, and each set of indication information corresponds to one polarization direction. Each set of indication information is used to indicate one or more weighting coefficients corresponding to the polarization direction and one receive antenna.

A unit for normalization and a specific indication manner are not limited in this application.

It should be understood that, a specific method for indicating the plurality of weighting coefficients by the terminal device in the normalized manner has been described in detail above. For brevity, details are not described herein again.

It should be further understood that, when indicating the weighting coefficients of the plurality of polarization directions and the plurality of receive antennas in the normalized manner, the terminal device may sequentially indicate the weighting coefficients in a pre-agreed sequence. For example, weighting coefficients other than a normalization coefficient may be sequentially indicated in a predefined indication sequence of the J polarization directions and the R receive antennas. A sequence in which the terminal device indicates the weighting coefficients is not limited in this application, provided that the network device can restore, based on the second indication information, the plurality of weighting coefficients of the J polarization directions and the R receive antennas.

It should be further understood that, indication of the weighting coefficients in the normalized manner is merely a possible implementation, and this shall not constitute any limitation on this application. A specific manner of indicating the weighting coefficients by using the second indication information is not limited in this application.

It should be noted that, merely for ease of description and understanding, the foregoing defines the weighting coefficient corresponding to each polarization direction and/or each receive antenna as a group of weighting coefficients. However, this shall not constitute any limitation on this application. When indicating the weighting coefficient by using the second indication information, the terminal device does not necessarily indicate, in a form of a group, the weighting coefficient corresponding to each polarization direction and/or each receive antenna. The "group" is merely a logical concept, and this shall not constitute any limitation on a field actually included in the second indication information or a specific manner of indicating the weighting coefficient.

When the weighting coefficient is fed back based on the receive antenna, the terminal device may further indicate the quantity of receive antennas. Optionally, the method 200 further includes: The terminal device sends fourth indication information, where the fourth indication information is used to indicate the quantity of receive antennas. Correspondingly, the network device receives the fourth indication information.

The fourth indication information and the second indication information may be carried in same signaling, for example, a precoding matrix indicator (PMI) or a CSI report, for sending, or may be sent by using different signaling. This is not limited in this application.

It should be understood that, the quantity of receive antennas of the terminal device may alternatively be predefined, for example, defined in a protocol. In this case, the terminal device may not indicate the quantity of receive antennas by using additional signaling.

Actually, the terminal device is not limited to feeding back the weighting coefficient based on each receive antenna, and the terminal device may alternatively feed back the weighting coefficient based on a transport layer.

After determining, based on the foregoing method, the weighting coefficient corresponding to each polarization direction and each receive antenna, the terminal device may further process the weighting coefficient, to obtain a weighting coefficient fed back based on each transport layer.

When the terminal device indicates, by using the second indication information, the weighting coefficients corresponding to the Z transport layers, the normalized manner may also be used for indication. For example, the terminal device may indicate, in the normalized manner by using one transport layer as a unit, one or more weighting coefficients corresponding to each transport layer. Alternatively, the terminal device may indicate, in the normalized manner by using the Z transport layers as a unit, a plurality of weighting coefficients corresponding to the Z transport layers.

It should be understood that, indication of the weighting coefficients in the normalized manner is merely a possible implementation, and this shall not constitute any limitation on this application. A specific manner of indicating the weighting coefficients by using the second indication information is not limited in this application.

It should be further understood that, a specific method for feeding back the weighting coefficient by the terminal device based on the transport layer is similar to the foregoing specific method for feeding back the weighting coefficient based on the receive antenna. The specific method for feeding back the weighting coefficient by the terminal device based on the receive antenna has been described in detail above. For brevity, details are not described herein again.

When the weighting coefficient is fed back based on the transport layer, the terminal device may further indicate the quantity of transport layers. Optionally, the method 200 further includes: The terminal device sends fifth indication information, where the fifth indication information is used to indicate the quantity of transport layers. Correspondingly, the network device receives the fifth indication information.

Optionally, the fifth indication information is a rank indicator (RI).

It should be understood that, the RI is merely an example of the fifth indication information, and this shall not constitute any limitation on this application. A specific form of the fifth indication information is not limited in this application.

It should be further understood that, the fifth indication information and the second indication information may be carried in same signaling, for example, a CSI report, for sending, or may be sent by using different signaling. This is not limited in this application.

It should be further understood that, the method for constructing a coefficient matrix and performing SVD on the coefficient matrix to determine a weighting coefficient corresponding to each transport layer that is listed above is merely an example, and this shall not constitute any limitation on this application. A specific method for determining the weighting coefficient of each transport layer is not limited in this application.

Optionally, the method 200 further includes: Step 260: The terminal device sends the second indication information. Correspondingly, in operation 260, the network device receives the second indication information.

Specifically, the terminal device may send the second indication information to the network device by using a pre-allocated physical uplink resource. The second indication information and the first indication information may be carried in same signaling, for example, a CSI report, for sending, or may be carried in different signaling for sending. This is not limited in this application.

It should be understood that, for a specific process in which the terminal device sends the second indication information by using the physical uplink resource, refer to the conventional technology. For brevity, detailed descriptions of the specific process are omitted herein.

Step 270: The network device determines the precoding matrix based on the second indication information.

As described above, the terminal device may feed back the weighting coefficient based on the receive antenna, or may feed back the weighting coefficient based on the transport layer. The network device may determine the precoding matrix based on the second indication information and based on different feedback granularities.

If the terminal device feeds back the weighting coefficient based on the receive antenna, the weighting coefficient indicated by the second indication information may include a weighting coefficient corresponding to one or more receive antennas. The network device may reconstruct a downlink channel based on the weighting coefficient corresponding to each receive antenna and the angle-delay pair corresponding to each weighting coefficient, to further determine a precoding matrix of each RB (namely, an example of the frequency domain unit).

Herein, it should be noted that, when the terminal device feeds back the weighting coefficient by using the second indication information based on the receive antenna, the target port fed back by the terminal device by using the first indication information is also fed back based on the receive antenna. The network device may determine, based on the target port indicated by the terminal device in the first indication information, the angle-delay pair corresponding to each weighting coefficient, or determine the correspondence between each angle-delay pair and a weighting coefficient.

Specifically, one polarization direction of a transmit antenna is used as an example. The terminal device may feed back one or more weighting coefficients based on each receive antenna. For ease of description below, it is assumed that the terminal device feeds back Q weighting coefficients based on each receive antenna. The Q weighting coefficients corresponding to each receive antenna may correspond to the Q ports indicated by the second indication information, that is, are in a one-to-one correspondence with the Q angle-delay pairs corresponding to the Q ports. The network device may construct, based on the Q weighting coefficients corresponding to each receive antenna and an angle vector and a delay vector that are included in each of the Q angle-delay pairs, a spatial-frequency matrix corresponding to each receive antenna.

In this embodiment, a spatial-frequency matrix corresponding to the $r^{th}$ receive antenna may be determined by using the Q angle-delay pairs and Q weighting coefficients corresponding to the $r^{th}$ receive antenna. The Q angle-delay pairs may be used to construct Q spatial-frequency component matrices. As described above, the spatial-frequency component matrix $a(\theta_k) \times b(\tau_l)^H$ may be constructed by using the $k^{th}$ angle vector $a(\theta_k)$ in the K angle vectors and the $l^{th}$ delay vector $b(\tau_l)$ in the L delay vectors. The spatial-frequency matrix $H_{DL}^{(r)}$ corresponding to the $r^{th}$ receive antenna may be a weighted sum of the Q spatial-frequency component matrices. That is, $$H_{DL}^{(r)} = \sum_{l=1}^{L}\sum_{k=1}^{K} \alpha_{k,l}^{(r)} a(\theta_k) \times b(\tau_l)^H.$$

$\alpha_{k,l}^{(r)}$ represents a weighting coefficient that is fed back based on the $r^{th}$ receive antenna and that corresponds to the $k^{th}$ angle vector and the $l^{th}$ delay vector. Dimensions of the spatial-frequency matrix may be T×N.

It is assumed that in the calculation formula of the spatial-frequency matrix $H_{DL}^{(r)}$, the K angle vectors and the L delay vectors are shared by each other. When delay vectors corresponding to at least two angle vectors are different, the foregoing formula may be transformed into:

$$H_{DL}^{(r)} = \sum_{l_k=1}^{L_k}\sum_{k=1}^{K} \alpha_{k,l_k}^{(r)} a(\theta_k) \times b(\tau_{l_k})^H.$$

Alternatively, when angle vectors corresponding to at least two delay vectors are different, the foregoing formula may be transformed into:

$$H_{DL}^{(r)} = \sum_{l=1}^{L}\sum_{k_l=1}^{K_l}\alpha_{k_l,l}^{(r)}a(\theta_{k_l})\times b(\tau_l)^H.$$

For ease of description, $$H_{DL}^{(r)} = \sum_{l=1}^{L}\sum_{k=1}^{K}\alpha_{k,l}^{(r)}a(\theta_k)\times b(\tau_l)^H$$

is used as an example for description below. It may be understood that regardless of whether delay vectors corresponding to angle vectors are the same, or whether angle vectors corresponding to delay vectors are the same, determining of the precoding matrix is not affected.

It should be noted that, for ease of understanding, the foregoing uses one polarization direction of the transmit antenna as an example to describe a specific process of determining the spatial-frequency matrix corresponding to the receive antenna. However, this shall not constitute any limitation on this application. When the quantity of polarization directions of the transmit antenna is greater than 1, the network device may still determine, based on the foregoing method, the spatial-frequency matrix corresponding to each receive antenna.

For example, when the quantity of polarization directions of the transmit antenna is 2, the spatial-frequency matrix corresponding to the $r^{th}$ receive antenna may be determined by using the following calculation formula:

$$H_{DL}^{(r)} = \begin{bmatrix} \sum_{l=1}^{L}\sum_{k=1}^{K}\alpha_{k,l,1}^{(r)}a(\theta_k)\times b(\tau_l)^H \\ \sum_{l=1}^{L}\sum_{k=1}^{K}\alpha_{k,l,2}^{(r)}a(\theta_k)\times b(\tau_l)^H \end{bmatrix}.$$

$\alpha_{k,l,1}^{(r)}$ represents a weighting coefficient that is fed back based on the $r^{th}$ receive antenna and that corresponds to the $k^{th}$ angle vector and the $l^{th}$ delay vector in the first polarization direction; and $\alpha_{k,l,2}^{(r)}$ represents a weighting coefficient that is fed back based on the $r^{th}$ receive antenna and that corresponds to the $k^{th}$ angle vector and the $l^{th}$ delay vector in the second polarization direction.

It should be understood that, the foregoing calculation formula of the spatial-frequency matrix $H_{DL}^{(r)}$ that is defined for the two polarization directions is merely an example, and this shall not constitute any limitation on this application. For example, quantities of delay vectors and/or angle vectors loaded in different polarization directions may be the same or may be different, and delay vectors and/or angle vectors loaded in different polarization directions may be the same or may be different.

For the R receive antennas, the network device may determine spatial-frequency matrices $H_{DL}^{(1)}$ and $H_{DL}^{(2)}$ to $H_{DL}^{(R)}$ based on the Q weighting coefficients corresponding to each receive antenna. Therefore, the network device may determine a downlink channel matrix corresponding to each RB.

An $n^{th}$ RB in N RBs is used as an example. The network device may determine a conjugate transpose $(V^{(n)})^H$ of a downlink channel matrix corresponding to the $n^{th}$ RB. The matrix $(V^{(n)})^H$ may be determined by using an $n^{th}$ column vector in each of the R spatial-frequency matrices $H_{DL}^{(1)}$ and $H_{DL}^{(2)}$ to $H_{DL}^{(R)}$ that are respectively determined based on the R receive antennas. For example, an $n^{th}$ column in $H_{DL}^{(1)}$ is used as the first column in the matrix $(V^{(n)})^H$, an $n^{th}$ column in $H_{DL}^{(2)}$ is used as the second column in the matrix $(V^{(n)})^H$, and by analogy, an $n^{th}$ column in $H_{DL}^{(R)}$ may be used as an $r^{th}$ column in the matrix $(V^{(n)})^H$. Therefore, a matrix $(V^{(n)})^H$ may be obtained, to determine a downlink channel matrix $V^{(n)}$ corresponding to the $n^{th}$ RB.

The downlink channel matrix corresponding to each RB may be determined based on the foregoing method.

The network device may further determine the precoding matrix of each RB based on the downlink channel matrix of each RB. For example, the network device may determine the precoding matrix by performing SVD on the downlink channel matrix or a covariance matrix of the channel matrix, or may determine the precoding matrix by performing eigenvalue decomposition (EVD) on a covariance matrix of the downlink channel matrix.

It should be understood that, for a specific manner of determining the precoding matrix by the network device based on the channel matrix, refer to the conventional technology. A manner of determining the precoding matrix is not limited in this application.

It should be further understood that, merely for ease of understanding, the foregoing shows a specific process in which the network device determines the downlink channel matrix based on the spatial-frequency matrix, to further determine the precoding matrix. However, this shall not constitute any limitation on this application. Alternatively, the network device may directly determine the precoding matrix based on the spatial-frequency matrix.

If the terminal device feeds back the weighting coefficient based on the transport layer, the weighting coefficient indicated by the second indication information may include a weighting coefficient of one or more transport layers. The network device may determine, based on the weighting coefficient corresponding to each transport layer and the angle-delay pair corresponding to each weighting coefficient, a spatial-frequency matrix corresponding to each transport layer, to further determine the precoding matrix of each RB.

Herein, it should be noted that, when the terminal device feeds back the weighting coefficient by using the second indication information based on the transport layer, the target port fed back by the terminal device by using the first indication information is also fed back based on the transport layer. The network device may determine, based on the target port indicated by the terminal device in the first indication information, the angle-delay pair corresponding to each weighting coefficient, or determine the correspondence between each angle-delay pair and a weighting coefficient.

Specifically, one polarization direction of a transmit antenna is used as an example. The terminal device may feed back one or more weighting coefficients based on each transport layer. For ease of description below, it is assumed that the terminal device feeds back Q weighting coefficients based on each transport layer. The Q weighting coefficients corresponding to each transport layer may correspond to the Q ports indicated by the second indication information, that is, are in a one-to-one correspondence with the Q angle-delay pairs corresponding to the Q ports. The network device may construct, based on the Q weighting coefficients corresponding to each transport layer and an angle vector and a delay vector that are included in each of the Q angle-delay pairs, a precoding vector corresponding to the transport layer.

In this embodiment, a spatial-frequency matrix $H_{DL}^{(z)}$ corresponding to the $z^{th}$ transport layer may be determined by using the Q angle-delay pairs and Q weighting coefficients corresponding to the $z^{th}$ transport layer. The Q angle-delay pairs may be used to construct Q spatial-frequency component matrices. A precoding vector corresponding to the $z^{th}$ transport layer may be a weighted sum of the Q spatial-frequency component matrices. That is, $$H_{DL}^{(z)} = \sum_{l=1}^{L}\sum_{k=1}^{K} \alpha_{k,l}^{(z)} a(\theta_k) \times b(\tau_l)^H.$$

$\alpha_{k,l}^{(r)}$ represents a weighting coefficient that is fed back based on the $r^{th}$ receive antenna and that corresponds to the $k^{th}$ angle vector and the $l^{th}$ delay vector. Dimensions of the spatial-frequency matrix may be T×N.

It is assumed that in the calculation formula of the spatial-frequency matrix $H_{DL}^{(z)}$, the K angle vectors and the L delay vectors are shared by each other. When delay vectors corresponding to at least two angle vectors are different, the foregoing formula may be transformed into:

$$H_{DL}^{(z)} = \sum_{l_k=1}^{L_k}\sum_{k=1}^{K} \alpha_{k,l_k}^{(r)} a(\theta_k) \times b(\tau_{l_k})^H.$$

Alternatively, when angle vectors corresponding to at least two delay vectors are different, the foregoing formula may be transformed into:

$$H_{DL}^{(z)} = \sum_{l=1}^{L}\sum_{k_l=1}^{K_l} \alpha_{k_l,l}^{(z)} a(\theta_{k_l}) \times b(\tau_l)^H.$$

For ease of description, $$H_{DL}^{(z)} = \sum_{l=1}^{L}\sum_{k=1}^{K} \alpha_{k,l}^{(z)} a(\theta_k) \times b(\tau_l)^H$$

is used as an example for description below. It may be understood that regardless of whether delay vectors corresponding to angle vectors are the same, or whether angle vectors corresponding to delay vectors are the same, determining of the precoding matrix is not affected.

It should be noted that, for ease of understanding, the foregoing uses one polarization direction of the transmit antenna as an example to describe a specific process of determining the spatial-frequency matrix corresponding to the receive antenna. However, this shall not constitute any limitation on this application. When the quantity of polarization directions of the transmit antenna is greater than 1, the network device may still determine, based on the foregoing method, the spatial-frequency matrix corresponding to each transport layer.

For example, if the quantity of polarization directions is 2, the spatial-frequency matrix corresponding to the $z^{th}$ transport layer may be determined by using the following calculation formula:

$$H_{DL}^{(z)} = \begin{bmatrix} \sum_{l=1}^{L}\sum_{k=1}^{K} \alpha_{k,l,1}^{(z)} a(\theta_k) \times b(\tau_l)^H \\ \sum_{l=1}^{L}\sum_{k=1}^{K} \alpha_{k,l,2}^{(z)} a(\theta_k) \times b(\tau_l)^H \end{bmatrix}.$$

$\alpha_{k,l,1}^{(z)}$ represents a weighting coefficient that is fed back based on the $z^{th}$ transport layer and that corresponds to the $k^{th}$ angle vector and the $l^{th}$ delay vector in the first polarization direction; and $\alpha_{k,l,2}^{(z)}$ represents a weighting coefficient that is fed back based on the $z^{th}$ transport layer and that corresponds to the $k^{th}$ angle vector and the $l^{th}$ delay vector in the second polarization direction.

It should be understood that, the foregoing calculation formula of the spatial-frequency matrix $H_{DL}^{(z)}$ that is defined for the two polarization directions is merely an example, and this shall not constitute any limitation on this application. For example, quantities of delay vectors and/or angle vectors loaded in different polarization directions may be the same or may be different, and delay vectors and/or angle vectors loaded in different polarization directions may be the same or may be different.

For the Z transport layers, the network device may determine, based on the Q weighting coefficients corresponding to each transport layer, spatial-frequency matrices $H_{DL}^{(1)}$ and $H_{DL}^{(2)}$ to $H_{DL}^{(Z)}$ corresponding to the transport layers. Therefore, the network device may determine a precoding matrix $W^{(n)}$ corresponding to each RB. The precoding matrix $W^{(n)}$ corresponding to the $n^{th}$ RB may be constructed by using an $n^{th}$ column vector in each of the Z spatial-frequency matrices $H_{DL}^{(1)}$ and $H_{DL}^{(2)}$ to $H_{DL}^{(Z)}$ that are respectively determined based on the Z transport layers. For example, an $n^{th}$ column in $H_{DL}^{(1)}$ is used as the first column in the downlink channel matrix $W^{(n)}$, an $n^{th}$ column in $H_{DL}^{(2)}$ is used as the second column in the downlink channel matrix $W^{(n)}$, and by analogy, an $n^{th}$ column in $H_{DL}^{(z)}$ is used as a $z^{th}$ column in the downlink channel matrix $W^{(n)}$. The precoding matrix corresponding to each RB may be determined based on the foregoing method.

It should be understood that, merely for ease of understanding, the foregoing uses the spatial-frequency component matrix as an example to describe in detail a specific process in which the network device determines the precoding matrix. However, this shall not constitute any limitation on this application. Alternatively, the network device may determine Q spatial-frequency component vectors based on the Q angle-delay pairs, to further determine the precoding matrix. A person skilled in the art may construct Q spatial-frequency basic units in different forms based on the Q angle-delay pairs, to further determine the precoding matrix. A manner of constructing the Q spatial-frequency basic units in different forms based on the Q angle-delay pairs, to further determine the precoding matrix based on a weighted sum of the Q spatial-frequency basic units shall fall within the protection scope claimed in this application.

It should be further understood that, the foregoing is merely an example, and shows a possible implementation in which the network device determines the precoding matrix based on the second indication information. However, this shall not constitute any limitation on this application. A specific implementation in which the network device determines the precoding matrix based on the second indication information is not limited in this application. Based on a same concept, a person skilled in the art performs transformation or equivalent replacement on the foregoing listed matrix operation, and a method for determining a precoding matrix shall fall within the protection scope of this application.

It should be further understood that, the precoding matrix determined above is a precoding matrix corresponding to an RB. The RB is an example of the frequency domain unit. The precoding matrix corresponding to the RB may be a precoding matrix determined at a granularity of a size of the RB based on a channel matrix corresponding to the RB, or a precoding matrix determined based on a precoded reference signal received on the RB, and may be used to precode data transmitted by using the RB. A downlink channel corresponding to the RB may be a downlink channel determined based on the precoded reference signal received on the RB, and may be used to determine the precoding matrix corresponding to the RB.

It should be understood that, merely for understanding and description, the foregoing uses the RB as an example of the frequency domain unit to describe in detail a specific process in which the network device restores the precoding matrix corresponding to the frequency domain unit. However, this shall not constitute any limitation on this application. As described above, the granularity of the frequency domain unit is not limited to the RB. When the granularity of the frequency domain unit is relatively large, for example, when the frequency domain unit is a subband, a PRG, or a PRB, the network device may determine the precoding matrix for the frequency domain unit based on the precoding matrix corresponding to each RB in each frequency domain unit.

If each frequency domain unit includes one RB used to carry a reference signal, the network device may use a precoding matrix corresponding to the RB as a precoding matrix corresponding to the frequency domain unit to which the RB belongs. If each frequency domain unit includes a plurality of RBs used to carry a reference signal, the network device may perform, for example, SVD after averaging correlation matrices of precoding matrices corresponding to a plurality of RBs in a same frequency domain unit, to determine a precoding matrix corresponding to the frequency domain unit. For another example, the network device may use an average of precoding matrices corresponding to a plurality of RBs in a same frequency domain unit as a precoding matrix corresponding to the frequency domain unit.

It should be understood that, for a specific method for determining, by the network device, the precoding matrix of the frequency domain unit based on the precoding matrices corresponding to the plurality of RBs in the frequency domain unit, refer to the conventional technology, and the method is not limited to the foregoing listed method. A specific method for determining, by the network device, the precoding matrix for the frequency domain unit based on the precoding matrices corresponding to the plurality of RBs in the frequency domain unit is not limited in this application.

It should be further understood that, the weighting coefficient that is mentioned in the foregoing descriptions and that corresponds to an angle vector and a delay vector is a weighting coefficient corresponding to an angle-delay pair including the angle vector and the delay vector. For example, the weighting coefficient corresponding to the $k^{th}$ angle vector and the $l^{th}$ delay vector is the weighting coefficient corresponding to the angle-delay pair including the $k^{th}$ angle vector and the $l^{th}$ delay vector. For brevity, examples are not described one by one herein.

In this embodiment of this application, the network device precodes a downlink reference signal based on a predetermined angle vector and delay vector, so that the terminal device performs downlink channel measurement based on the precoded reference signal. Therefore, the terminal device may not need to feed back a space domain vector and a frequency domain vector (for example, the foregoing angle vector and delay vector), but only needs to feed back a weighting coefficient corresponding to each angle-delay pair, thereby greatly reducing the feedback overheads of the terminal device. In addition, based on the reciprocity between the uplink and downlink channels, the network device may load the angle vector and the delay vector that are determined through uplink channel measurement to the downlink reference signal, so that a process of measuring a downlink channel by the terminal device can be simplified. Therefore, complexity of calculation by the terminal device in the channel measurement process is reduced. Moreover, a precoding matrix is constructed through linear superposition of a plurality of space domain vectors and a plurality of frequency domain vectors, so that the precoding matrix determined by the network device can adapt to the downlink channel, thereby still ensuring relatively high feedback precision while reducing the feedback overheads.

In addition, the terminal device may feed back some stronger ports based on the received precoded reference signal. Because of the correspondence among a port, an angle vector, and a delay vector, the network device may choose to mainly load, based on a feedback of the terminal device, the angle vector and the delay vector that are used for precoding to a stronger angle vector and delay vector in the downlink channel. In addition, because a stronger angle vector and a stronger delay vector have greater impact on the feedback precision in a process of constructing the precoding matrix, and a weaker angle vector and a weaker delay vector have less impact on the feedback precision in the process of constructing the precoding matrix, discarding of some weaker angle vectors and some weaker delay vectors has little impact on the feedback precision, and therefore, a compromise between the feedback overheads and the feedback precision can be reached.

It should be understood that, in this embodiment of this application, merely for ease of understanding, a specific process of performing downlink channel measurement and determining the precoding matrix when the spatial-frequency matrix is obtained based on a conjugate transpose of an actual channel is shown. However, this shall not constitute any limitation on this application. A relationship between the actual channel and the spatial-frequency matrix $H_{DL}$ is not fixed. Different definitions of the spatial-frequency matrix and the spatial-frequency component matrix may change the relationship between the actual channel and the spatial-frequency matrix $H_{DL}$. For example, the spatial-frequency matrix $H_{DL}$ may be obtained based on the conjugate transpose of the actual channel, or may be obtained based on a transpose of the actual channel.

When a relationship between the spatial-frequency matrix and the channel matrix is defined differently, operations performed by the network device when the delay and the angle are loaded are also different, and operations performed by the terminal device when the terminal device performs channel measurement and provides a feedback correspondingly change. However, these are only implementation behaviors of the terminal device and the network device, and this shall not constitute any limitation on this application. The definition of the channel matrix, the dimensions and the definition of the spatial-frequency matrix, and a transformation relationship between the channel matrix and the spatial-frequency matrix are not limited in this application. Similarly, a transformation relationship between the spatial-frequency matrix and the precoding matrix is not limited in this application either.

In the method embodiment provided above, the channel measurement method provided in this application is described in detail by using an example in which the reference signal is precoded based on the angle vector and the delay vector. However, this shall not constitute any limitation on this application. Alternatively, the network device may precode the reference signal based on only the delay vector, so that the terminal device performs downlink channel measurement based on the precoded reference signal.

For ease of understanding, in embodiments shown below, a precoded reference signal sent by a transmit antenna in one polarization direction is first used as an example to describe in detail a specific process in which the terminal device performs channel measurement and provides a feedback based on a precoded reference signal received by one receive antenna. Then, a transmit antenna in one polarization direction is extended to transmit antennas in a plurality of polarization directions, and one receive antenna is extended to a plurality of receive antennas, to describe in detail a specific process in which the terminal device feeds back Q ports and Q corresponding weighting coefficients to the network device. Then, a feedback based on the receive antenna is changed into a feedback based on the transport layer, to further describe a specific process in which the terminal device feeds back the Q ports and the Q corresponding weighting coefficients to the network device based on the transport layer. Finally, a specific process in which the network device determines a precoding matrix is separately described in detail for two cases: a feedback based on the receive antenna and a feedback based on the receive transport layer.

It should be understood that, when the embodiments of this application are described based on one polarization direction for the terminal device, the polarization direction may be any one of one or more polarization directions of a transmit antenna that are configured by the network device. In other words, for a precoded reference signal transmitted by a transmit antenna in any polarization direction, the terminal device may perform channel measurement based on the method provided in the embodiments of this application, or the network device may determine a precoding matrix based on the method provided in the embodiments of this application.

It should be further understood that, when the embodiments of this application are described based on one receive antenna for the terminal device, the receive antenna may be any one of one or more receive antennas that are configured for the terminal device. In other words, for a precoded reference signal received by any receive antenna, the terminal device may perform channel measurement based on the method provided in the embodiments of this application, or the network device may determine a precoding matrix based on the method provided in the embodiments of this application.

It should be further understood that, a quantity of polarization directions of a transmit antenna that are configured by the network device is not limited in this application. For example, there may be one polarization direction, namely, a single polarization direction, or there may be a plurality of polarization directions, for example, dual polarization directions. A quantity of receive antennas that are configured for the terminal device is not limited in this application either. For example, there may be one or more receive antennas.

Figure 5:
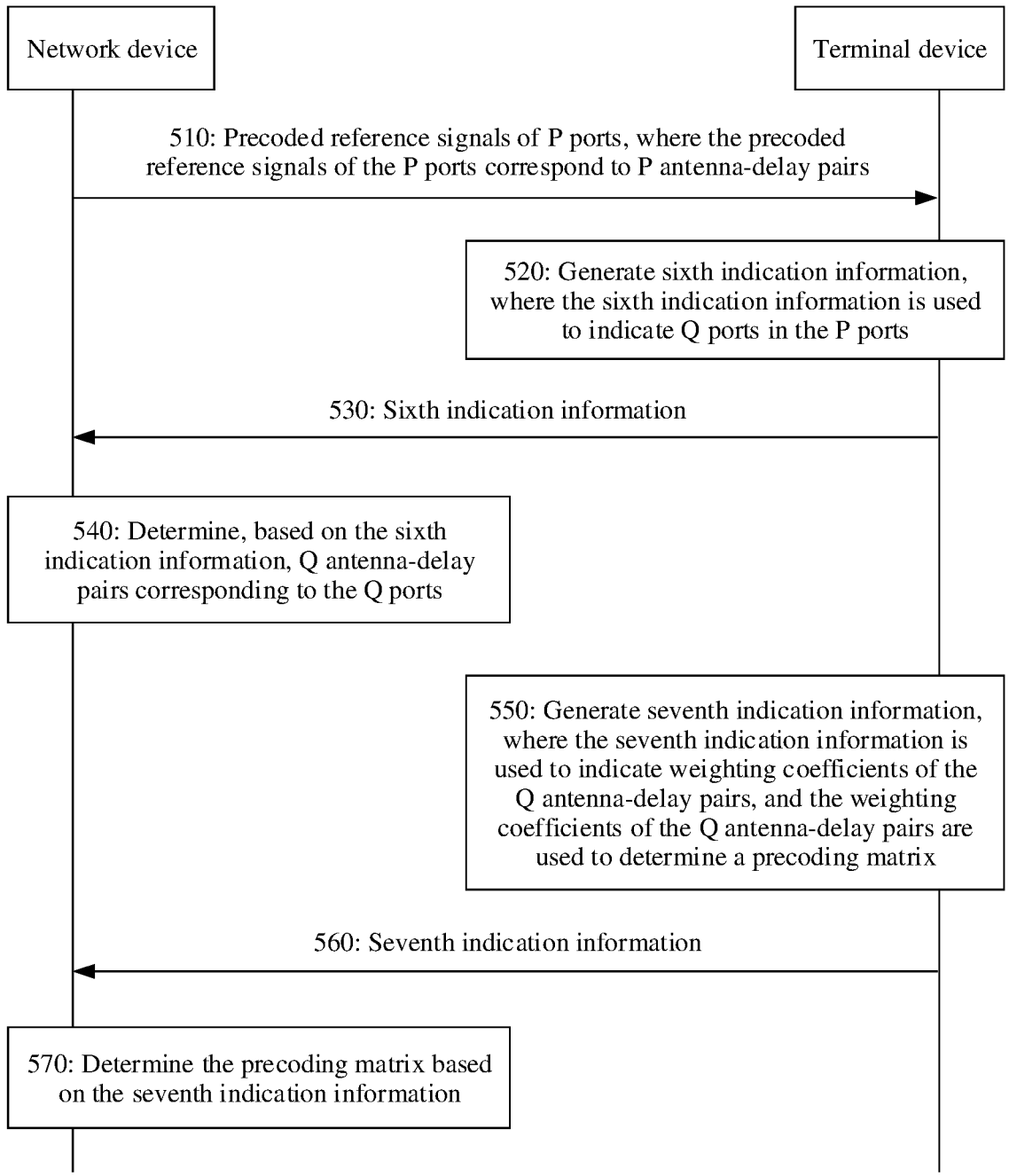
FIG. 5 is a schematic flowchart of a channel measurement method according to another embodiment of this application.

FIG. 5 is a schematic flowchart of a channel measurement method 500 according to another embodiment of this application from a perspective of device interaction. As shown in the figure, the method 500 may include operation 510 to operation 570. The following describes the operations in the method 500 in detail.

Step 510: A terminal device receives precoded reference signals of P ports, where the precoded reference signals of the P ports correspond to P antenna-delay pairs. Correspondingly, a network device sends the precoded reference signals of the P ports, where the precoded reference signals of the P ports correspond to the P antenna-delay pairs.

Specifically, each of the P antenna-delay pairs includes one transmit antenna and one delay vector, or each antenna-delay pair is a combination of one transmit antenna and one delay vector. One transmit antenna and one delay vector can uniquely determine an antenna-delay pair.

In this embodiment, the P antenna-delay pairs may be obtained by combining L delay vectors and T transmit antennas. In other words, a plurality of combinations of delay vectors and transmit antennas may be obtained based on the L delay vectors and the T transmit antennas. The plurality of combinations are different from each other. Delay vectors and/or transmit antennas in any two of the plurality of combinations are different. The plurality of combinations may include the foregoing P antenna-delay pairs. T is a quantity of transmit antenna ports in one polarization direction, and T is a positive integer.

The P antenna-delay pairs correspond to the precoded reference signals of the P ports. The precoded reference signal of each port may correspond to one antenna-delay pair. The precoded reference signal of each port may be obtained by precoding, based on a delay vector included in the corresponding antenna-delay pair, a reference signal sent by a transmit antenna included in the antenna-delay pair.

The network device precodes, based on the L delay vectors, a reference signal sent by a transmit antenna, that is, does not perform space domain precoding but performs only frequency domain precoding on the reference signal. Because space domain precoding is not performed on the reference signal, before the reference signal is precoded based on the delay vector, the reference signal may correspond to T transmit antenna ports. A precoded reference signal obtained by performing frequency domain precoding on a reference signal by the network device based on one or more delay vectors may correspond to one or more groups of ports. Each group of ports may correspond to precoded reference signals obtained by precoding reference signals of the T transmit antenna ports based on a same delay vector. Each group of ports may include a maximum of T ports, and the T ports may correspond to the T transmit antenna ports. Therefore, a precoded reference signal of each port may correspond to one delay vector and one transmit antenna port. In other words, each port may be a combination of a delay vector and a transmit antenna port.

In a possible implementation, the network device may traverse the L delay vectors, to obtain T×L different combinations, or T×L antenna-delay pairs. In other words, a total of T×L combinations of delay vectors and different transmit antenna ports may be obtained by loading the L delay vectors to reference signals of different transmit antenna ports.

In another possible implementation, delay vectors corresponding to at least two transmit antenna ports are different. A reference signal transmitted by the network device through a $l^{th}$ ($1 \leq t \leq T$) transmit antenna port in the T transmit antenna ports may be obtained through precoding based on $L_t$ ($1 \leq L_t \leq L$, and $L_t$ is an integer) delay vectors. That is, $$P = \sum_{t=1}^{T} L_t.$$

The $L_t$ delay vectors may be some or all of the L delay vectors, that is, $L_t \leq L$. L in the L delay vectors may satisfy that $$L \leq \sum_{t=1}^{T} L_t.$$

Herein, that delay vectors corresponding to at least two transmit antenna ports are different may mean that delay vectors corresponding to at least two of the T transmit antenna ports are different, and delay vectors corresponding to the other transmit antenna ports may be the same or may be different. This is not limited in this application. In other words, delay vectors corresponding to the transmit antenna ports are partially or completely different.

That delay vectors corresponding to two transmit antenna ports are different may mean that the delay vectors corresponding to the two transmit antenna ports are completely different, that is, the delay vectors corresponding to the two transmit antenna ports are not repeated, or have no intersection. For example, a delay vector corresponding to a transmit antenna port #1 includes $b(\tau_2)$, and delay vectors corresponding to a transmit antenna port #2 include $b(\tau_1)$ and $b(\tau_3)$. That delay vectors corresponding to two transmit antenna ports are different may alternatively mean that the delay vectors corresponding to the two transmit antenna ports are partially different, that is, the delay vectors corresponding to the two transmit antenna ports are partially repeated but are not completely the same, or the delay vectors corresponding to the two transmit antenna ports have an intersection but are not completely the same. For example, a delay vector corresponding to a transmit antenna port #1 includes $b(\tau_2)$, and delay vectors corresponding to a transmit antenna port #2 include $b(\tau_1)$, $b(\tau_2)$, and $b(\tau_3)$. When delay vectors corresponding to any two of the T transmit antenna ports are not repeated, $$L = \sum_{t=1}^{T} L_t.$$

When delay vectors corresponding to two or more of the T transmit antenna ports are partially repeated, $$L < \sum_{t=1}^{T} L_t.$$

Therefore, the network device may obtain $$\sum_{t=1}^{T} L_t$$

combinations of angle vectors and delay vectors based on the T transmit antenna ports and the L delay vectors.

It should be understood that, the foregoing lists a correspondence between a transmit antenna port and a delay vector merely for ease of understanding. However, this shall not constitute any limitation on this application. The correspondence between a transmit antenna port and a delay vector is not limited in this application.

Because of reciprocity between delays on uplink and downlink channels, the L delay vectors may all be determined based on uplink channel measurement. A specific method for determining the L stronger delay vectors by the network device based on uplink channel measurement has been described in detail in the foregoing method 200. For brevity, details are not described herein again.

It should be understood that, determining the L delay vectors based on uplink channel measurement is not a unique implementation; and the L delay vectors may be, for example, predefined, for example, defined in a protocol, or may be determined through statistics collection based on a result fed back in one or more previous downlink channel measurements. This is not limited in this application.

In an FDD mode, delays on uplink and downlink channels may be reciprocal. Therefore, the L delay vectors that are obtained through uplink channel measurement may be loaded to a downlink reference signal, so that the terminal device performs downlink channel measurement based on the received precoded reference signal.

The network device may precode the downlink reference signal such as a CSI-RS based on the L delay vectors, to obtain a precoded reference signal. The network device may transmit the precoded reference signal by using a preconfigured reference signal resource.

Step 520: The terminal device generates sixth indication information, where the sixth indication information is used to indicate Q ports in the P ports.

Specifically, the P ports correspond to the P antenna-delay pairs described above. The Q ports are some of the P ports, Q<P, and Q is a positive integer. In other words, the terminal device may indicate some of the Q ports to the network device. The Q ports may be stronger ports in the P ports. The terminal device may perform downlink channel measurement based on the received reference signals of the P ports, estimate channels of the P ports, and feed back the Q stronger ports to the network device.

A weighted sum of the P antenna-delay pairs obtained by the terminal device by performing channel measurement based on the reference signals of the P ports may be used to determine a downlink channel. In the P antenna-delay pairs, impact of an antenna-delay pair with a larger weighting coefficient on feedback precision is greater than impact of an antenna-delay pair with a smaller weighting coefficient on the feedback precision. Therefore, the terminal device may select, from the P antenna-delay pairs, Q antenna-delay pairs with larger weighting coefficients for a feedback, thereby helping reduce feedback overheads while ensuring the feedback precision.

It should be noted that, when receiving the precoded reference signal and performing channel measurement based on the received precoded reference signal, the terminal device may perform receiving and measurement based on different port numbers. The terminal device does not learn of or does not need to learn of antenna vectors and delay vectors that are used by the network device to precode the reference signal. When precoding the reference signal, the network device may determine a correspondence among each antenna vector, a delay vector, and a port. In addition, when the reference signal is transmitted, a correspondence between each port and a time-frequency resource may also be learned of. Therefore, the terminal device indicates the Q ports to the network device, and the network device may determine Q corresponding antenna-delay pairs based on the Q ports.

A value of Q may be predefined, for example, defined in a protocol; or may be preconfigured by the network device, for example, indicated by the network device in advance by using signaling; or may be determined by the terminal device. This is not limited in this application.

If the value of Q is determined by the terminal device, the terminal device may further indicate the value of Q by using the sixth indication information. Optionally, the sixth indication information is further used to indicate the value of Q.

If the value of Q is indicated by the network device, the network device and the terminal device may pre-agree on whether the terminal device reports a corresponding quantity of ports according to an indication of the network device.

For example, the network device and the terminal device may pre-agree on that the terminal device may further determine the quantity of reported ports according to the indication of the network device. In this case, the network device may indicate a maximum value $Q_0$ of Q in advance by using signaling, and the terminal device may report the Q ports based on $Q_0$, where $Q \leq Q_0$, and $Q_0$ is a positive integer.

Optionally, the method further includes: The network device sends third indication information, where the third indication information is used to indicate the maximum value $Q_0$ of Q. Correspondingly, the terminal device receives the third indication information, where the third indication information is used to indicate the maximum value $Q_0$ of Q.

If the terminal device further determines the value of Q based on the maximum value $Q_0$, the terminal device may indicate the value of Q by using the sixth indication information. Certainly, Q may alternatively be equal to $Q_0$. This is not limited in this application.

For another example, the network device and the terminal device may pre-agree on that the terminal device needs to report a corresponding quantity of ports according to the indication of the network. That is, the network device may indicate the value of Q in advance by using signaling, and the terminal device reports the Q ports.

Optionally, the method further includes: The network device sends third indication information, where the third indication information is used to indicate the value of Q. Correspondingly, the terminal device receives the third indication information, where the third indication information is used to indicate the value of Q.

For ease of distinguishing and description, the Q ports that need to be fed back to the network device and that are determined by the terminal device based on the received reference signals of the P ports are denoted as target ports below. It should be understood that, P and Q are merely examples for ease of distinguishing and understanding, and specific values of P and Q are not limited in this application.

The following describes in detail a specific process in which the terminal device determines the Q target ports from the P ports.

As described above, the P ports correspond to the P antenna-delay pairs. Weighting coefficients of the P antenna-delay pairs may be determined based on the precoded reference signals of the P ports. The terminal device may perform channel measurement based on the precoded reference signals of the P ports, determine the weighting coefficients of the P antenna-delay pairs corresponding to the P ports, and further determine the Q target ports from the P ports.

Because the network device precodes the reference signal based on the P antenna-delay pairs including K transmit antenna ports and the L delay vectors, a precoded reference signal carried on each RB may correspond to the P ports. A $p^{th}$ port in the P ports corresponds to a $p^{th}$ antenna-delay pair. A precoded reference signal of the $p^{th}$ port is obtained by precoding the reference signal based on a transmit antenna port and a delay vector in the $p^{th}$ antenna-delay pair. It is assumed that the $p^{th}$ antenna-delay pair includes the $l^{th}$ transmit antenna port in the T transmit antenna ports and an $l^{th}$ delay vector in the L delay vectors. In this case, the precoded reference signal of the $p^{th}$ port may be obtained by precoding the reference signal based on the $l^{th}$ transmit antenna port and the $l^{th}$ delay vector. In other words, the precoded reference signal corresponding to the pf port may be used to determine a weighting coefficient of an antenna-delay pair including the $l^{th}$ transmit antenna port and the $l^{th}$ delay vector, that is, may be used to determine a weighting coefficient of the $p^{th}$ antenna-delay pair. Therefore, the terminal device may determine the weighting coefficient of the corresponding antenna-delay pair based on the precoded reference signal of each port.

As described above, if precoding on a reference signal is not considered, for each receive antenna, dimensions of a downlink channel may be N×T. Dimensions of a downlink channel on one RB that is received by using one receive antenna may be 1×T. Because the network device precodes the reference signal based on the delay vector, dimensions of a downlink channel received by the terminal device through each receive antenna may be 1×P. An estimation value of the downlink channel whose dimensions are 1×P is a channel estimation value obtained by performing channel estimation on the precoded reference signal on one RB. P elements in the downlink channel may correspond to P antenna-delay pairs. A $p^{th}$ element may represent a channel estimation value obtained by performing channel estimation on a precoded reference signal corresponding to the $p^{th}$ antenna-delay pair on one RB.

Because the precoded reference signal corresponds to the P antenna-delay pairs, a precoded reference signal carried on each RB may correspond to the P ports. The precoded reference signal corresponding to the $p^{th}$ port in the P ports may be a precoded reference signal that is obtained by precoding the reference signal based on one delay vector (for example, the $l^{th}$ delay vector) and that is sent through one transmit antenna port (for example, the $l^{th}$ transmit antenna port). In other words, the precoded reference signal corresponding to the $p^{th}$ port may be used to determine the weighting coefficient of the antenna-delay pair including the $l^{th}$ delay vector and the $l^{th}$ transmit antenna port, that is, may be used to determine a weighting coefficient of the $p^{th}$ antenna-delay pair. Therefore, the P ports are in a one-to-one correspondence with the P antenna-delay pairs. It should be understood that, a correspondence among the $p^{th}$ port, the $l^{th}$ delay vector, and the $l^{th}$ transmit antenna port that is listed above is merely an example, and this shall not constitute any limitation on this application. The terminal device does not learn of a correspondence among each port, a delay vector, and a transmit antenna port. The terminal device only needs to receive a reference signal and perform channel estimation based on a time-frequency resource corresponding to each port.

For the precoded reference signal of the $p^{th}$ port, the terminal device may determine, based on downlink channels received on N RBs, the weighting coefficient of the $p^{th}$ antenna-delay pair. The weighting coefficient of the $p^{th}$ antenna-delay pair may be a $p^{th}$ element in a channel estimation value that is obtained by performing superposition summation on N channel estimation values on the N RBs and whose dimensions are 1×P.

It is assumed that an estimation value that is of a downlink channel and that is obtained by the terminal device by performing channel estimation on the precoded reference signal of the $p^{th}$ port is denoted as $y_n^{(p)}$. In this case, a sum of a plurality of estimation values that are obtained by the terminal device by performing channel estimation on the precoded reference signals of the P ports on the N RBs may be represented as $$\sum_{n=1}^{N} y_n^{(p)}, \sum_{n=1}^{N} y_n^{(p)}$$

may be a vector whose dimensions are 1×P, and the vector includes P weighting coefficients corresponding to the P antenna-delay pairs. It may be understood that a $p^{th}$ element in the vector is the weighting coefficient of the $p^{th}$ antenna-delay pair, and the weighting coefficient of the $p^{th}$ antenna-delay pair is determined by using the precoded reference signal that is obtained through precoding based on the $l^{th}$ delay vector and that is transmitted through the $l^{th}$ transmit antenna port.

Because the P ports include L groups of ports corresponding to the L delay vectors, the P weighting coefficients may be understood as L groups of weighting coefficients corresponding to the L delay vectors. Each group of weighting coefficients may include T weighting coefficients corresponding to a maximum of T transmit antenna ports.

When each group of ports includes T ports and corresponds to T transmit antenna ports, each of the L groups of weighting coefficients may include T weighting coefficients. In this case, the P weighting coefficients may be represented as, for example, a form of a matrix whose dimensions are T×L or L×T. The weighting coefficient that is in the P weighting coefficients and that corresponds to the $l^{th}$ transmit antenna port and the $l^{th}$ delay vector may be denoted as $\alpha_{t,l}$.

When delay vectors corresponding to at least two transmit antenna ports are different, transmit antenna ports corresponding to the at least two delay vectors are also different. In this case, each group of weighting coefficients includes a maximum of T weighting coefficients. In this case, there are $L_t$ delay vectors corresponding to the $l^{th}$ transmit antenna port in the P weighting coefficients, and a weighting coefficient corresponding to the $l^{th}$ transmit antenna port and an $l_t^{th}$ delay vector may be denoted as $\alpha_{t,l_t}$.

Based on the foregoing method, the terminal device may determine, based on the received precoded reference signals of the P ports, the P weighting coefficients corresponding to the P antenna-delay pairs. Based on the P weighting coefficients, the terminal device may further determine the Q stronger ports in the P ports, and determine the Q stronger ports as the Q target ports to be fed back to the network device. A weighting coefficient of any one of the Q antenna-delay pairs corresponding to the Q target ports is greater than or equal to a weighting coefficient of an antenna-delay pair corresponding to any one of the remaining P-Q ports.

After determining the Q target ports, the terminal device may generate the sixth indication information to indicate the Q target ports.

In an implementation, when the sixth indication information is used to indicate the Q target ports, the sixth indication information is specifically used to indicate indexes of the Q antenna-delay pairs corresponding to the Q target ports.

As described above, the P antenna-delay pairs may be obtained by combining the L delay vectors and the T transmit antenna ports. Although the terminal device does not learn of transmit antenna ports and delay vectors that are specifically included in the P antenna-delay pairs, the terminal device may learn that there is a one-to-one correspondence between ports and antenna-delay pairs. If the transmit antenna ports and the delay vectors that are included in these antenna-delay pairs are separately distinguished by using indexes, a combination of an index of one transmit antenna port and an index of one delay vector may be used to uniquely indicate one port. It should be understood that, herein, the index of the transmit antenna port is not a port number of the transmit antenna port, and the index of the delay vector is not an index of the delay vector in a delay vector set. Instead, different index values are defined for the L delay vectors and the T transmit antenna ports that are used for precoding, for distinguishing.

Optionally, each of the P antenna-delay pairs may be indicated by using a two-dimensional index (t, l). t=1, 2, . . . , or T; and l=1, 2, . . . , or L.

In the foregoing method 200, a specific method for indicating, by the sixth indication information, the index of the angle-delay pair by using the two-dimensional index is described in detail with reference to FIG. 4. In this embodiment, a specific method for indicating the antenna-delay pair by using the two-dimensional index is similar to the method, except that the angle vector is replaced with the transmit antenna port. For brevity, details are not described herein again.

In addition, the two-dimensional index (t, l) may alternatively be converted into a one-dimensional index p. p=1, 2, . . . , or P. A specific method for converting the two-dimensional index into the one-dimensional index has been described in detail in the foregoing method 200. For brevity, details are not described herein again.

In an implementation, when the sixth indication information is used to indicate the Q target ports, the sixth indication information is specifically used to indicate port numbers of the Q target ports.

Because the network device may notify the terminal device in advance by using signaling of a time-frequency resource for transmitting the reference signal and a port number for the transmitted reference signal, the terminal device may directly feed back the port numbers of the Q target ports to the network device after determining the Q stronger target ports.

It should be understood that, indicating the Q target ports by using the indexes of the corresponding antenna-delay pairs and indicating the Q target ports by using the port numbers are merely two possible implementations provided in this application, and this shall not constitute any limitation on this application. A specific implementation of indicating the Q target ports by the terminal device is not limited in this application.

It should be noted that, a specific process in which the terminal device generates the sixth indication information is described in detail above by using one polarization direction and one receive antenna as an example. In other words, the Q ports may be determined based on a precoded reference signal that is sent by a transmit antenna in one polarization direction and that is received by one receive antenna. However, this shall not constitute any limitation on this application. Alternatively, the network device may send precoded reference signals by using transmit antennas in a plurality of polarization directions. Alternatively, the terminal device may receive the precoded reference signals based on a plurality of receive antennas, and generate the sixth indication information based on the plurality of receive antennas.

When transmit antennas in a plurality of polarization directions are configured for the network device, the polarization direction described in the foregoing embodiment may be any one of the plurality of polarization directions. When transmit antennas in a plurality of polarization directions are configured for the network device, the terminal device may separately determine one or more stronger ports based on a precoded reference signal sent by a transmit antenna in each of the plurality of polarization directions, or may jointly determine one or more stronger ports based on precoded reference signals sent by the transmit antennas in the plurality of polarization directions. The one or more stronger ports that are determined by the terminal device based on the precoded reference signals sent by the transmit antennas in the plurality of polarization directions are the target port described above.

When a plurality of receive antennas are configured for the terminal device, the receive antenna described in the foregoing embodiment may be any one of the plurality of receive antennas of the terminal device. When the plurality of receive antennas are configured for the terminal device, the terminal device may separately determine one or more stronger ports based on each of the plurality of receive antennas, or may jointly determine one or more stronger ports based on the plurality of receive antennas. The one or more stronger ports that are determined by the terminal device based on the plurality of receive antennas are the target port described above.

Specific content indicated by the first indication information in different cases has been described in detail in the foregoing method 200. In this embodiment, specific content indicated by the sixth indication information in different cases may be similar to the specific content indicated by the first indication information. For brevity, details are not described herein again.

As described above, when generating the sixth indication information, the terminal device is not limited to determining the target port based on each receive antenna, and the terminal device may alternatively determine the target port based on a transport layer. A specific method for determining the target port by the terminal device based on each transport layer has been described in detail in the foregoing method 200. For brevity, details are not described herein again. In addition, when the terminal device indicates the target port based on each transport layer, specific content indicated by the sixth indication information in different cases may also be similar to the specific content indicated by the first indication information. For brevity, details are not described herein again.

Step 530: The terminal device sends the sixth indication information. Correspondingly, the network device receives the sixth indication information.

Step 540: The network device determines the Q antenna-delay pairs corresponding to the Q ports (that is, the Q target ports in the foregoing operation 520) based on the sixth indication information.

It should be understood that, specific processes of operation 530 and operation 540 are similar to specific processes of operation 230 and operation 240 in the foregoing method 200, except that the angle-delay pair is replaced with the antenna-delay pair, and the angle vector is replaced with the transmit antenna port. For brevity, details are not described herein again.

Based on the foregoing solution, precoding the reference signal by the network device based on the delay vector is equivalent to precoding the reference signal in frequency domain. A delay vector is introduced for a reference signal. A change of a channel in a plurality of frequency domain units may be represented by using a delay vector, and a reference signal is precoded based on the delay vector, so that the terminal device does not need to separately feed back the target port based on each frequency domain unit. Therefore, the feedback overheads can be reduced.

After determining the Q antenna-delay pairs, the network device may precode, based only on the delay vectors included in the Q antenna-delay pairs, a reference signal to be sent next time, or may continue to precode, based on the delay vectors included in the P antenna-delay pairs, a reference signal to be sent next time. This is not limited in this application.

In an embodiment, the network device may precode, based on delay vectors in $P_1$ antenna-delay pairs (namely, an example of the P antenna-delay pairs) in a periodicity (for example, denoted as a periodicity #1) of predetermined duration, a reference signal that is sent for the first time in the periodicity #1, to obtain and send precoded reference signals of $P_1$ ports (namely, an example of the P ports). The network device may precode, by using delay vectors in $Q_1$ corresponding antenna-delay pairs (namely, an example of the antenna-delay pairs corresponding to the Q target ports) based on $Q_1$ ports (namely, an example of the Q target ports) indicated by the terminal device by using indication information #1 (namely, an example of the sixth indication information), a reference signal to be sent next time or reference signals to be subsequently sent for a plurality of times.

The network device may precode, in a next periodicity (for example, denoted as a periodicity #2) based on delay vectors in $P_2$ antenna-delay pairs (namely, another example of the P antenna-delay pairs), a reference signal that is sent for the first time in the periodicity #2, to obtain and send precoded reference signals of $P_2$ ports. The network device may precode, by using delay vectors in $Q_2$ corresponding antenna-delay pairs (namely, another example of the antenna-delay pairs corresponding to the Q target ports) based on $Q_2$ ports (namely, another example of the Q target ports) indicated by the terminal device by using indication information #2 (namely, another example of the sixth indication information), a reference signal to be sent next time or reference signals to be subsequently sent for a plurality of times.

By analogy, the network device may precode reference signals in a plurality of periodicities according to the foregoing method. For brevity, details are not described herein again.

Based on the foregoing solution, the network device may first precode, by using a plurality of delay vectors, the reference signal sent by each transmit antenna, so that the terminal device performs channel measurement. Then, based on a stronger antenna-delay pair in the downlink channel that is fed back by the terminal device, the network device may precode, by using a delay vector in the stronger antenna-delay pair, a reference signal sent by a transmit antenna included in the stronger antenna-delay pair. Because a weighting coefficient of a stronger antenna-delay pair has greater impact on the feedback precision, the feedback overheads can be reduced while the feedback precision is ensured, and a compromise between the feedback precision and the feedback overheads can be reached.

Because the network device precodes the reference signal by using the plurality of antenna-delay pairs in advance, a stronger antenna-delay pair in the downlink channel determined by the terminal device may fall within a range of the plurality of antenna-delay pairs with a higher probability. Therefore, on one hand, this helps obtain relatively high feedback precision, and on the other hand, feedback overheads caused by a next feedback of a weighting coefficient by the terminal device can be reduced.

Optionally, the method 500 further includes: Step 550: The terminal device generates seventh indication information, where the seventh indication information is used to indicate the weighting coefficients of the Q antenna-delay pairs corresponding to the Q target ports.

Optionally, the method 500 further includes: Step 560: The terminal device sends the seventh indication information. Correspondingly, in operation 560, the network device receives the seventh indication information.

It should be understood that, specific processes of operation 550 and operation 560 are similar to specific processes of operation 250 and operation 260 in the foregoing method 200, except that the angle-delay pair is replaced with the antenna-delay pair, and the angle vector is replaced with the transmit antenna port. For brevity, details are not described herein again.

Optionally, the method 500 further includes: Step 570: The network device determines a precoding matrix based on the seventh indication information.

As described above, the terminal device may feed back the weighting coefficient based on the receive antenna, or may feed back the weighting coefficient based on the transport layer. The network device may determine the precoding matrix based on the seventh indication information and based on different feedback granularities.

If the terminal device feeds back the weighting coefficient based on the receive antenna, the weighting coefficient indicated by the seventh indication information may include a weighting coefficient corresponding to one or more receive antennas. The network device may reconstruct a downlink channel based on a weighting coefficient corresponding to each receive antenna and an antenna-delay pair corresponding to each weighting coefficient, to further determine a precoding matrix of each RB.

Herein, it should be noted that, when the terminal device feeds back the weighting coefficient by using the seventh indication information based on the receive antenna, the target port fed back by the terminal device by using the first indication information is also fed back based on the receive antenna. The network device may determine, based on the target port indicated by the terminal device in the first indication information, the antenna-delay pair corresponding to each weighting coefficient, or determine the correspondence between each antenna-delay pair and a weighting coefficient.

Specifically, one polarization direction of a transmit antenna is used as an example. The terminal device may feed back one or more weighting coefficients based on each receive antenna. For ease of description below, it is assumed that the terminal device feeds back Q weighting coefficients based on each receive antenna. The Q weighting coefficients corresponding to each receive antenna may be in a one-to-one correspondence with the Q antenna-delay pairs. Because space domain precoding is not performed on the reference signal, the network device may construct, based on the Q weighting coefficients corresponding to each receive antenna and one or more delay vectors that are in the Q antenna-delay pairs and that correspond to each transmit antenna port, a spatial-frequency matrix corresponding to each receive antenna, and reconstruct, based on the spatial-frequency matrix corresponding to each receive antenna, a downlink channel matrix corresponding to each RB, to further determine the precoding matrix corresponding to each RB.

It may be understood that because the Q weighting coefficients are in a one-to-one correspondence with the Q antenna-delay pairs, the Q weighting coefficients are also in a one-to-one correspondence with the delay vectors included in the Q antenna-delay pairs.

There are $L_t$ delay vectors corresponding to the $l^{th}$ transmit antenna port in the T transmit antenna ports, and the delay vector corresponding to the $l^{th}$ transmit antenna port is denoted as $b(\tau_{l_t})$, where $l_t=1, 2, \ldots,$ or $L_t$. A spatial-frequency matrix $H_{DL}^{(r)}$ corresponding to an $r^{th}$ receive antenna may be a matrix whose dimensions are T×N, a $l^{th}$ row in the spatial-frequency matrix may be a spatial-frequency vector $h_t^{(r)}$, and $$h_t^{(r)} = \sum_{l_t=1}^{L_t} \alpha_{t,l_t}^{(r)} (b(\tau_{l_t}))^H.$$

Therefore, a spatial-frequency matrix corresponding to the $r^{th}$ receive antenna may be obtained:

$$H_{DL}^{(r)} = \begin{bmatrix} h_1^{(r)} \\ h_2^{(r)} \\ \vdots \\ h_T^{(r)} \end{bmatrix}. \alpha_{t,l_t}^{(r)}$$

represents a weighting coefficient that is fed back based on the $r^{th}$ receive antenna and that corresponds to the $l^{th}$ transmit antenna port and the $l_t^{th}$ delay vector.

It may be understood that if any two of the T transmit antenna ports correspond to the L same delay vectors, the spatial-frequency vector $h_t^{(r)}$ may be expressed as $$h_t^{(r)} = \sum_{l=1}^{L} \alpha_{t,l}^{(r)} (b(\tau_l))^H. \alpha_{t,l}^{(r)}$$

represents the weighting coefficient corresponding to the $l^{th}$ transmit antenna port and the $l^{th}$ delay vector.

For ease of description, $$h_t^{(r)} = \sum_{l=1}^{L} \alpha_{t,l}^{(r)} (b(\tau_l))^H$$

is used as an example for description below. It may be understood that, regardless of whether delay vectors corresponding to transmit antenna ports are the same, determining of the precoding matrix is not affected.

It should be noted that, for ease of understanding, the foregoing uses one polarization direction of the transmit antenna as an example to describe a specific process of determining the spatial-frequency matrix corresponding to the receive antenna. However, this shall not constitute any limitation on this application. When the quantity of polarization directions of the transmit antenna is greater than 1, the network device may still determine, based on the foregoing method, the spatial-frequency matrix corresponding to each receive antenna.

For example, the quantity of polarization directions is 2. Each spatial-frequency vector in the spatial-frequency matrix that corresponds to the $r^{th}$ receive antenna in a first polarization direction may be determined by using a calculation formula $$h_{t,1}^{(r)} = \sum_{l=1}^{L} \alpha_{t,l,1}^{(r)} (b(\tau_l))^H.$$

Each spatial-frequency vector in the spatial-frequency matrix that corresponds to the $r^{th}$ receive antenna in the second polarization direction may be determined by using a calculation formula $$h_{t,2}^{(r)} = \sum_{l=1}^{L} \alpha_{t,l,2}^{(r)} (b(\tau_l))^H.$$

$h_{t,1}^{(r)}$ represents a spatial-frequency vector that is fed back based on the $r^{th}$ receive antenna in the first polarization direction; $\alpha_{t,l,1}^{(r)}$ represents a weighting coefficient that is fed back based on the $r^{th}$ receive antenna and that corresponds to the $l^{th}$ transmit antenna port and the $l^{th}$ delay vector in the first polarization direction; $h_{t,2}^{(r)}$ represents a spatial-frequency vector that is fed back based on the $r^{th}$ receive antenna in the second polarization direction; and $\alpha_{t,l,2}^{(r)}$ represents a weighting coefficient that is fed back based on the $r^{th}$ receive antenna and that corresponds to the $l^{th}$ transmit antenna port and the $l^{th}$ delay vector in the second polarization direction.

It should be understood that, the foregoing calculation formulas of the spatial-frequency vectors $h_{t,1}^{(r)}$ and $h_{t,2}^{(r)}$ that are defined for the two polarization directions are merely examples, and this shall not constitute any limitation on this application. For example, quantities of delay vectors and/or angle vectors loaded in different polarization directions may be the same or may be different, and delay vectors and/or angle vectors loaded in different polarization directions may be the same or may be different.

For the R receive antennas, the network device may determine spatial-frequency matrices $H_{DL}^{(1)}$ and $H_{DL}^{(2)}$ to $H_{DL}^{(R)}$ based on the Q weighting coefficients corresponding to each receive antenna. Therefore, the network device may determine a downlink channel matrix corresponding to each RB.

It should be understood that, a specific process in which the network device determines, based on the spatial-frequency matrix corresponding to each receive antenna, the downlink channel matrix corresponding to each RB has been described in detail in the foregoing method 200. For brevity, details are not described herein again.

It should be noted that, as described above, a channel matrix determined based on a spatial-frequency matrix obtained by performing weighted summation on the angle-delay pairs is a conjugate transpose of an actual channel matrix.

The network device may further determine the precoding matrix of each RB based on the downlink channel matrix corresponding to each RB. For example, the network device may determine the precoding matrix by performing SVD on the downlink channel matrix or a covariance matrix of the channel matrix, or may determine the precoding matrix by performing eigenvalue decomposition (EVD) on a covariance matrix of the downlink channel matrix.

It should be understood that, for a specific manner of determining the precoding matrix by the network device based on the channel matrix, refer to the conventional technology. A manner of determining the precoding matrix is not limited in this application.

It should be further understood that, merely for ease of understanding, the foregoing shows a specific process in which the network device determines the downlink channel matrix based on the spatial-frequency matrix, to further determine the precoding matrix. However, this shall not constitute any limitation on this application. Alternatively, the network device may directly determine the precoding matrix based on the spatial-frequency matrix. For example, the matrix $V^{(n)}$ may be determined based on the spatial-frequency matrix, and the network device may determine the precoding matrix in a manner of performing SVD on $(V^{(n)}) * (V^{(n)})^T$ and then taking a right eigenvector.

If the terminal device feeds back the weighting coefficient based on the transport layer, the weighting coefficient indicated by the seventh indication information may include a weighting coefficient of one or more transport layers. The network device may determine, based on a weighting coefficient corresponding to each transport layer and an antenna-delay pair corresponding to each weighting coefficient, a spatial-frequency matrix corresponding to each transport layer, to further determine a precoding matrix of each RB.

Herein, it should be noted that, when the terminal device feeds back the weighting coefficient by using the seventh indication information based on the transport layer, the target port fed back by the terminal device by using the first indication information is also fed back based on the transport layer. The network device may determine, based on the target port indicated by the terminal device in the first indication information, the antenna-delay pair corresponding to each weighting coefficient, or determine the correspondence between each antenna-delay pair and a weighting coefficient.

Specifically, one polarization direction of a transmit antenna is used as an example. The terminal device may feed back one or more weighting coefficients based on each transport layer. For ease of description below, it is assumed that the terminal device feeds back Q weighting coefficients based on each transport layer. The Q weighting coefficients corresponding to each transport layer may be in a one-to-one correspondence with the Q antenna-delay pairs. The network device may construct, based on the Q weighting coefficients corresponding to each transport layer and one or more delay vectors that are in the Q antenna-delay pairs and that correspond to each transmit antenna port, a spatial-frequency matrix corresponding to the transport layer.

There are $L_t$ delay vectors corresponding to the $l^{th}$ transmit antenna port in the T transmit antenna ports, and the delay vector corresponding to the $l^{th}$ transmit antenna port is denoted as $b(\tau_{l_t})$, where $l_t=1, 2, \ldots,$ or $L_t$. The spatial-frequency matrix $H_{DL}^{(z)}$ corresponding to the $z^{th}$ transport layer may be a matrix whose dimensions are T×N, a $l^{th}$ row in the spatial-frequency matrix may be a spatial-frequency vector $h_t^{(z)}$, and $$h_t^{(z)} = \sum_{l_t=1}^{L_t} \alpha_{t,l_t}^{(z)} (b(\tau_{l_t}))^H.$$

Therefore, the spatial-frequency matrix corresponding to the $z^{th}$ transport layer may be obtained:

$$H_{DL}^{(z)} = \begin{bmatrix} h_1^{(z)} \\ h_2^{(z)} \\ \vdots \\ h_T^{(z)} \end{bmatrix}$$

$\alpha_{t,l_t}^{(z)}$ represents a weighting coefficient that is fed back based on the $z^{th}$ transport layer and that corresponds to the $l^{th}$ transmit antenna port and the $l_t^{th}$ delay vector.

It may be understood that if any two of the T transmit antenna ports correspond to the L same delay vectors, the spatial-frequency vector $h_t^{(z)}$ may be expressed as $$h_t^{(z)} = \sum_{l=1}^{L} \alpha_{t,l}^{(z)} (b(\tau_l))^H.$$

$\alpha_{t,l}^{(z)}$ represents a weighting coefficient that is fed back based on the $z^{th}$ transport layer and that corresponds to the $l^{th}$ transmit antenna port and the $l^{th}$ delay vector.

For ease of description, $$h_t^{(z)} = \sum_{l=1}^{L} \alpha_{t,l}^{(z)} (b(\tau_l))^H$$

is used as an example for description below. It may be understood that, regardless of whether delay vectors corresponding to transmit antenna ports are the same, determining of the precoding matrix is not affected.

It should be noted that, for ease of understanding, the foregoing uses one polarization direction of the transmit antenna as an example to describe a specific process of determining the spatial-frequency matrix corresponding to the receive antenna. However, this shall not constitute any limitation on this application. When the quantity of polarization directions of the transmit antenna is greater than 1, the network device may still determine, based on the foregoing method, the spatial-frequency matrix corresponding to each receive antenna.

For example, the quantity of polarization directions is 2. Each spatial-frequency vector in the spatial-frequency matrix that corresponds to the $z^{th}$ transport layer in the first polarization direction may be determined by using a calculation formula $$h_{t,1}^{(z)} = \sum_{l=1}^{L} \alpha_{t,l,1}^{(z)} (b(\tau_l))^H.$$

Each spatial-frequency vector in the spatial-frequency matrix that corresponds to the $z^{th}$ transport layer in the second polarization direction may be determined by using a calculation formula $$h_{t,2}^{(z)} = \sum_{l=1}^{L} \alpha_{t,l,2}^{(z)} (b(\tau_l))^H.$$

$h_{t,1}^{(z)}$ represents a spatial-frequency vector that is fed back based on the $z^{th}$ transport layer in the first polarization direction; $\alpha_{t,l,1}^{(z)}$ represents a weighting coefficient that is fed back based on the $z^{th}$ transport layer and that corresponds to the $l^{th}$ transmit antenna port and the $l^{th}$ delay vector in the first polarization direction; $h_{t,2}^{(z)}$ represents a spatial-frequency vector that is fed back based on the $z^{th}$ transport layer in the second polarization direction; and $\alpha_{t,l,2}^{(z)}$ represents a weighting coefficient that is fed back based on the $z^{th}$ transport layer and that corresponds to the $l^{th}$ transmit antenna port and the $l^{th}$ delay vector in the second polarization direction.

It should be understood that, the foregoing calculation formulas of the spatial-frequency vectors $h_{t,1}^{(z)}$ and $h_{t,2}^{(z)}$ that are defined for the two polarization directions are merely examples, and this shall not constitute any limitation on this application. For example, quantities of delay vectors and/or angle vectors loaded in different polarization directions may be the same or may be different, and delay vectors and/or angle vectors loaded in different polarization directions may be the same or may be different.

For the Z transport layers, the network device may determine, based on the Q weighting coefficients corresponding to each transport layer, spatial-frequency matrices $H_{DL}^{(1)}$ and $H_{DL}^{(2)}$ to $H_{DL}^{(Z)}$ corresponding to the transport layers. Therefore, the network device may determine a precoding matrix corresponding to each RB. It should be understood that, a specific process in which the network device determines, based on the spatial-frequency matrix corresponding to each transport layer, the precoding matrix corresponding to each RB has been described in detail in the foregoing method 200. For brevity, details are not described herein again.

It should be further understood that, the foregoing is merely an example, and shows a possible implementation in which the network device determines the precoding matrix based on the seventh indication information. However, this shall not constitute any limitation on this application. A specific implementation in which the network device determines the precoding matrix based on the seventh indication information is not limited in this application. Based on a same concept, a person skilled in the art performs transformation or equivalent replacement on the foregoing listed matrix operation, and a method for determining a precoding matrix shall fall within the protection scope of this application.

It should be further understood that, the precoding matrix determined above is a precoding matrix corresponding to an RB. Herein, the RB is an example of a frequency domain unit. The precoding matrix corresponding to the RB may be a precoding matrix determined at a granularity of the RB based on a channel matrix corresponding to the RB, or a precoding matrix determined based on a precoded reference signal received on the RB, and may be used to precode data transmitted by using the RB. A downlink channel corresponding to the RB may be a downlink channel determined based on the precoded reference signal received on the RB, and may be used to determine the precoding matrix corresponding to the RB.

It should be understood that, merely for understanding and description, the foregoing uses the RB as an example of the frequency domain unit to describe in detail a specific process in which the network device restores the precoding matrix corresponding to the frequency domain unit. However, this shall not constitute any limitation on this application. As described above, the granularity of the frequency domain unit is not limited to the RB. When the granularity of the frequency domain unit is relatively large, for example, when the frequency domain unit is a subband, a PRG, or a PRB, the network device may determine the precoding matrix for the frequency domain unit based on the precoding matrix corresponding to each RB in each frequency domain unit. A specific method for determining, by the network device, the precoding matrix of each frequency domain unit based on the precoding matrix corresponding to each RB in the frequency domain unit has been described in detail in the foregoing method 200. For brevity, details are not described herein again.

It should be further understood that, the weighting coefficient that is mentioned above and that corresponds to a transmit antenna port and a delay vector is a weighting coefficient corresponding to an antenna-delay pair including the transmit antenna port and the delay vector. For example, the weighting coefficient corresponding to the $l^{th}$ transmit antenna port and the $l^{th}$ delay vector is the weighting coefficient corresponding to the antenna-delay pair including the $l^{th}$ transmit antenna port and the $l^{th}$ delay vector. For brevity, examples are not described one by one herein.

In this embodiment of this application, the network device may precode a downlink reference signal based on a predetermined delay, so that the terminal device performs downlink channel measurement based on the precoded reference signal. Therefore, the terminal device may not need to feed back a frequency domain vector (for example, the foregoing delay vector), but only needs to feed back a weighting coefficient corresponding to each antenna-delay pair, thereby greatly reducing the feedback overheads of the terminal device. In addition, based on reciprocity between the uplink and downlink channels, the network device may load a delay vector determined through uplink channel measurement to the downlink reference signal, so that a downlink channel measurement process of the terminal device is simplified. Therefore, complexity of calculation by the terminal device in the channel measurement process is reduced. Moreover, a precoding matrix is constructed through linear superposition of a plurality of frequency domain vectors, so that the precoding matrix determined by the network device can adapt to the downlink channel, thereby still ensuring relatively high feedback precision while reducing the feedback overheads.

In addition, the terminal device may feed back some stronger ports based on the received precoded reference signal. Because of the correspondence among a port, an angle vector, and a delay vector, the network device may choose to mainly load, based on a feedback of the terminal device, the delay vector used for precoding to several stronger delay vectors in the downlink channel. Because a stronger delay vector has greater impact on the feedback precision in a process of constructing the precoding matrix, and a weaker delay vector has less impact on the feedback precision in the process of constructing the precoding matrix, discarding of some weaker delay vectors has little impact on the feedback precision, and therefore, a compromise between the feedback overheads and the feedback precision can be reached.

It should be understood that, in this embodiment of this application, merely for ease of understanding, a specific process of performing downlink channel measurement and determining the precoding matrix when the spatial-frequency matrix is obtained based on the conjugate transpose of the actual channel is shown. However, this shall not constitute any limitation on this application. A relationship between the actual channel and the spatial-frequency matrix $H_{DL}$ is not fixed. Different definitions of the spatial-frequency matrix and the spatial-frequency component matrix may change the relationship between the actual channel and the spatial-frequency matrix $H_{DL}$. For example, the spatial-frequency matrix $H_{DL}$ may be obtained based on the conjugate transpose of the actual channel, or may be obtained based on a transpose of the actual channel.

When a relationship between the spatial-frequency matrix and the channel matrix is defined differently, operations performed by the network device when the delay and the angle are loaded are also different, and operations performed by the terminal device when the terminal device performs channel measurement and provides a feedback correspondingly change. However, these are only implementation behaviors of the terminal device and the network device, and this shall not constitute any limitation on this application. The definition of the channel matrix, the dimensions and the definition of the spatial-frequency matrix, and a transformation relationship between the channel matrix and the spatial-frequency matrix are not limited in this application. Similarly, a transformation relationship between the spatial-frequency matrix and the precoding matrix is not limited in this application either.

It should be further understood that, sequence numbers of the processes do not mean execution sequences in the foregoing embodiments. The execution sequences of the processes should be determined based on functions and internal logic of the processes, and this shall not constitute any limitation on the implementation processes of the embodiments of this application.

The foregoing describes in detail, with reference to FIG. 2 to FIG. 5, the precoding vector indication and determining method provided in the embodiments of this application. The following describes in detail communications apparatuses provided in the embodiments of this application with reference to FIG. 6 to FIG. 8.

Figure 6:
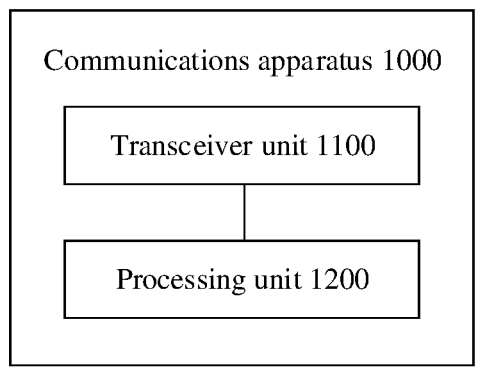
FIG. 6 is a schematic block diagram of a communications apparatus according to an embodiment of this application.

FIG. 6 is a schematic block diagram of a communications apparatus 1000 according to an embodiment of this application. As shown in the figure, the communications apparatus 1000 may include a transceiver unit 1100 and a processing unit 1200.

In a possible design, the communications apparatus 1000 may correspond to the terminal device in the foregoing method embodiments, for example, may be the terminal device, or may be a chip disposed in the terminal device.

Specifically, the communications apparatus 1000 may correspond to the terminal device in the method 200 or the method 500 according to the embodiments of this application. The communications apparatus 1000 may include units configured to perform the method performed by the terminal device in the method 200 in FIG. 2 or the method 500 in FIG. 5. In addition, the units in the communications apparatus 1000 and the foregoing other operations and/or functions are separately intended to implement corresponding procedures of the method 200 in FIG. 2 or the method 500 in FIG. 5.

When the communications apparatus 1000 is configured to perform the method 200 in FIG. 2, the transceiver unit 1100 may be configured to perform operation 210, operation 230, and operation 260 in the method 200, and the processing unit 1200 may be configured to perform operation 220 and operation 250 in the method 200.

When the communications apparatus 1000 is configured to perform the method 500 in FIG. 5, the transceiver unit 1100 may be configured to perform operation 510, operation 530, and operation 560 in the method 500, and the processing unit 1200 may be configured to perform operation 520 and operation 550 in the method 500.

It should be understood that, a specific process in which each unit performs the foregoing corresponding operation is described in detail in the foregoing method embodiments. For brevity, details are not described herein again.

Figure 7:
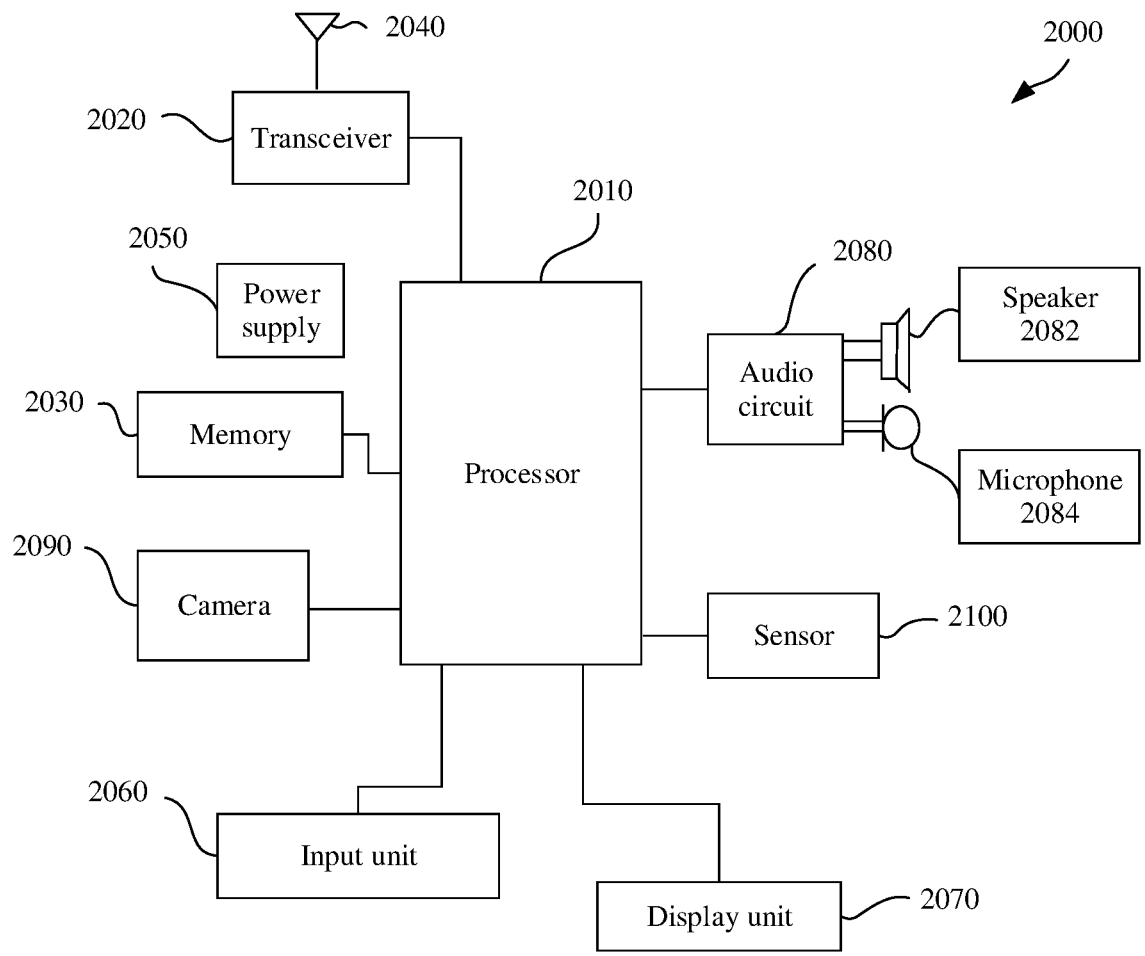
FIG. 7 is a schematic diagram of a structure of a terminal device according to an embodiment of this application.

It should be further understood that, when the communications apparatus 1000 is the terminal device, the transceiver unit 1100 in the communications apparatus 1000 may correspond to a transceiver 2020 in a terminal device 2000 shown in FIG. 7, and the processing unit 1200 in the communications apparatus 1000 may correspond to a processor 2010 in the terminal device 2000 shown in FIG. 7.

It should be further understood that, when the communications apparatus 1000 is the chip disposed in the terminal device, the transceiver unit 1100 in the communications apparatus 1000 may be an input/output interface.

In another possible design, the communications apparatus 1000 may correspond to the network device in the foregoing method embodiments, for example, may be the network device, or a chip disposed in the network device.

Specifically, the communications apparatus 1000 may correspond to the network device in the method 200 or the method 500 according to the embodiments of this application. The communications apparatus 1000 may include units configured to perform the method performed by the network device in the method 200 in FIG. 2 or the method 500 in FIG. 5. In addition, the units in the communications apparatus 1000 and the foregoing other operations and/or functions are separately intended to implement corresponding procedures of the method 200 in FIG. 2 or the method 500 in FIG. 5.

When the communications apparatus 1000 is configured to perform the method 200 in FIG. 2, the transceiver unit 1100 may be configured to perform operation 210, operation 230, and operation 260 in the method 200, and the processing unit 1200 may be configured to perform operation 270 in the method 200.

When the communications apparatus 1000 is configured to perform the method 500 in FIG. 5, the transceiver unit 1100 may be configured to perform operation 510, operation 530, and operation 560 in the method 500, and the processing unit 1200 may be configured to perform operation 570 in the method 500.

Figure 8:
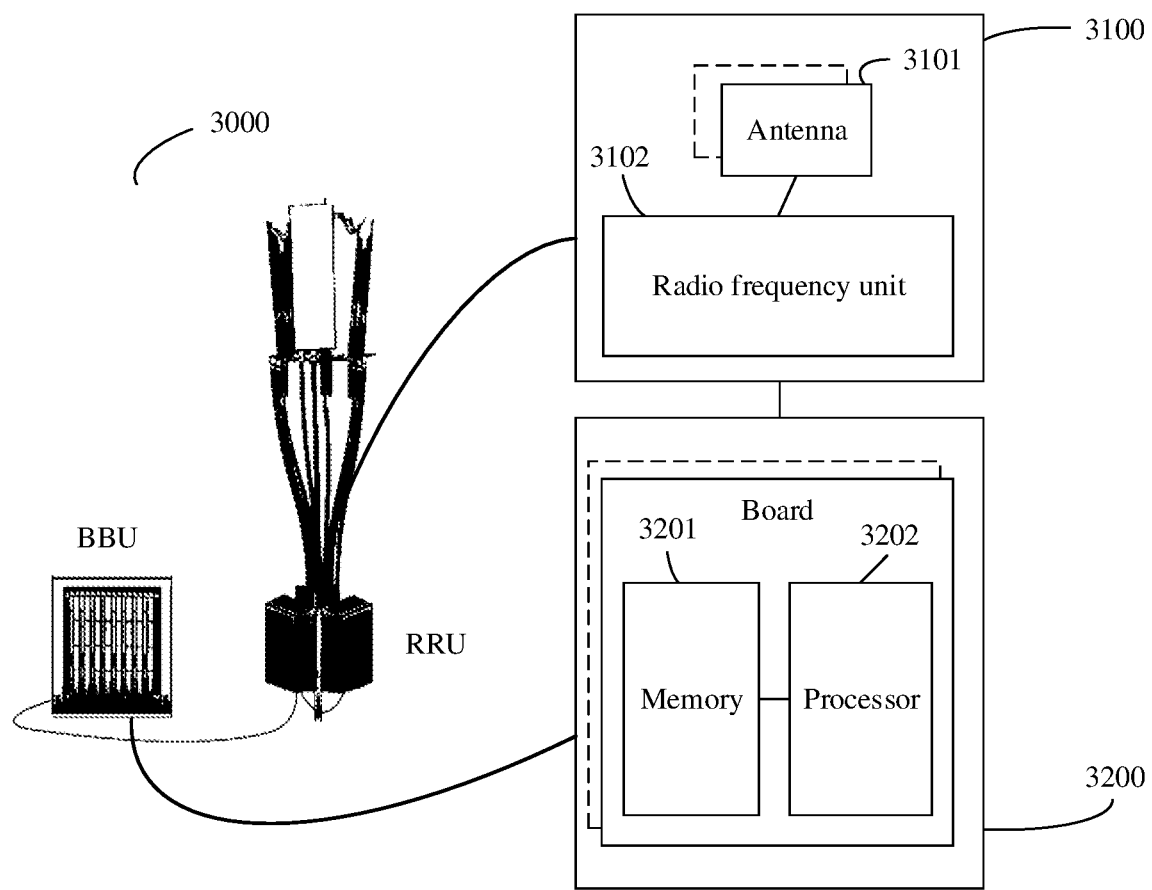
FIG. 8 is a schematic diagram of a structure of a network device according to an embodiment of this application.

It should be further understood that, when the communications apparatus 1000 is the network device, the transceiver unit in the communications apparatus 1000 may correspond to an RRU 3100 in a network device 3000 shown in FIG. 8, and the processing unit 1200 in the communications apparatus 1000 may correspond to a BBU 3200 or a processor 3202 in the network device 3000 shown in FIG. 8.

It should be further understood that, when the communications apparatus 1000 is the chip disposed in the network device, the transceiver unit 1100 in the communications apparatus 1000 may be an input/output interface.

FIG. 7 is a schematic diagram of a structure of the terminal device 2000 according to an embodiment of this application. The terminal device 2000 may be applied to the system shown in FIG. 1, to perform functions of the terminal device in the foregoing method embodiments. As shown in the figure, the terminal device 2000 includes the processor 2010 and the transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to receive or send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 6.

The transceiver 2020 may correspond to the transceiver unit 1100 in FIG. 6. The transceiver 2020 may include a receiver (or referred to as a receiver or a receiver circuit) and a transmitter (or referred to as a transmitter or a transmitter circuit). The receiver is configured to receive a signal, and the transmitter is configured to transmit a signal.

It should be understood that, the terminal device 2000 shown in FIG. 7 can implement the processes of the terminal device in the method embodiment shown in FIG. 2 or FIG. 5. Operations and/or functions of the modules in the terminal device 2000 are separately intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 2000 may further include a power supply 2050, configured to supply power to various devices or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 8 is a schematic diagram of a structure of the network device according to an embodiment of this application, for example, may be a schematic diagram of a structure of a base station. The base station 3000 may be applied to the system shown in FIG. 1, to perform functions of the network device in the foregoing method embodiments. As shown in the figure, the base station 3000 may include one or more radio frequency units, for example, one or more remote radio units (RRUs) 3100, and one or more baseband units (BBUs) (which may also be referred to as distributed units (DUs)) 3200. The RRU 3100 may be referred to as a transceiver unit, and corresponds to the transceiver unit 1100 in FIG. 6. Optionally, the transceiver unit may also be referred to as a transceiver, a transceiver circuit, a transceiver, or the like, and may include at least one antenna 3101 and a radio frequency unit 3102. Optionally, the transceiver unit may include a receiving unit and a sending unit. The receiving unit may correspond to a receiver (or referred to as a receiver or a receiver circuit), and the sending unit may correspond to a transmitter (or referred to as a transmitter or a transmitter circuit). The RRU 3100 is mainly configured to: receive and send a radio frequency signal, and perform conversion between the radio frequency signal and a baseband signal. For example, the RRU 3100 is configured to send indication information to a terminal device. The BBU 3200 is mainly configured to: perform baseband processing, control the base station, and so on. The RRU 3100 and the BBU 3200 may be physically disposed together, or may be physically disposed separately; to be specific, the base station is a distributed base station.

The BBU 3200 is a control center of the base station, may also be referred to as a processing unit, may correspond to the processing unit 1200 in FIG. 6, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments, for example, to generate the foregoing indication information.

In an example, the BBU 3200 may include one or more boards, and a plurality of boards may jointly support a radio access network (such as an LTE network) having a single access standard, or may separately support radio access networks (such as an LTE network, a 5G network, or another network) having different access standards. The BBU 3200 further includes a memory 3201 and a processor 3202. The memory 3201 is configured to store necessary instructions and data. The processor 3202 is configured to control the base station to perform a necessary action, for example, configured to control the base station to perform an operation procedure related to the network device in the foregoing method embodiments. The memory 3201 and the processor 3202 may serve one or more boards. In other words, a memory and a processor may be independently disposed on each board, or a plurality of boards may share a same memory and a same processor. In addition, a necessary circuit may be further disposed on each board.

It should be understood that, the base station 3000 shown in FIG. 8 can implement the processes of the network device in the method embodiment in FIG. 2 or FIG. 5. Operations and/or functions of the modules in the base station 3000 are separately intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments, and the RRU 3100 may be configured to perform an action of receiving or sending that is performed by the network device from or to the terminal device and that is described in the foregoing method embodiments. For details, refer to the descriptions in the foregoing method embodiments. Details are not described herein again.

An embodiment of this application further provides a processing apparatus, including a processor and an interface. The processor is configured to perform the communication method in any one of the foregoing method embodiments.

It should be understood that, the processing apparatus may be a chip. For example, the processing apparatus may be a field programmable gate array (FPGA), an application-specific integrated circuit (ASIC), a system-on-a-chip (SoC), a central processing unit (CPU), a network processor (NP), a digital signal processor (DSP), a micro controller unit (MCU), a programmable logic device (PLD), or another integrated chip.

In an implementation process, operations in the foregoing methods may be implemented by using a hardware integrated logic circuit in the processor, or by using instructions in a form of software. The operations of the methods disclosed with reference to the embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

It should be noted that, the processor in the embodiments of this application may be an integrated circuit chip, and has a signal processing capability. In an implementation process, operations in the foregoing method embodiments may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, operations, and logical block diagrams that are disclosed in the embodiments of this application. The general-purpose processor may be a microprocessor, or the processor may be any conventional processor, or the like. The operations of the methods disclosed with reference to the embodiments of this application may be directly performed and completed by a hardware decoding processor, or may be performed and completed by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory in the embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memories in the systems and methods described in this specification include but are not limited to these memories and any memory of another suitable type.

According to the methods provided in the embodiments of this application, this application further provides a computer program product. The computer program product includes computer program code. When the computer program code is run on a computer, the computer is enabled to perform the method in either of the embodiments shown in FIG. 2 and FIG. 5.

According to the methods provided in the embodiments of this application, this application further provides a computer-readable medium. The computer-readable medium stores program code. When the program code is run on a computer, the computer is enabled to perform the method in either of the embodiments shown in FIG. 2 and FIG. 5.

According to the methods provided in the embodiments of this application, this application further provides a system. The system includes the foregoing one or more terminal devices and the foregoing one or more network devices.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedures or the functions according to the embodiments of this application are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disc (SSD)), or the like.

The network device and the terminal device in the foregoing apparatus embodiments completely correspond to the network device and the terminal device in the method embodiments. A corresponding module or unit performs a corresponding operation. For example, the transceiver unit (transceiver) performs a receiving or sending operation in the method embodiments, and a operation other than the sending operation and the receiving operation may be performed by the processing unit (processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and according to, for example, a signal having one or more data packets (for example, data from two components interacting with another component in a local system, in a distributed system, and/or across a network such as the Internet interacting with other systems by using the signal).

A person of ordinary skill in the art may be aware that, in combination with the examples described in the embodiments disclosed in this specification, units and algorithm operations may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual coupling or direct coupling or communication connections may be implemented by using some interfaces. The indirect coupling or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
generating, by a terminal device, first indication information based on received precoded reference signals of P ports, the first indication information indicating Q ports in the P ports, the P ports corresponding to P angle-delay pairs respectively, and each of the P angle-delay pairs comprising an angle vector and a delay vector, wherein a precoded reference signal of each port of the P ports is a reference signal precoded based on the angle vector and the delay vector of a corresponding port of the P ports, the Q ports correspond to Q angle-delay pairs in the P angle-delay pairs, $P > Q \geq 1$, and P and Q are both integers; and
sending, by the terminal device, the first indication information.

2. The method according to claim 1, wherein the first indication information indicates an index of each of the Q angle-delay pairs corresponding to the Q ports.

3. The method according to claim 1, wherein the method further comprises:
generating, by the terminal device, second indication information, wherein the second indication information indicates weighting coefficients of the Q angle-delay pairs, and the Q angle-delay pairs and the weighting coefficients corresponding to the Q angle-delay pairs are used to determine a precoding matrix; and
sending, by the terminal device, the second indication information.

4. The method according to claim 1, wherein the first indication information further indicates a value of Q.

5. The method according to claim 1, wherein the method further comprises:
receiving, by the terminal device, third indication information, wherein the third indication information indicates a maximum value $Q_0$ of Q, $Q_0 \geq Q$, and $Q_0$ is a positive integer.

6. A method comprising:
receiving, by a network device, first indication information, wherein the first indication information is based on precoded reference signals of P ports sent by the network device and the first indication information indicates Q ports in the P ports, the P ports corresponding to P angle-delay pairs respectively, and each of the P angle-delay pairs comprising an angle vector and a delay vector, wherein a precoded reference signal of each port of the P ports is a reference signal precoded based on the angle vector and the delay vector of a corresponding port of the P ports, the Q ports correspond to Q angle-delay pairs in the P angle-delay pairs, $P > Q \geq 1$, and P and Q are both integers; and
determining, by the network device based on the first indication information, the Q angle-delay pairs corresponding to the Q ports.

7. The method according to claim 6, wherein the first indication information indicates an index of each of the Q angle-delay pairs corresponding to the Q ports.

8. The method according to claim 6, wherein the method further comprises:
receiving, by the network device, second indication information, wherein the second indication information indicates weighting coefficients of the Q angle-delay pairs; and
determining, by the network device based on the Q angle-delay pairs and the weighting coefficients corresponding to the Q angle-delay pairs, a precoding matrix.

9. The method according to claim 6, wherein the first indication information further indicates a value of Q.

10. The method according to claim 6, wherein the method further comprises:
sending, by the network device, third indication information, wherein the third indication information indicates a maximum value $Q_0$ of Q, $Q_0 \geq Q$, and $Q_0$ is a positive integer.

11. A communications apparatus, comprising:
at least one processor; and
a memory configured to store a computer program that, when executed by the at least one processor, causes the at least one processor to:
generate first indication information based on received precoded reference signals of P ports, the first indication information indicating Q ports in the P ports, the P ports corresponding to P angle-delay pairs respectively, and each of the P angle-delay pairs comprising an angle vector and a delay vector, wherein a precoded reference signal of each port of the P ports is a reference signal precoded based on the angle vector and the delay vector of a corresponding port of the P ports, the Q ports correspond to Q angle-delay pairs in the P angle-delay pairs, $P > Q \geq 1$, and P and Q are both integers; and
send the first indication information.

12. The apparatus according to claim 11, wherein the first indication information indicates an index of each of the Q angle-delay pairs corresponding to the Q ports.

13. The apparatus according to claim 11, wherein the computer program, when executed by the at least one processor, further causes the at least one processor to:
generate second indication information, wherein the second indication information indicates weighting coefficients of the Q angle-delay pairs, and the Q angle-delay pairs and the weighting coefficients corresponding to the Q angle-delay pairs are used to determine a precoding matrix; and send the second indication information.

14. The apparatus according to claim 11, wherein the first indication information further indicates a value of Q.

15. The apparatus according to claim 11, wherein the computer program, when executed by the at least one processor, further causes the at least one processor to receive third indication information, wherein the third indication information indicates a maximum value $Q_0$ of Q, $Q_0 \geq Q$, and $Q_0$ is a positive integer.

16. A communications apparatus, comprising:
at least one processor;
a memory configured to store a computer program that, when executed by the at least one processor, causes the at least one processor to:
receive first indication information, wherein the first indication information is based on precoded reference signals of P ports sent by the communications apparatus and the first indication information indicates Q ports in the P ports, the P ports corresponding to P angle-delay pairs respectively, and each of the P angle-delay pairs comprising an angle vector and a delay vector, wherein a precoded reference signal of each port of the P ports is a reference signal precoded based on the angle vector and the delay vector of a corresponding port of the P ports, the Q ports correspond to Q angle-delay pairs in the P angle-delay pairs, $P > Q \geq 1$, and P and Q are both integers; and
determine, based on the first indication information, the Q angle-delay pairs corresponding to the Q ports.

17. The apparatus according to claim 16, wherein the first indication information indicates an index of each of the Q angle-delay pairs corresponding to the Q ports.

18. The apparatus according to claim 16, wherein the computer program, when executed by the at least one processor, further causes the at least one processor to:
receive second indication information, wherein the second indication information indicates weighting coefficients of the Q angle-delay pairs; and
determine, based on the Q angle-delay pairs and the weighting coefficients corresponding to the Q angle-delay pairs a precoding matrix.

19. The apparatus according to claim 16, wherein the first indication information further indicates a value of Q.

20. The apparatus according to claim 16, wherein the computer program, when executed by the at least one processor, further causes the at least one processor to send third indication information, wherein the third indication information indicates a maximum value $Q_0$ of Q, $Q_0 \geq Q$, and $Q_0$ is a positive integer.

* * * * *

UNITED STATES PATENT AND TRADEMARK OFFICE
CERTIFICATE OF CORRECTION

PATENT NO. : 11,943,014 B2
APPLICATION NO. : 17/541668
DATED : March 26, 2024
INVENTOR(S) : Yin et al.

It is certified that error appears in the above-identified patent and that said Letters Patent is hereby corrected as shown below:

In the Specification

In Column 14, Line 63, delete "$\theta_k$" and insert -- $\varphi_k$ --.

In Column 16, Line 14, delete "F(g(t))=∫₋∞⁺∞g(t)e^{jω}dt;" and insert -- $F(g(t)) = \int_{-\infty}^{+\infty} g(t)e^{j\omega t} dt$ --.

In Column 16, Line 16, delete "F(g(t-t₀))=∫₋∞⁺∞g(t)e^{jω}dt=e^{jω₀}F(g(t))," and insert -- $F(g(t-t_0)) = \int_{-\infty}^{+\infty} g(t-t_0)e^{j\omega t} dt = e^{j\omega t_0} F(g(t))$ --.

In Column 16, Line 20, delete "x(t=g" and insert -- x(t)=g --.

In Column 16, Line 21, delete "X(ω)=g(ω)(1+e^{jω₀})," and insert -- $X(\omega) = g(\omega)(1+e^{j\omega t_0})$ --.

In Column 16, Line 23, delete "g(ω)≡1, X(ω)=1+e^{jω₀}," insert -- $g(\omega) \equiv 1$, $X(\omega) = 1 + e^{j\omega t_0}$ --.

In Column 37, Line 33, delete "km" and insert -- k$^{th}$ --.

In Column 41, Line 66, delete "P;" and insert -- P$_j$ --.

In Column 49, Line 38, delete "Lt" and insert -- L$^{th}$ --.

Signed and Sealed this
Twenty-seventh Day of August, 2024

Katherine Kelly Vidal
*Director of the United States Patent and Trademark Office*

CERTIFICATE OF CORRECTION (continued)
U.S. Pat. No. 11,943,014 B2

In Column 68, Line 13, delete "Apt" and insert -- A $p^{th}$ --.

In Column 68, Line 24, delete "pf" and insert -- $p^{th}$ --.